United States Patent
Chen et al.

(10) Patent No.: US 12,479,912 B2
(45) Date of Patent: Nov. 25, 2025

(54) MONOCLONAL ANTIBODIES WHICH BIND THYMIC STROMAL LYMPHOPOIETIN (TSLP), ENCODING POLYNUCLEOTIDES THEREOF AND METHODS OF USE THEREOF TO TREAT DISEASES

(71) Applicant: BIOSION INC., Jiangsu (CN)

(72) Inventors: Mingjiu Chen, Nanjing (CN); Wei Tan, Nanjing (CN); Cathy Xiaoyan Zhong, Nanjing (CN); Zhengping Zhang, Lianyungang (CN); Xiaofang Zou, Lianyungang (CN); Wei Song, Lianyungang (CN); Hongjiang Xu, Lianyungang (CN)

(73) Assignee: Biosion Inc., Jiangsu (CN)

( * ) Notice: Subject to any disclaimer, the term of this patent is extended or adjusted under 35 U.S.C. 154(b) by 953 days.

(21) Appl. No.: 17/636,089

(22) PCT Filed: Sep. 3, 2020

(86) PCT No.: PCT/CN2020/113289
§ 371 (c)(1),
(2) Date: Feb. 17, 2022

(87) PCT Pub. No.: WO2021/043221
PCT Pub. Date: Mar. 11, 2021

(65) Prior Publication Data
US 2022/0289833 A1   Sep. 15, 2022

Related U.S. Application Data

(60) Provisional application No. 62/895,984, filed on Sep. 4, 2019.

(51) Int. Cl.
*C07K 16/24* (2006.01)

(52) U.S. Cl.
CPC ........ *C07K 16/244* (2013.01); *C07K 2317/24* (2013.01); *C07K 2317/92* (2013.01)

(58) Field of Classification Search
CPC .............. C07K 16/244; C07K 2317/24; C07K 2317/92; C07K 2317/33; C07K 2317/76; C07K 2317/52; C07K 2317/56; C07K 2317/565; A61P 37/02; A61P 1/00; A61P 1/14; A61P 11/06; A61P 17/00; A61P 17/06; A61K 45/06; A61K 2039/505
See application file for complete search history.

(56) References Cited

U.S. PATENT DOCUMENTS

| | | | |
|---|---|---|---|
| 6,989,452 | B2 | 1/2006 | Ng et al. |
| 7,087,600 | B2 | 8/2006 | Ng et al. |
| 7,129,261 | B2 | 10/2006 | Ng et al. |
| 2006/0004081 | A1 | 1/2006 | Chen et al. |
| 2006/0024317 | A1 | 2/2006 | Boyd et al. |
| 2006/0247295 | A1 | 11/2006 | Gangwar et al. |

FOREIGN PATENT DOCUMENTS

| | | |
|---|---|---|
| CN | 108350070 A | 7/2018 |
| CN | 109206514 A | 1/2019 |
| CN | 109678957 A | 4/2019 |
| CN | 111171150 A | 5/2020 |
| CN | 113423733 A | 9/2021 |
| EP | 1176195 B1 | 5/2013 |
| EP | 3347377 A1 | 7/2018 |
| JP | 2009527235 A | 7/2009 |
| JP | 2018533911 A | 11/2018 |
| WO | 2006089231 A2 | 8/2006 |
| WO | 2007038658 A2 | 4/2007 |
| WO | 2007051081 A1 | 5/2007 |
| WO | 2007059404 A2 | 5/2007 |
| WO | 2007096149 A1 | 8/2007 |
| WO | 2008076321 A1 | 6/2008 |
| WO | 2008083312 A2 | 7/2008 |
| WO | 2008103693 A2 | 8/2008 |
| WO | 2018191479 A1 | 10/2018 |
| WO | 2019200787 A1 | 10/2019 |
| WO | 2021043221 A1 | 3/2021 |
| WO | 2024061279 A1 | 3/2024 |

OTHER PUBLICATIONS

Biancheri et al. "Abnormal thymic stromal lymphopoietin expression in the duodenal mucosa of patients with coeliac disease" Sep. 4, 2015, Gut, 65(10):1670-1680.

Corren et al. "Tezepelumab in adults with uncontrolled asthma" 2017, New England Journal of Medicine, 377 (10):936-946.

Extended European Search Report for EP 20860403.3 dated Nov. 9, 2023.

Fornasa et al. "Dichotomy of short and long thymic stromal lymphopoietin isoforms in inflammatory disorders of the bowel and skin" 2015, Journal of Allergy and Clinical Immunology, 136:413-422.

Gadani et al. "Interleukin-4: a cytokine to remember" Nov. 1, 2012, The Journal of Immunology, 189:4213-4219.

Gauvreau et al. "Effects of an Anti-TSLP Antibody on Allergen-Induced Asthmatic Responses", May 29, 2014, The New England Journal of Medicine, 370(20): 2102-2110.

(Continued)

*Primary Examiner* — Robert S Landsman

(74) *Attorney, Agent, or Firm* — DLA Piper LLP

(57) ABSTRACT

Disclosed is an isolated monoclonal antibody that specifically binds human TSLP, or the antigen-binding portion thereof. A nucleic acid molecule encoding the antibody, an expression vector, a host cell and a method for expressing the antibody are also provided. The present disclosure further provides a bispecific molecule, an immunoconjugate, a CAR-immune cell, an oncolytic virus and a pharmaceutical composition comprising the antibody, as well as a treatment method using an anti-TSLP antibody of the disclosure.

24 Claims, 13 Drawing Sheets

Specification includes a Sequence Listing.

(56) References Cited

OTHER PUBLICATIONS

Haddad et al. "Current and emerging strategies to inhibit type 2 inflammation in atopic dermatitis" May 21, 2022, Dermatology and Therapy, 12:1501-1533.

Harada et al. "Thymic stromal lymphopoietin gene promoter polymorphisms are associated with susceptibility to bronchial asthma" 2011, American Journal of Respiratory Cell and Molecular Biology, 44:787-793.

He et al. "Thymic stromal lymphopoietin" 2010, Annals of the New York Academy of Sciences, 1183:13-24.

He et al. "TSLP acts on infiltrating effector T cells to drive allergic skin inflammation" Aug. 19, 2008, Proceedings of the National Academy of Sciences, 105(33):11875-11880.

Iliev et al. "Human intestinal epithelial cells promote the differentiation of tolerogenic dendritic cells" Jun. 30, 2009, Gut, 58:1481-1489.

International Search Report and Written Opinion for application No. PCT/CN2020/113289 dated Dec. 3, 2020.

International Search Report and Written Opinion for application No. PCT/CN2023/120089 dated Jan. 5, 2024.

Ito et al. "TSLP-activated dendritic cells induce an inflammatory T helper type 2 cell response through OX40 ligand" Nov. 7, 2005, The Journal of Experimental Medicine, 202(9):1213-1223.

Japanese Office Action for Application No. 2022-506382 dated Apr. 4, 2023. (with English Translation).

Korean Office Action for application No. KR10-2022-7006514 dated Oct. 24, 2024. (with English Translation).

Rimoldi et al. "Intestinal immune homeostasis is regulated by the crosstalk between epithelial cells and dendritic cells" Apr. 10, 2005, Nature Immunology, 6(5):507-514.

Tsilingiri et al. "Thymic stromal lymphopoietin: to cut a long story short" 2017, Cellular and Molecular Gastroenterology and Hepatology, 3(2):174-182.

Umeda et al. "Thymus and activation-regulated chemokine as a biomarker for IgG4-related disease" 2020, Scientific Reports, 10(1):6010.

Zeuthen et al. "Epithelial cells prime the immune response to an array of gut-derived commensals towards a tolerogenic phenotype through distinct actions of thymic stromal lymphopoietin and transforming growth factor-Beta" 2007, Immunology, 123:197-208.

MONOCLONAL ANTIBODIES WHICH BIND THYMIC STROMAL LYMPHOPOIETIN (TSLP), ENCODING POLYNUCLEOTIDES THEREOF AND METHODS OF USE THEREOF TO TREAT DISEASES

RELATED APPLICATIONS AND INCORPORATION BY REFERENCE

This application is a U.S. National Stage filing under 35 U.S.C. § 371 of International PCT Application No. PCT/CN2020/113289, filed Sep. 3, 2020, which claims the benefit of priority to U.S. provisional application No. 62/895,984 filed Sep. 4, 2019, each of which is incorporated herein by reference in its entirety.

The foregoing application, and all documents cited therein or during its prosecution ("appln cited documents") and all documents cited or referenced herein (including without limitation all literature documents, patents, published patent applications cited herein) ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference. Any Genbank sequences mentioned in this disclosure are incorporated by reference with the Genbank sequence to be that of the earliest effective filing date of this disclosure.

FIELD OF THE INVENTION

The present disclosure relates generally to an isolated monoclonal antibody, particularly a mouse, chimeric or humanized monoclonal antibody, or the antigen-binding portion thereof, that specifically binds to human TSLP with high affinity and functionality. A nucleic acid molecule encoding the antibody or antigen-binding portion thereof, an expression vector, a host cell and a method for expressing the antibody or antigen-binding portion thereof are also provided. The present disclosure further provides an immunoconjugate, a bispecific molecule, a chimeric antigen receptor, an oncolytic virus, and a pharmaceutical composition comprising the antibody or the antigen-binding portion thereof, as well as a diagnostic and treatment method using an anti-TSLP antibody or antigen-binding portion thereof of the disclosure.

BACKGROUND OF THE INVENTION

Thymic stromal lymphopoietin (TSLP) is an epithelially derived cytokine. It is closely related to IL-7 and binds to TSLPR, a heterodimer of the IL-7 receptor alpha chain and the TSLP receptor chain. TSLP mRNA is expressed predominantly by epithelial cells in the thymus, lung, skin, intestine and tonsils, as well as stromal cells and mast cells, while TSLPR mRNA is found on many immune cell types, including dendritic cells (DCs), T cells, B cells, mast cells, NK cells and monocytes, as well as in tissues like heart, skeletal muscle, kidney and liver (Rui He et al., (2010) *Annals of the New Youk Academy of Sciences* 1183:13-24; Quentmeier H et al., (2001) *Leukemia* 15 (8): 1286-1292; Rimoldi M et al., (2005) *Nature immunology* 6 (5): 507-514).

The signaling pathways triggered by TSLP have been extensively studied. TSLP induces DC polarization to drive T helper (Th)2 cell differentiation and Th2 cytokine production during the induction phase of the immune response, and also directly promotes T cell expansion and amplifies Th2 cytokine secretion. Accordingly, TSLP is believed to be a master regulator of Th2 driven inflammation, and upregulation of TSLP is linked to the pathogenesis of Th2-related diseases, such as atopic dermatitis, and asthma (Rui He et al., (2010) supra; Ito T et al., (2005) *The Journal of Experimental Medicine* 202 (9): 1213-1223; He R et al., (2008) *Proc Natl Acad Sci USA* 105 (33): 11875-11880). On the other hand, TSLP mediates several immune homeostatic functions in the gut and the thymus. For example, TSLP is upregulated in gut epithelial cell lines upon bacterial stimulation in a strain-dependent fashion, which synergizes with transforming growth factor-beta to promote Treg cell differentiation. TSLP is also produced by primary human intestinal epithelial cells for the conditioning of CD103+ DCs to a tolerogenic phenotype (Katerina Tsilingiri et al., (2017) *Cellular and Molecular Gastroenterology and Hepatology* 3 (2): 174-182; Zeuthen L H et al., (2008) *Immunology* 123:197-208; Iliev I D et al., (2009) Gut 58:1481-1489).

The dual role of TSLP on the immune system leads to the discovery of two isoforms, a long isoform and a short isoform composed of the last 63 amino acid residues of the longer one. These two are controlled by different promoter regions, and are expressed depending on the context, tissue and stimulus (Harada M et al., (2011) *Amrican Journal of Respiratory Cell and Molecular Biology* 44:787-793). Long isoform expression was upregulated while the short isoform expression was downregulated in human intestinal epithelial cells in response to highly immunogenic microbial strains, whereas the opposite expression pattern was observed after challenge with a commensal *E. coli* strain. Further, TSLP expression on healthy barrier surfaces is limited to the short isoform, and long TSLP is only upregulated in oral mucosal lesions after tobacco exposure (Katerina Tsilingiri et al., (2017) supra; The isoform expression pattern has also been investigated in some TSLP-related diseases. For example, over-expression of long TSLP was observed in asthma, ulcerative colitis, atopic dermatitis and psoriasis, and reduced expression of long TSLP was found in celiac disease. And the expression of short TSLP was downregulated in Crohn's disease, celiac disease and atopic dermatitis (Katerina Tsilingiri et al., (2017) supra', Fomasa G et al., (2015) J Allergy Clin Immunol 136:413-422).

TSLP emerges as a clinical target because of its relevance to diseases mentioned above. The restoring of short TSLP expression was proposed to treat refractory celiac disease (Biancheri P et al., (2015) *Gut* 65:1670-1680). A human monoclonal antibody Tezepelumab was designed for the treatment of asthma and atopic dermatitis and has been proved to reduce the annual asthma exacerbation rate in Phase II trial compared to placebo (Jonathan Corren et al., (2017) *The New England Journal of Medicine* 377 (10): 936-946).

More antibodies with better pharmaceutical properties are increasingly desired and pursued, including those specific to only the long TSLP with minimal interaction with the short isoform, which may have and result in improved clinical outcome.

Citation or identification of any document in this application is not an admission that such document is available as prior art to the present disclosure.

SUMMARY OF THE INVENTION

The present disclosure provides an isolated monoclonal antibody, for example, a mouse, human, chimeric or humanized monoclonal antibody, or an antigen-binding portion thereof, that binds to TSLP (e.g., the human TSLP, and monkey TSLP) and has comparable, if not higher, binding affinity to TSLP and blocking activity on TSLP-TSLPR/IL7R interaction as compared to prior art anti-TSLP antibodies such as Tezepelumab.

The antibody or antigen-binding portion thereof of the disclosure can be used for a variety of applications, including detection of the TSLP protein, and treatment and prevention of TSLP associated diseases, such as asthma, ulcerative colitis, atopic dermatitis and psoriasis.

Accordingly, in one aspect, the disclosure pertains to an isolated monoclonal antibody (e.g., a mouse, chimeric or humanized antibody), or an antigen-binding portion thereof, that binds TSLP, having a heavy chain variable region that may comprise a VH-CDR1 region, a VH-CDR2 region and a VH-CDR3 region, wherein the VH-CDR1 region, the VH-CDR2 region and the CDR3 region may comprise amino acid sequences set forth in (1) SEQ ID NOs: 1, 2 and 3, respectively; (2) SEQ ID Nos: 37, 38, and 39, respectively; or (3) SEQ ID Nos: 47, 48, and 49, respectively.

The isolated monoclonal antibody, or the antigen-binding portion thereof, of the present disclosure may comprise a heavy chain variable region comprising an amino acid sequence set forth in SEQ ID NOs: 7, 8, 9 (X1=R, X2=V, X3=R; X1=R, X2=V, X3=V; X1=R, X2=A, X3=R; X1=K, X2=A, X3=R; or X1=K, X2=A, X3=V), 43 or 53, wherein the antibody or antigen-binding portion thereof binds to TSLP. The amino acid sequence of SEQ ID NO.: 7 may be encoded by the nucleotide sequence of SEQ ID NOs: 17 or 18, and the amino acid sequences set forth in SEQ ID NO.: 9 (X1=R, X2=V, X3=R), 43 and 53 may be encoded by the nucleotide sequences of SEQ ID NOs: 19, 45 and 55, respectively.

The isolated monoclonal antibody, or the antigen-binding portion thereof, of the present disclosure, that binds TSLP, may comprise a light chain variable region that comprises a VL-CDR1 region, a VL-CDR2 region and a VL-CDR3 region, wherein the VL-CDR1 region, the VL-CDR2 region, and the VL-CDR3 region may comprise amino acid sequences set forth in (1) SEQ ID NOs: 4, 5 and 6, respectively; (2) SEQ ID NOs: 40, 41 and 42, respectively; or (3) SEQ ID NOs: 50, 51 and 52, respectively.

The isolated monoclonal antibody, or the antigen-binding portion thereof, of the present disclosure may comprise a light chain variable region comprising an amino acid sequence set forth in SEQ ID NOs: 10, 11 (X1=S, X2=V; X1=A, X2=I; or X1=S, X2=I), 44 or 54, wherein the antibody or antigen-binding portion thereof binds to TSLP. The amino acid sequence of SEQ ID NO.: 10 may be encoded by the nucleotide sequences of SEQ ID NOs: 20 or 21, and the amino acid sequences set forth in SEQ ID NO.: 11 (X1=A, X2=I), 44 and 54 may be encoded by nucleotide sequences of SEQ ID NOs: 22, 46 and 56, respectively.

In the isolated monoclonal antibody, or the antigen-binding portion thereof, of the present disclosure, the VH-CDR1, VH-CDR2, VH-CDR3, VL-CDR1, VL-CDR2 and VL-CDR3 may comprise amino acid sequences set forth in (1) SEQ ID NOs: 1, 2, 3, 4, 5 and 6, respectively; (2) SEQ ID NOs: 37, 38, 39, 40, 41 and 42, respectively; or (3) SEQ ID NOs: 47, 48, 49, 50, 51 and 52, respectively, wherein the antibody or antigen-binding portion thereof binds to TSLP.

The isolated monoclonal antibody, or the antigen-binding portion thereof, of the present disclosure may comprises a heavy chain variable region and a light chain variable region that may comprise amino acid sequences set forth in (1) SEQ ID NOs: 7 and 10, respectively; (2) SEQ ID NOs: 8 and 11 (X1=S, X2=V), respectively; (3) SEQ ID NOs: 9 (X1=R, X2=V, X3=R) and 11 (X1=S, X2=V), respectively; (4) SEQ ID NOs: 9 (X1=R, X2=V, X3=V) and 11 (X1=S, X2=V), respectively; (5) SEQ ID NOs: 9 (X1=R, X2=A, X3=R) and 11 (X1=S, X2=V), respectively; (6) SEQ ID NOs: 9 (X1=K, X2=A, X3=R) and 11 (X1=S, X2=V), respectively; (7) SEQ ID NOs: 9 (X1=K, X2=A, X3=V) and 11 (X1=S, X2=V), respectively; (8) SEQ ID NOs: 8 and 11 (X1=A, X2=I), respectively; (9) SEQ ID NOs: 9 (X1=R, X2=V, X3=R) and 11 (X1=A, X2=I), respectively; (10) SEQ ID NOs: 9 (X1=R, X2=V, X3=V) and 11 (X1=A, X2=I), respectively; (11) SEQ ID NOs: 9 (X1=R, X2=A, X3=R) and 11 (X1=A, X2=I), respectively; (12) SEQ ID NOs: 9 (X1=K, X2=A, X3=R) and 11 (X1=A, X2=I), respectively; (13) SEQ ID NOs: 9 (X1=K, X2=A, X3=V) and 11 (X1=A, X2=I), respectively; (14) SEQ ID NOs: 8 and 11 (X1=S, X2=I), respectively; (15) SEQ ID NOs: 9 (X1=R, X2=V, X3=R) and 11 (X1=S, X2=I), respectively; (16) SEQ ID NOs: (X1=R, X2=V, X3=V) and 11 (X1=S, X2=I), respectively; (17) SEQ ID NOs: 9 (X1=R, X2=A, X3=R) and 11 (X1=S, X2-1), respectively; (18) SEQ ID NOs: 9 (X1=K, X2=A, X3=R) and 11 (X1=S, X2=I), respectively; (19) SEQ ID NOs: 9 (X1-K, X2=A, X3=V) and 11 (X1=S, X2=I), respectively; (20) SEQ ID NOs: 43 and 44, respectively; or (21) SEQ ID NOs: 53 and 54, respectively, wherein the antibody or antigen-binding portion thereof binds to TSLP.

The isolated monoclonal antibody, or the antigen-binding portion thereof, of the present disclosure may comprise a heavy chain and a light chain, wherein the heavy chain may comprise a heavy chain variable region and a heavy chain constant region, the light chain may comprise a light chain variable region and a light chain constant region. The heavy chain constant region may comprise human IgG1 constant region having the amino acid sequences set forth in SEQ ID NOs: 12 or 57, or human IgG4 constant region having the amino acid sequence set forth in SEQ ID NO: 13, or a fragment thereof. The light chain constant region may comprise human kappa constant region having the amino acid sequence set forth in SEQ ID NO: 14, or a fragment thereof. The heavy chain constant region may also be mouse IgG1 constant region having the amino acid sequence of SEQ ID NO.: 15, and the light chain constant region may be mouse kappa constant region having the amino acid sequence of SEQ ID NO.: 16. The amino acid sequences of SEQ ID NOs: 12 to 16, and 57 may be encoded by the nucleotide sequences of SEQ ID NOs: 23 to 27, and 58, respectively.

The antibody of the present disclosure may comprise or consist of two heavy chains and two light chains connected by disulfide bonds, wherein each heavy chain comprises the heavy chain constant region, heavy chain variable region or CDR sequences mentioned above, and each light chain comprises the light chain constant region, light chain variable region or CDR sequences mentioned above, wherein the C-terminus of the heavy chain variable region is linked to the N-terminus of the heavy chain constant region, and the C-terminus of the light chain variable region is linked to the N-terminus of the light chain constant region. The antibody of the disclosure can be a full-length antibody, for example, of an IgG1, IgG2 or IgG4 isotype. The antibody of the present disclosure in other embodiments may be a single chain variable fragment (scFv) antibody, or antibody fragments, such as Fab or F(ab')2 fragments.

The antibody, or the antigen-binding portion thereof, of the present disclosure has comparable or higher binding affinity to TSLP and blocking activity on TSLP-TSLPR/IL7R interaction as compared to prior art anti-TSLP antibodies such as Tezepelumab.

The disclosure also provides a bispecific molecule comprising an antibody, or an antigen-binding portion thereof, of the disclosure, linked to a second functional moiety (e.g., a second antibody) having a different binding specificity than said antibody, or antigen-binding portion thereof. The bispecific molecule may bind to TSLP and another disease specific protein such as IgE. The disclosure also provides an immunoconjugate comprising an antibody or an antigen-binding portion thereof of the invention, linked to a therapeutic agent, such as a cytotoxin, cytotoxic drug, etc. In another aspect, the antibody or an antigen binding portions thereof of the present invention can be made into part of a chimeric antigen receptor (CAR), and the present disclosure also relates to an immune cell, e.g., a T cell or a NK cell, comprising the CAR. The antibody or an antigen binding portions thereof of the present invention can also be encoded by or used in conjunction with an oncolytic virus.

Compositions comprising an antibody, or an antigen-binding portion thereof, or an immunoconjugate, a bispecific molecule, a CAR-immune cell, or an oncolytic virus of the invention, and a pharmaceutically acceptable carrier, are also provided.

Nucleic acid molecules encoding the antibodies, or antigen-binding portions thereof, of the disclosure are also encompassed by the disclosure, as well as expression vectors comprising such nucleic acids and host cells comprising such expression vectors or having its genome integrated with the polynucleotide encoding the antibody or the antigen-binding portion thereof. A method for preparing an anti-TSLP antibody or an antigen-binding portion thereof using the host cell comprising the expression vector is also provided, comprising steps of (i) expressing the antibody or antigen-binding portion thereof in the host cell and (ii) isolating the antibody or antigen-binding portion thereof from the host cell or its cell culture.

In yet another aspect, the disclosure provides a method of treating asthma, ulcerative colitis, atopic dermatitis or psoriasis in a subject, comprising administering to the subject a therapeutically effective amount of the antibody, or antigen-binding portion thereof, of the disclosure. In some embodiments, the method comprises administering a composition, a bispecific molecule, an immunoconjugate, a CAR-immune cell, or an antibody-encoding or antibody-bearing oncolytic virus of the disclosure, or alternatively a nucleic acid molecule capable of expressing the same in the subject. The bispecific molecule may bind to TSLP and another disease specific protein, such as IgE, IL4, IL13 or IL-5 in asthma treatment. In some embodiments, at least one additional antibody can be administered with the antibody, or an antigen-binding portion thereof, of the disclosure, such as an anti-IgE antibody, an anti-IL4 antibody, an anti-IL4R antibody, an anti-IL 13 antibody, an anti-IL13R antibody, an anti-IL-5 antibody, an anti-IL5R antibody, and/or an anti-TSLPR antibody. In some embodiments, at least one additional drug can be administered with the antibody, or an antigen-binding portion thereof, of the disclosure, such as an anti-asthma drug, an anti-ulcerative colitis drug, an anti-atopic dermatitis drug, or an anti-psoriasis drug.

Other features and advantages of the instant disclosure will be apparent from the following detailed description and examples which should not be construed as limiting. The contents of all references, GenBank entries, patents and published patent applications cited throughout this application are expressly incorporated herein by reference.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53 (c) EPC and Rule 28 (b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

Figure 1A:
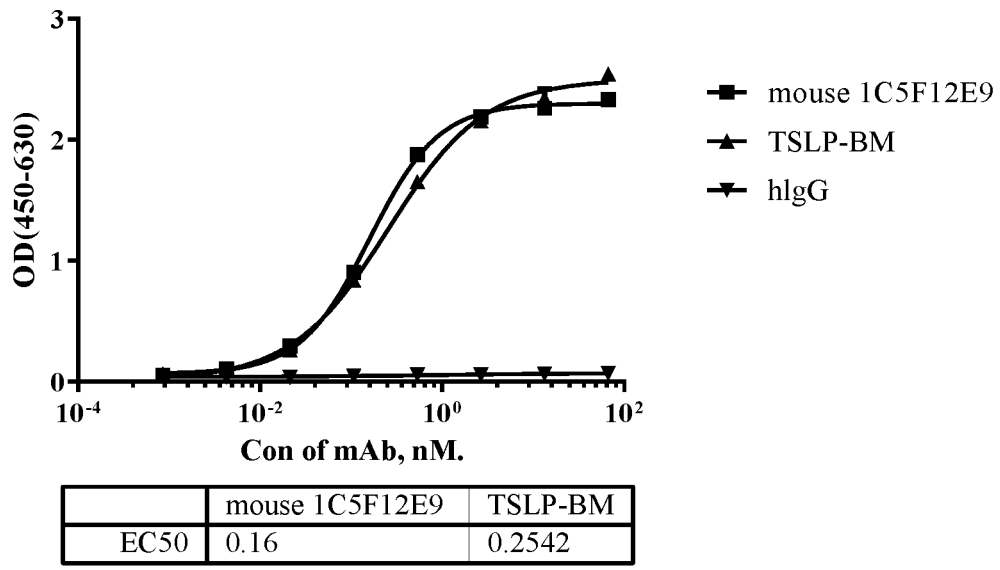
FIGS. 1A-1B show the binding capacities of mouse antibodies 1C5F12E9 (A), D1C2H1H1 and D1D8H9F7 (B) to human TSLP in a capture ELISA.

To ensure that the present disclosure may be more readily understood, certain terms are first defined. Additional definitions are set forth throughout the detailed description.

The term "TSLP" refers to thymic stromal lymphopoietin. The term "TSLP" comprises variants, isoforms, homologs, orthologs and paralogs. For example, an antibody specific for a human TSLP protein may, in certain cases, cross-react with a TSLP protein from a species other than human, such as monkey. In other embodiments, an antibody specific for a human TSLP protein may be completely specific for the human TSLP protein and exhibit no cross-reactivity to other species or of other types, or may cross-react with TSLP from certain other species but not all other species.

The term "human TSLP" refers to a TSLP protein having an amino acid sequence from a human, such as the amino acid sequence of human TSLP having a Genbank accession number of NP_149024.1. The terms "monkey or rhesus TSLP" and "mouse TSLP" refer to monkey and mouse TSLP sequences, respectively, e.g. those with the amino acid sequences having Genbank Accession Nos. NP_001100503.1 and NP_067342.1, respectively.

The term "antibody" as referred to herein includes whole antibodies and any antigen binding fragment (i.e., "antigen-binding portion") or single chains thereof. Whole antibodies are glycoproteins comprising two heavy (H) chains and two light (L) chains inter-connected by disulfide bonds. Each heavy chain is comprised of a heavy chain variable region (abbreviated herein as $V_H$) and a heavy chain constant region. The heavy chain constant region is comprised of three domains, $C_{H1}$, $C_{H2}$ and $C_{H3}$. Each light chain is comprised of a light chain variable region (abbreviated herein as $V_L$) and a light chain constant region. The light chain constant region is comprised of one domain, $C_L$. The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (Clq) of the classical complement system.

The term "antigen-binding portion" of an antibody (or simply "antibody portion"), as used herein, refers to one or more fragments of an antibody that retain the ability to specifically bind to an antigen (e.g., a TSLP protein). It has been shown that the antigen-binding function of an antibody can be performed by fragments of a full-length antibody. Examples of binding fragments encompassed within the term "antigen-binding portion" of an antibody include (i) a Fab fragment, a monovalent fragment consisting of the $V_L$, $V_H$, $C_L$ and Cuidomains; (ii) a F(ab')2 fragment, a bivalent fragment comprising two Fab fragments linked by a disulfide bridge at the hinge region; (iii) a Fd fragment consisting of the $V_H$ and $C_{H1}$ domains; (iv) a Fv fragment consisting of the $V_L$ and $V_H$ domains of a single arm of an antibody, (v) a dAb fragment (Ward et al., (1989) *Nature* 341:544-546), which consists of a $V_H$ domain; (vi) an isolated complementarity determining region (CDR); and (viii) a nanobody, a heavy chain variable region containing a single variable domain and two constant domains. Furthermore, although the two domains of the Fv fragment, $V_L$ and $V_H$, are coded by separate genes, they can be joined, using recombinant methods, by a synthetic linker that enables them to be made as a single protein chain in which the $V_H$ and $V_H$ regions pair to form monovalent molecules (known as single chain Fv (scFv); see e.g., Bird et al., (1988) *Science* 242:423-426; and Huston et al., (1988) *Proc. Natl. Acad. Sci. USA* 85:5879-5883). Such single chain antibodies are also intended to be encompassed within the term "antigen-binding portion" of an antibody. These antibody fragments are obtained using conventional techniques known to those with skill in the art, and the fragments are screened for utility in the same manner as are intact antibodies.

An "isolated antibody", as used herein, is intended to refer to an antibody that is substantially free of other antibodies having different antigenic specificities (e.g., an isolated antibody that specifically binds a TSLP protein is substantially free of antibodies that specifically bind antigens other than TSLP proteins). An isolated antibody that specifically binds a human TSLP protein may, however, have cross-reactivity to other antigens, such as TSLP proteins from other species. Moreover, an isolated antibody can be substantially free of other cellular material and/or chemicals. The terms "monoclonal antibody" or "monoclonal antibody composition" as used herein refer to a preparation of antibody molecules of single molecular composition. A monoclonal antibody composition displays a single binding specificity and affinity for a particular epitope.

The term "mouse antibody", as used herein, is intended to include antibodies having variable regions in which both the framework and CDR regions are derived from mouse germline immunoglobulin sequences. Furthermore, if the antibody contains a constant region, the constant region also is derived from mouse germline immunoglobulin sequences. The mouse antibodies of the disclosure can include amino acid residues not encoded by mouse germline immunoglobulin sequences (e.g., mutations introduced by random or site-specific mutagenesis in vitro or by somatic mutation in vivo). However, the term "mouse antibody", as used herein, is not intended to include antibodies in which CDR sequences derived from the germline of another mammalian species have been grafted onto mouse framework sequences.

The term "chimeric antibody" refers to an antibody made by combining genetic material from a nonhuman source with genetic material from a human being. Or more generally, a chimeric antibody is an antibody having genetic material from a certain species with genetic material from another species.

The term "humanized antibody", as used herein, refers to an antibody from non-human species whose protein sequences have been modified to increase similarity to antibody variants produced naturally in humans.

The term "isotype" refers to the antibody class (e.g., IgM or IgG1) that is encoded by the heavy chain constant region genes.

The phrases "an antibody recognizing an antigen" and "an antibody specific for an antigen" are used interchangeably herein with the term "an antibody which binds specifically to an antigen."

As used herein, an antibody that "specifically binds to human TSLP" is intended to refer to an antibody that binds to human TSLP protein (and possibly a TSLP protein from one or more non-human species) but does not substantially bind to non-TSLP proteins. Preferably, the antibody binds to human TSLP protein with "high affinity", namely with a $K_D$ of $5.0 \times 10^{-8}$ M or less, more preferably $10 \times 10^{-8}$ M or less, and more preferably $7.0 \times 10^{-9}$ M or less.

The term "does not substantially bind" to a protein or cells, as used herein, means does not bind or does not bind with a high affinity to the protein or cells, i.e. binds to the protein or cells with a $K_D$ of $10 \times 10^{-6}$ M or more, more preferably $1.0 \times 10^{-5}$ M or more, more preferably $10 \times 10^{-4}$ M or more, more preferably $1.0 \times 10^{-3}$ M or more, even more preferably $10 \times 10^{-2}$ M or more.

The term "high affinity" for an IgG antibody refers to an antibody having a $K_D$ of $10 \times 10^{-6}$ M or less, more preferably $5.0 \times 10^{-8}$ M or less, even more preferably $1.0 \times 10^{-8}$ M or less, even more preferably $7.0 \times 10^{-9}$ M or less and even more preferably $1.0 \times 10^{-9}$ M or less for a target antigen. However, "high affinity" binding can vary for other antibody isotypes. For example, "high affinity" binding for an IgM isotype refers to an antibody having a $K_D$ of $10^{-6}$ M or less, more preferably 10-7 M or less, even more preferably $10^{-8}$ M or less.

The term-$K_{assoc}$ or $K_a$, as used herein, is intended to refer to the association rate of a particular antibody-antigen interaction, whereas the term "$K_{dis}$" or "$K_a$", as used herein, is intended to refer to the dissociation rate of a particular antibody-antigen interaction. The term "$K_D$", as used herein, is intended to refer to the dissociation constant, which is obtained from the ratio of $K_a$ to $K_a$ (i.e., $K_a/K_a$) and is expressed as a molar concentration (M). $K_D$ values for antibodies can be determined using methods well established in the art. A preferred method for determining the $K_D$ of an antibody is by using surface plasmon resonance, preferably using a biosensor system such as a Biacore™ system.

The term "$EC_{50}$", also known as half maximal effective concentration, refers to the concentration of an antibody which induces a response halfway between the baseline and maximum after a specified exposure time.

The term "$IC_{50}$", also known as half maximal inhibitory concentration, refers to the concentration of an antibody which inhibits a specific biological or biochemical function by 50% relative to the absence of the antibody.

The term "subject" includes any human or nonhuman animal. The term "nonhuman animal" includes all vertebrates, e.g., mammals and non-mammals, such as nonhuman primates, sheep, dogs, cats, cows, horses, chickens, amphibians, and reptiles, although mammals are preferred, such as non-human primates, sheep, dogs, cats, cows and horses.

The term "therapeutically effective amount" means an amount of the antibody of the present disclosure sufficient to prevent or ameliorate the symptoms associated with a disease or condition (such as a cancer) and/or lessen the severity of the disease or condition. A therapeutically effective amount is understood to be in context to the condition being treated, where the actual effective amount is readily discerned by those of skill in the art.

Various aspects of the disclosure are described in further detail in the following subsections.

Anti-TSLP Antibodies Having Increased Binding Affinity to human TSLP and Better Blocking Capacity on TSLP-TSLPR/IL7R Interaction The exemplary antibody, or the antigen-binding portion thereof, of the disclosure specifically binds to human or cynomolgus TSLP with comparable, if not better, binding affinity as compared to previously described anti-TSLP antibodies, such as Tezepelumab. The exemplary antibody, or the antigen-binding portion thereof, of the disclosure may also block human TSLP-TSLPR/IL7R interaction, and its blocking activity is better than prior art anti-TSLP antibodies.

Preferred antibodies of the disclosure are humanized monoclonal antibodies. Additionally, or alternatively, the antibodies can be, for example, chimeric monoclonal antibodies.

Monoclonal Anti-TSLP Antibody

The antibody or the antigen-binding portion thereof of the disclosure may be structurally and chemically characterized as described below and in the following Examples. The amino acid sequence ID numbers of the heavy/light chain variable regions of the antibodies are summarized in Table 1 below, some antibodies sharing the same $V_H$ or $V_L$. The heavy chain constant region for the antibodies may be human IgG1 heavy chain constant region having the amino acid sequence set forth in, e.g., SEQ ID NOs: 12 or 57, or human IgG4 heavy chain constant region having the amino acid sequence set forth in, e.g., SEQ ID NO: 13, and the light chain constant region for the antibodies may be human kappa constant region having the amino acid sequence set forth in, e.g., SEQ ID NO: 14. These antibodies may also contain mouse IgG1 or IgG2 heavy chain constant region, and/or mouse kappa constant region. The antibody may consist of two heavy chain and two light chains connected by disulfide bonds, the C-terminus of the heavy chain variable region is linked to the N-terminus of the heavy chain constant region, and the C-terminus of the light chain variable region is linked to the N-terminus of the light chain constant region.

The heavy chain variable region CDRs and the light chain variable region CDRs in Table 1 have been defined by the Kabat numbering system. However, as is well known in the art, CDR regions can also be determined by other systems such as Chothia, IMGT, AbM, or Contact numbering system/method, based on heavy chain/light chain variable region sequences.

The $V_H$ and $V_L$ sequences (or CDR sequences) of other anti-TSLP antibodies which bind to human TSLP can be "mixed and matched" with the $V_H$ and $V_L$ sequences (or CDR sequences) of the anti-TSLP antibody of the present disclosure. Preferably, when $V_H$ and $V_H$ chains (or the CDRs within such chains) are mixed and matched, a $V_H$ sequence from a particular $V_H/V_L$ pairing is replaced with a structurally similar $V_H$ sequence. Likewise, preferably a $V_L$ sequence from a particular $V_H/V_L$ pairing is replaced with a structurally similar $V_L$ sequence.

Accordingly, in one embodiment, an antibody of the disclosure, or an antigen binding portion thereof, comprises:
(a) a heavy chain variable region comprising an amino acid sequence listed above in Table 1; and
(b) a light chain variable region comprising an amino acid sequence listed above in Table 1, or the $V_L$ of another anti-TSLP antibody, wherein the antibody specifically binds human TSLP.

TABLE 1

Amino acid sequence ID numbers of heavy/light chain variable regions

| Antibody | Heavy chain | | | | Light chain | | | |
|---|---|---|---|---|---|---|---|---|
| | $V_H$ CDR1 | $V_H$ CDR2 | $V_H$ CDR3 | $V_H$ | $V_L$ CDR1 | $V_L$ CDR2 | $V_L$ CDR3 | $V_L$ |
| Mouse/chimeric 1C5F12E9 | SEQ ID NO.: 1 | SEQ ID NO.: 2 | SEQ ID NO.: 3 | SEQ ID NO.: 7 | SEQ ID NO.: 4 | SEQ ID NO.: 5 | SEQ ID NO.: 6 | SEQ ID NO.: 10 |
| hu1C5F12E9-V1 | | | | SEQ ID NO.: 8 | | | | SEQ ID NO: 11, X1 = S, X2 = V |
| hu1C5F12E9-V2 | | | | SEQ ID NO.: 9, X1 = R, X2 = V, X3 = R | | | | SEQ ID NO: 11, X1 = S, X2 = V |
| hu1C5F12E9-V3 | | | | SEQ ID NO: 9, X1 = R, X2 = V, X3 = V | | | | SEQ ID NO: 11, X1 = S, X2 = V |
| hu1C5F12E9-V4 | | | | SEQ ID NO: 9, X1 = R, X2 = A, X3 = R | | | | SEQ ID NO: 11, X1 = S, X2 = V |
| hu1C5F12E9-V5 | | | | SEQ ID NO: 9, X1 = K, X2 = A, X3 = R | | | | SEQ ID NO: 11, X1 = S, X2 = V |
| hu1C5F12E9-V6 | | | | SEQ ID NO: 9, X1 = K, X2 = A, X3 = V | | | | SEQ ID NO: 11, X1 = S, X2 = V |
| hu1C5F12E9-V7 | | | | SEQ ID NO.: 8 | | | | SEQ ID NO: 11, X1 = A, X2 = I |
| hu1C5F12E9-V8 | | | | SEQ ID NO.: 9, X1 = R, X2 = V, X3 = R | | | | SEQ ID NO: 11, X1 = A, X2 = I |
| hu1C5F12E9-V9 | | | | SEQ ID NO: 9, X1 = R, X2 = V, X3 = V | | | | SEQ ID NO: 11, X1 = A, X2 = I |
| hu1C5F12E9-V10 | | | | SEQ ID NO: 9, X1 = R, X2 = A, X3 = R | | | | SEQ ID NO: 11, X1 = A, X2 = I |
| hu1C5F12E9-V11 | | | | SEQ ID NO: 9, X1 = K, X2 = A, X3 = R | | | | SEQ ID NO: 11, X1 = A, X2 = I |
| hu1C5F12E9-V12 | | | | SEQ ID NO: 9, X1 = K, X2 = A, X3 = V | | | | SEQ ID NO: 11, X1 = A, X2 = I |
| hu1C5F12E9-V13 | | | | SEQ ID NO.: 8 | | | | SEQ ID NO: 11, X1 = S, X2 = I |
| hu1C5F12E9-V14 | | | | SEQ ID NO.: 9, X1 = R, X2 = V, X3 = R | | | | SEQ ID NO: 11, X1 = S, X2 = I |
| hu1C5F12E9-V15 | | | | SEQ ID NO: 9, X1 = R, X2 = V, X3 = V | | | | SEQ ID NO: 11, X1 = S, X2 = I |
| hu1C5F12E9-V16 | | | | SEQ ID NO: 9, X1 = R, X2 = A, X3 = R | | | | SEQ ID NO: 11, X1 = S, X2 = I |
| hu1C5F12E9-V17 | | | | SEQ ID NO: 9, X1 = K, X2 = A, X3 = R | | | | SEQ ID NO: 11, X1 = S, X2 = I |
| hu1C5F12E9-V18 | | | | SEQ ID NO: 9, X1 = K, X2 = A, X3 = V | | | | SEQ ID NO: 11, X1 = S, X2 = I |

TABLE 1-continued

Amino acid sequence ID numbers of heavy/light chain variable regions

| Antibody | Heavy chain | | | | Light chain | | | |
|---|---|---|---|---|---|---|---|---|
| | $V_H$ CDR1 | $V_H$ CDR2 | $V_H$ CDR3 | $V_H$ | $V_L$ CDR1 | $V_L$ CDR2 | $V_L$ CDR3 | $V_L$ |
| Mouse D1D8H9F7 | SEQ ID NO.: 37 | SEQ ID NO.: 38 | SEQ ID NO.: 39 | SEQ ID NO.: 43 | SEQ ID NO.: 40 | SEQ ID NO.: 41 | SEQ ID NO.: 42 | SEQ ID NO.: 44 |
| Mouse D1C2H1H1 | SEQ ID NO.: 47 | SEQ ID NO.: 48 | SEQ ID NO.: 49 | SEQ ID NO.: 53 | SEQ ID NO.: 50 | SEQ ID NO.: 51 | SEQ ID NO.: 52 | SEQ ID NO.: 54 |

In another embodiment, an antibody of the disclosure, or an antigen binding portion thereof, comprises:
(a) the CDR1, CDR2, and CDR3 regions of the heavy chain variable region listed above in Table 1; and
(b) the CDR1, CDR2, and CDR3 regions of the light chain variable region listed above in Table 1 or the CDRs of another anti-TSLP antibody, wherein the antibody specifically binds human TSLP.

In yet another embodiment, the antibody, or antigen binding portion thereof, includes the heavy chain variable CDR2 region of anti-TSLP antibody combined with CDRs of other antibodies which bind human TSLP, e.g., CDR1 and/or CDR3 from the heavy chain variable region, and/or CDR1, CDR2, and/or CDR3 from the light chain variable region of a different anti-TSLP antibody.

In addition, it is well known in the art that the CDR3 domain, independently from the CDR1 and/or CDR2 domain(s), alone can determine the binding specificity of an antibody for a cognate antigen and that multiple antibodies can predictably be generated having the same binding specificity based on a common CDR3 sequence. See, e.g., Klimka et al., British J. of Cancer 83 (2): 252-260 (2000); Beiboer et al., J. Mol. Biol. 296:833-849 (2000); Rader et al., Proc. Natl. Acad. Sci. U.S.A. 95:8910-8915 (1998); Barbas et al., J. Am. Chem. Soc. 116:2161-2162 (1994); Barbas et al., Proc. Natl. Acad. Sci. U.S.A. 92:2529-2533 (1995); Ditzel et al., J. Immunol. 157:739-749 (1996); Berezov et al., BIA-journal 8: Scientific Review 8 (2001); Igarashi et al., J. Biochem (Tokyo) 117:452-7 (1995); Bourgeois et al., J. Virol 72:807-10 (1998); Levi et al, Proc. Natl. Acad. Sci. U.S.A. 90:4374-8 (1993); Polymenis and Stoller, J. Immunol. 152: 5218-5329 (1994) and Xu and Davis, Immunity 13:37-45 (2000). See also, U.S. Pat. Nos. 6,951,646; 6,914,128; 6,090,382; 6,818,216; 6,156,313; 6,827,925; 5,833,943; 5,762,905 and 5,760,185. Each of these references is hereby incorporated by reference in its entirety.

Accordingly, in another embodiment, antibodies of the disclosure comprise the CDR2 of the heavy chain variable region of the anti-TSLP antibody and at least the CDR3 of the heavy and/or light chain variable region of the anti-TSLP antibody, or the CDR3 of the heavy and/or light chain variable region of another anti-TSLP antibody, wherein the antibody is capable of specifically binding to human TSLP. These antibodies preferably (a) compete for binding with TSLP; (b) retain the functional characteristics; (c) bind to the same epitope; and/or (d) have a similar binding affinity as the anti-TSLP antibody of the present disclosure. In yet another embodiment, the antibodies further may comprise the CDR2 of the light chain variable region of the anti-TSLP antibody, or the CDR2 of the light chain variable region of another anti-TSLP antibody, wherein the antibody is capable of specifically binding to human TSLP. In another embodiment, the antibodies of the disclosure further may include the CDR1 of the heavy and/or light chain variable region of the anti-TSLP antibody, or the CDR1 of the heavy and/or light chain variable region of another anti-TSLP antibody, wherein the antibody is capable of specifically binding to human TSLP.

Conservative Modifications

In another embodiment, an antibody of the disclosure comprises a heavy and/or light chain variable region sequences of CDR1, CDR2 and CDR3 sequences which differ from those of the anti-TSLP antibodies of the present disclosure by one or more conservative modifications. It is understood in the art that certain conservative sequence modification can be made which do not remove antigen binding. See, e.g., Brummell et al., (1993) Biochem 32:1180-8; de Wildt et al., (1997) Prot. Eng. 10:835-41; Komissarov et al., (1997) J. Biol. Chem. 272:26864-26870; Hall et al., (1992) J Immunol. 149:1605-12; Kelley and O'Connell (1993) Biochem. 32:6862-35; Adib-Conquy et al., (1998) Int. Immunol. 10:341-6 and Beers et al., (2000) Clin. Can. Res. 6:2835-43.

Accordingly, in one embodiment, the antibody comprises a heavy chain variable region comprising CDR1, CDR2, and CDR3 sequences and/or a light chain variable region comprising CDR1, CDR2, and CDR3 sequences, wherein:
(a) the heavy chain variable region CDR1 sequence comprises a sequence listed in Table 1 above, and/or conservative modifications thereof; and/or
(b) the heavy chain variable region CDR2 sequence comprises a sequence listed in Table 1 above, and/or conservative modifications thereof; and/or
(c) the heavy chain variable region CDR3 sequence comprises a sequence listed in Table 1 above, and/or conservative modifications thereof; and/or
(d) the light chain variable region CDR1, and/or CDR2, and/or CDR3 sequences comprise the sequence(s) listed in Table 1 above; and/or conservative modifications thereof; and
(e) the antibody specifically binds human TSLP.

The antibody of the present disclosure possesses one or more of the following functional properties described above, such as high affinity binding to human TSLP.

In various embodiments, the antibody can be, for example, a mouse, human, humanized or chimeric antibody.

As used herein, the term "conservative sequence modifications" is intended to refer to amino acid modifications that do not significantly affect or alter the binding characteristics of the antibody containing the amino acid sequence. Such conservative modifications include amino acid substitutions, additions and deletions. Modifications can be introduced into an antibody of the disclosure by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Thus, one or more amino acid residues within the CDR regions of an antibody of the disclosure can be replaced with other amino acid residues from the same side chain family and the altered antibody can be tested for retained function (i.e., the functions set forth above) using the functional assays described herein.

Engineered and Modified Antibodies

Antibodies of the disclosure can be prepared using an antibody having one or more of the $V_H/V_L$ sequences of the anti-TSLP antibody of the present disclosure as starting material to engineer a modified antibody. An antibody can be engineered by modifying one or more residues within one or both variable regions (i.e., $V_H$ and/or $V_L$), for example within one or more CDR regions and/or within one or more framework regions. Additionally or alternatively, an antibody can be engineered by modifying residues within the constant region(s), for example to alter the effector function(s) of the antibody.

In certain embodiments, CDR grafting can be used to engineer variable regions of antibodies. Antibodies interact with target antigens predominantly through amino acid residues that are located in the six heavy and light chain complementarity determining regions (CDRs). For this reason, the amino acid sequences within CDRs are more diverse between individual antibodies than sequences outside of CDRs. Because CDR sequences are responsible for most antibody-antigen interactions, it is possible to express recombinant antibodies that mimic the properties of specific naturally occurring antibodies by constructing expression vectors that include CDR sequences from the specific naturally occurring antibody grafted onto framework sequences from a different antibody with different properties (see, e.g., Riechmann et al., (1998) *Nature* 332:323-327; Jones et al., (1986) *Nature* 321:522-525; Queen et al., (1989) *Proc. Natl. Acad. See also U.S.A.* 86:10029-10033; U.S. Pat. Nos. 5,225,539; 5,530,101; 5,585,089; 5,693,762 and 6,180,370).

Accordingly, another embodiment of the disclosure pertains to an isolated monoclonal antibody, or antigen binding portion thereof, comprising a heavy chain variable region comprising CDR1, CDR2, and CDR3 sequences comprising the sequences of the present disclosure, as described above, and/or a light chain variable region comprising CDR1, CDR2, and CDR3 sequences comprising the sequences of the present disclosure, as described above. While these antibodies contain the $V_H$ and $V_L$ CDR sequences of the monoclonal antibody of the present disclosure, they can contain different framework sequences.

Such framework sequences can be obtained from public DNA databases or published references that include germline antibody gene sequences. For example, germline DNA sequences for human heavy and light chain variable region genes can be found in the "VBase" human germline sequence database (available on the Internet at mrc-cpe.cam.ac.uk/vbase), as well as in Kabat et al., (1991), cited supra; Tomlinson et al., (1992) *J. Mol. Biol.* 227:776-798; and Cox et al., (1994) *Eur. J. Immunol.* 24:827-836; the contents of each of which are expressly incorporated herein by reference. As another example, the germline DNA sequences for human heavy and light chain variable region genes can be found in the Genbank database. For example, the following heavy chain germline sequences found in the HCo7 HuMAb mouse are available in the accompanying Genbank Accession Nos.: 1-69 (NG-0010109, NT-024637 & BC070333), 3-33 (NG-0010109 & NT-024637) and 3-7 (NG-0010109 & NT-024637). As another example, the following heavy chain germline sequences found in the HCo12 HuMAb mouse are available in the accompanying Genbank Accession Nos.: 1-69 (NG-0010109, NT-024637 & BC070333), 5-51 (NG-0010109 & NT-024637), 4-34 (NG-0010109 & NT-024637), 3-30.3 (CAJ556644) & 3-23 (AJ406678).

Antibody protein sequences are compared against a compiled protein sequence database using one of the sequence similarity searching methods called the Gapped BLAST (Altschul et al., (1997), supra), which is well known to those skilled in the art.

Preferred framework sequences for use in the antibodies of the disclosure are those that are structurally similar to the framework sequences used by antibodies of the disclosure. The $V_H$ CDR1, CDR2, and CDR3 sequences can be grafted onto framework regions that have the identical sequence as that found in the germline immunoglobulin gene from which the framework sequence derives, or the CDR sequences can be grafted onto framework regions that contain one or more mutations as compared to the germline sequences. For example, it has been found that in certain instances it is beneficial to mutate residues within the framework regions to maintain or enhance the antigen binding ability of the antibody (see e.g., U.S. Pat. Nos. 5,530,101; 5,585,089; 5,693,762 and 6,180,370).

Another type of variable region modification is to mutate amino acid residues within the $V_H$ and/or $V_L$ CDR1, CDR2 and/or CDR3 regions to thereby improve one or more binding properties (e.g., affinity) of the antibody of interest. Site-directed mutagenesis or PCR-mediated mutagenesis can be performed to introduce the mutation(s) and the effect on antibody binding, or other functional property of interest, can be evaluated in in vitro or in vivo assays as known in the art. Preferably conservative modifications (as known in the art) are introduced. The mutations can be amino acid substitutions, additions or deletions, but are preferably substitutions. Moreover, typically no more than one, two, three, four or five residues within a CDR region are altered.

Accordingly, in another embodiment, the disclosure provides isolated anti-TSLP monoclonal antibodies, or antigen binding portions thereof, comprising a heavy chain variable region comprising: (a) a $V_H$ CDR1 region comprising the sequence of the present disclosure, or an amino acid sequence having one, two, three, four or five amino acid substitutions, deletions or additions; (b) a $V_H$ CDR2 region comprising the sequence of the present disclosure, or an amino acid sequence having one, two, three, four or five amino acid substitutions, deletions or additions; (c) a $V_H$ CDR3 region comprising the sequence of the present disclosure, or an amino acid sequence having one, two, three, four or five amino acid substitutions, deletions or additions; (d) a $V_L$ CDR1 region comprising the sequence of the present disclosure, or an amino acid sequence having one, two, three, four or five amino acid substitutions, deletions or additions; (e) a $V_L$ CDR2 region comprising the sequence of the present disclosure, or an amino acid sequence having one, two, three, four or five amino acid substitutions, deletions or additions; and (f) a $V_L$ CDR3 region comprising the sequence of the present disclosure, or an amino acid sequence having one, two, three, four or five amino acid substitutions, deletions or additions.

Engineered antibodies of the disclosure include those in which modifications have been made to framework residues within $V_H$ and/or $V_L$, e.g. to improve the properties of the antibody. Typically, such framework modifications are made to decrease the immunogenicity of the antibody. For example, one approach is to "backmutate" one or more framework residues to the corresponding germline sequence. More specifically, an antibody that has undergone somatic mutation can contain framework residues that differ from the germline sequence from which the antibody is derived. Such residues can be identified by comparing the antibody framework sequences to the germline sequences from which the antibody is derived.

Another type of framework modification involves mutating one or more residues within the framework region, or even within one or more CDR regions, to remove T cell epitopes to thereby reduce the potential immunogenicity of the antibody. This approach is also referred to as "deimmunization" and is described in further detail in U.S. Pat. No. 7,125,689 B2.

In addition, or as an alternative to modifications made within the framework or CDR regions, antibodies of the disclosure can be engineered to include modifications within the Fc region, typically to alter one or more functional properties of the antibody, such as serum half-life, complement fixation, Fc receptor binding, and/or antigen-dependent cellular cytotoxicity. Furthermore, an antibody of the disclosure can be chemically modified (e.g., one or more chemical moieties can be attached to the antibody) or be modified to alter its glycosylation, again to alter one or more functional properties of the antibody.

In one embodiment, the $C_{H1}$-hinge region is modified in such that the number of cysteine residues in the hinge region is altered, e.g., increased or decreased. This approach is described further in U.S. Pat. No. 5,677,425. The number of cysteine residues in the $C_{H1}$-hinge region is altered to, for example, facilitate assembly of the light and heavy chains or to increase or decrease the stability of the antibody.

In another embodiment, the Fchinge region of an antibody is mutated to decrease the biological half-life of the antibody. More specifically, one or more amino acid mutations are introduced into the $C_H2$-$C_H3$ domain interface region of the Fc-hinge fragment such that the antibody has impaired Staphylococcyl protein A (SpA) binding relative to native Fc-hinge domain SpA binding. This approach is described in further detail in U.S. Pat. No. 6,165,745.

In still another embodiment, the glycosylation of an antibody is modified. For example, a glycosylated antibody can be made (i.e., the antibody lacks glycosylation). Glycosylation can be altered to, for example, increase the affinity of the antibody for antigen. Such carbohydrate modifications can be accomplished by, for example, altering one or more sites of glycosylation within the antibody sequence. For example, one or more amino acid substitutions can be made that result in elimination of one or more variable region framework glycosylation sites to thereby eliminate glycosylation at that site. Such aglycosylation may increase the affinity of the antibody for antigen. See, e.g., U.S. Pat. Nos. 5,714,350 and 6,350,861.

Additionally or alternatively, an antibody can be made that has an altered type of glycosylation, such as a hypofucosylated antibody having reduced amounts of fucosyl residues or an antibody having increased bisecting GlcNac structures. Such altered glycosylation patterns have been demonstrated to increase the ADCC ability of antibodies. Such carbohydrate modifications can be accomplished by, for example, expressing the antibody in a host cell with altered glycosylation machinery. Cells with altered glycosylation machinery have been described in the art and can be used as host cells in which to express recombinant antibodies of the disclosure to thereby produce an antibody with altered glycosylation. For example, the cell lines Ms704, Ms705, and Ms709 lack the fucosyltransferase gene, FUT8 (a (1, 6)-fucosyltransferase), such that antibodies expressed in the Ms704, Ms705, and Ms709 cell lines lack fucose on their carbohydrates. The Ms704, Ms705, and Ms709 FUT8-/- cell lines were created by the targeted disruption of the FUT8 gene in CHO/DG44 cells using two replacement vectors (see U.S. Patent Publication No. 20040110704 and Yamane-Ohnuki et al., (2004) Biotechnol Bioeng 87:614-22). As another example, EP 1,176,195 describes a cell line with a functionally disrupted FUT8 gene, which encodes a fucosyl transferase, such that antibodies expressed in such a cell line exhibit hypofucosylation by reducing or eliminating the a-1, 6 bond-related enzyme. EP 1,176,195 also describes cell lines which have a low enzyme activity for adding fucose to the N-acetylglucosamine that binds to the Fc region of the antibody or does not have the enzyme activity, for example the rat myeloma cell line YB2/0 (ATCC CRL 1662). PCT Publication WO 03/035835 describes a variant CHO cell line, Lecl3 cells, with reduced ability to attach fucose to Asn (297)-linked carbohydrates, also resulting in hypofucosylation of antibodies expressed in that host cell (see also Shields et al., (2002) J. Biol. Chem. 277: 26733-26740). Antibodies with a modified glycosylation profile can also be produced in chicken eggs, as described in PCT Publication WO 06/089231. Alternatively, antibodies with a modified glycosylation profile can be produced in plant cells, such as Lemna. Methods for production of antibodies in a plant system are disclosed in the U.S. patent application corresponding to Alston & Bird LLP, filed on Aug. 11, 2006. PCT Publication WO 99/54342 describes cell lines engineered to express glycoprotein-modifying glycosyl transferases (e.g., 0 (1,4)-N-acetylglucosaminyltransferase III (GnTIII)) such that antibodies expressed in the engineered cell lines exhibit increased bisecting GlcNac structures which results in increased ADCC activity of the antibodies (see also Umana et al., (1999) Nat. Biotech. 17:176-180). Alternatively, the fucose residues of the antibody can be cleaved off using a fucosidase enzyme; e.g., the fucosidase a-L-fucosidase removes fucosyl residues from antibodies (Tarentino et al., (1975) Biochem. 14:5516-23).

Another modification of the antibodies herein that is contemplated by this disclosure is pegylation. An antibody can be pegylated to, for example, increase the biological (e.g., serum) half-life of the antibody. To pegylate an antibody, the antibody, or fragment thereof, typically is reacted with polyethylene glycol (PEG), such as a reactive ester or aldehyde derivative of PEG, under conditions in which one or more PEG groups become attached to the antibody or antibody fragment. Preferably, the pegylation is carried out via an acylation reaction or an alkylation reaction with a reactive PEG molecule (or an analogous reactive water-soluble polymer). As used herein, the term "polyethylene glycol" is intended to encompass any of the forms of PEG that have been used to derivatize other proteins, such as mono (Ci-Cio) alkoxy- or aryloxy-polyethylene glycol or polyethylene glycol-maleimide. In certain embodiments, the antibody to be pegylated is an aglycosylated antibody. Methods for pegylating proteins are known in the art and can be applied to the antibodies of the disclosure. See, e.g., EPO 154 316 and EP 0 401 384.

Antibody's Physical Properties

Antibodies of the disclosure can be characterized by their various physical properties, to detect and/or differentiate different classes thereof.

For example, antibodies can contain one or more glycosylation sites in either the light or heavy chain variable region. Such glycosylation sites may result in increased immunogenicity of the antibody or an alteration of the pK of the antibody due to altered antigen binding (Marshall et al (1972) *Annu Rev Biochem* 41:673-702; Gala and Morrison (2004) *J Immunol* 172:5489-94; Wallick et al (1988) *J Exp Med* 168:1099-109; Spiro (2002) *Glycobiology* 12: 43R-56R; Parekh et al (1985) *Nature* 316:452-7; Mimura et al., (2000) *Mol Immunol* 37:697-706). Glycosylation has been known to occur at motifs containing an N-X-S/T sequence. In some instances, it is preferred to have an anti-TSLP antibody that does not contain variable region glycosylation. This can be achieved either by selecting antibodies that do not contain the glycosylation motif in the variable region or by mutating residues within the glycosylation region.

In a preferred embodiment, the antibodies do not contain asparagine isomerism sites. The deamidation of asparagine may occur on N-G or D-G sequences and result in the creation of an isoaspartic acid residue that introduces a link into the polypeptide chain and decreases its stability (isoaspartic acid effect).

Each antibody will have a unique isoelectric point (pI), which generally falls in the pH range between 6 and 9.5. The pI for an IgG1 antibody typically falls within the pH range of 7-9.5 and the pI for an IgG4 antibody typically falls within the pH range of 6-8. There is speculation that antibodies with a pI outside the normal range may have some unfolding and instability under in vivo conditions. Thus, it is preferred to have an anti-TSLP antibody that contains a pI value that falls in the normal range. This can be achieved either by selecting antibodies with a pI in the normal range or by mutating charged surface residues.

Nucleic Acid Molecules Encoding Antibodies of the Disclosure

In another aspect, the disclosure provides nucleic acid molecules that encode heavy and/or light chain variable regions, or CDRs, of the antibodies of the disclosure. The nucleic acids can be present in whole cells, in a cell lysate, or in a partially purified or substantially pure form. A nucleic acid is "isolated" or "rendered substantially pure" when purified away from other cellular components or other contaminants, e.g., other cellular nucleic acids or proteins, by standard techniques. A nucleic acid of the disclosure can be, e.g., DNA or RNA and may or may not contain intronic sequences. In a preferred embodiment, the nucleic acid is a cDNA molecule.

Nucleic acids of the disclosure can be obtained using standard molecular biology techniques. For antibodies expressed by hybridomas (e.g., hybridomas prepared from transgenic mice carrying human immunoglobulin genes as described further below), cDNAs encoding the light and heavy chains of the antibody made by the hybridoma can be obtained by standard PCR amplification or cDNA cloning techniques. For antibodies obtained from an immunoglobulin gene library (e.g., using phage display techniques), a nucleic acid encoding such antibodies can be recovered from the gene library.

Preferred nucleic acids molecules of the disclosure include those encoding the $V_H$ and $V_L$ sequences of the TSLP monoclonal antibody or the CDRs. Once DNA fragments encoding $V_H$ and $V_L$ segments are obtained, these DNA fragments can be further manipulated by standard recombinant DNA techniques, for example to convert the variable region genes to full-length antibody chain genes, to Fab fragment genes or to a scFv gene. In these manipulations, a $V_L$- or $V_H$-encoding DNA fragment is operatively linked to another DNA fragment encoding another protein, such as an antibody constant region or a flexible linker. The term "operatively linked", as used in this context, is intended to mean that the two DNA fragments are joined such that the amino acid sequences encoded by the two DNA fragments remain in-frame.

The isolated DNA encoding the $V_H$ region can be converted to a full-length heavy chain gene by operatively linking the $V_H$-encoding DNA to another DNA molecule encoding heavy chain constant regions ($C_{H1}$, $C_H2$ and $C_H3$). The sequences of human heavy chain constant region genes are known in the art and DNA fragments encompassing these regions can be obtained by standard PCR amplification. The heavy chain constant region can be an IgG1, IgG2, IgG3, IgG4, IgA, IgE, IgM or IgD constant region, but most preferably is an IgG1 or IgG4 constant region. For a Fab fragment heavy chain gene, the $V_H$-encoding DNA can be operatively linked to another DNA molecule encoding only the heavy chain $C_{H1}$ constant region.

The isolated DNA encoding the $V_L$ region can be converted to a frill-length light chain gene (as well as a Fab light chain gene) by operatively linking the $V_L$-encoding DNA to another DNA molecule encoding the light chain constant region, $C_L$. The sequences of human light chain constant region genes are known in the art and DNA fragments encompassing these regions can be obtained by standard PCR amplification. In preferred embodiments, the light chain constant region can be a kappa or lambda constant region.

To create a scFv gene, the $V_H$- and $V_L$-encoding DNA fragments are operatively linked to another fragment encoding a flexible linker, e.g., encoding the amino acid sequence (Gly4-Ser) 3, such that the $V_H$ and $V_L$ sequences can be expressed as a contiguous single-chain protein, with the $V_L$ and $V_H$ regions joined by the flexible linker (see e.g., Bird et al., (1988) *Science* 242:423-426; Huston et al., (1988) *Proc. Natl. Acad. Sci. USA* 85:5879-5883; McCafferty et al., (1990) *Nature* 348:552-554).

Production of Monoclonal Antibodies of the Disclosure

Monoclonal antibodies (mAbs) of the present disclosure can be produced using the well-known somatic cell hybridization (hybridoma) technique of Kohler and Milstein (1975) *Nature* 256:495. Other embodiments for producing monoclonal antibodies include viral or oncogenic transformation of B lymphocytes and phage display techniques. Chimeric or humanized antibodies are also well known in the art. See e.g., U.S. Pat. Nos. 4,816,567; 5,225,539; 5,530,101; 5,585,089; 5,693,762 and 6,180,370, the contents of which are specifically incorporated herein by reference in their entirety.

Generation of Transfectomas Producing Monoclonal Antibodies of the Disclosure

Antibodies of the disclosure also can be produced in a host cell transfectoma using, for example, a combination of recombinant DNA techniques and gene transfection methods as is well known in the art (e.g., Morrison, S. (1985) *Science* 229:1202). In one embodiment, DNA encoding partial or full-length light and heavy chains obtained by standard molecular biology techniques is inserted into one or more expression vectors such that the genes are operatively linked to transcriptional and translational regulatory sequences. In this context, the term "operatively linked" is intended to mean that an antibody gene is ligated into a vector such that transcriptional and translational control sequences within the vector serve their intended function of regulating the transcription and translation of the antibody gene.

The term "regulatory sequence" is intended to include promoters, enhancers and other expression control elements (e.g., polyadenylation signals) that control the transcription or translation of the antibody genes. Such regulatory sequences are described, e.g., in Goeddel (Gene Expression Technology. Methods in Enzymology 185, Academic Press, San Diego, Calif. (1990)).

Preferred regulatory sequences for mammalian host cell expression include viral elements that direct high levels of protein expression in mammalian cells, such as promoters and/or enhancers derived from cytomegalovirus (CMV), Simian Virus 40 (SV40), adenovirus, e.g., the adenovirus major late promoter (AdMLP) and polyoma. Alternatively, nonviral regulatory sequences can be used, such as the ubiquitin promoter or β-globin promoter. Still further, regulatory elements composed of sequences from different sources, such as the SRa promoter system, which contains sequences from the SV40 early promoter and the long terminal repeat of human T cell leukemia virus type 1 (Takebe et al., (1988) Mol. Cell. Biol. 8:466-472). The expression vector and expression control sequences are chosen to be compatible with the expression host cell used.

The antibody light chain gene and the antibody heavy chain gene can be inserted into the same or separate expression vectors. In preferred embodiments, the variable regions are used to create full-length antibody genes of any antibody isotype by inserting them into expression vectors already encoding heavy chain constant and light chain constant regions of the desired isotype such that the $V_H$ segment is operatively linked to the $C_H$ segment(s) within the vector and the $V_L$ segment is operatively linked to the $C_L$ segment within the vector. Additionally or alternatively, the recombinant expression vector can encode a signal peptide that facilitates secretion of the antibody chain from a host cell. The antibody chain gene can be cloned into the vector such that the signal peptide is linked in-frame to the amino terminus of the antibody chain gene. The signal peptide can be an immunoglobulin signal peptide or a heterologous signal peptide (i.e., a signal peptide from a non-immunoglobulin protein).

In addition to the antibody chain genes and regulatory sequences, the recombinant expression vectors of the disclosure can carry additional sequences, such as sequences that regulate replication of the vector in host cells (e.g., origins of replication) and selectable marker genes. The selectable marker gene facilitates selection of host cells into which the vector has been introduced (see, e.g., U.S. Pat. Nos. 4,399,216; 4,634,665 and 5,179,017). For example, typically the selectable marker gene confers resistance to drugs, such as G418, hygromycin or methotrexate, on a host cell into which the vector has been introduced. Preferred selectable marker genes include the dihydrofolate reductase (DHFR) gene (for use in dhfr-host cells with methotrexate selection/amplification) and the neo gene (for G418 selection).

For expression of the light and heavy chains, the expression vector(s) encoding the heavy and light chains is transfected into a host cell by standard techniques. The various forms of the term "transfection" are intended to encompass a wide variety of techniques commonly used for the introduction of exogenous DNA into a prokaryotic or eukaryotic host cell, e.g., electroporation, calcium-phosphate precipitation, DEAE-dextran transfection and the like. Although it is theoretically possible to express the antibodies of the disclosure in either prokaryotic or eukaryotic host cells, expression of antibodies in eukaryotic cells, and most preferably mammalian host cells, is the most preferred because such eukaryotic cells, and in particular mammalian cells, are more likely than prokaryotic cells to assemble and secrete a properly folded and immunologically active antibody.

Preferred mammalian host cells for expressing the recombinant antibodies of the disclosure include Chinese Hamster Ovary (CHO cells) (including dhfr-CHO cells, described in Urlaub and Chasin, (1980) *Proc. Natl. Acad. Sci. USA* 77:4216-4220, used with a DHFR selectable marker, e.g., as described in R. J. Kaufman and P. A. Sharp (1982) *J. Mol. Biol.* 159:601-621), NSO myeloma cells, COS cells and SP2 cells. In particular for use with NSO myeloma cells, another preferred expression system is the GS gene expression system disclosed in WO 87/04462, WO 89/01036 and EP 338,841. When recombinant expression vectors encoding antibody genes are introduced into mammalian host cells, the antibodies are produced by culturing the host cells for a period of time sufficient to allow for expression of the antibody in the host cells or, more preferably, secretion of the antibody into the culture medium in which the host cells are grown. Antibodies can be recovered from the culture medium using standard protein purification methods.

Immunoconjugates

Antibodies of the disclosure can be conjugated to a therapeutic agent to form an immunoconjugate such as an antibody-drug conjugate (ADC). Suitable therapeutic agents include cytotoxins, alkylating agents, DNA minor groove binders, DNA intercalators, DNA crosslinkers, histone deacetylase inhibitors, nuclear export inhibitors, proteasome inhibitors, topoisomerase I or II inhibitors, heat shock protein inhibitors, tyrosine kinase inhibitors, antibiotics, and anti-mitotic agents. In the ADC, the antibody and therapeutic agent preferably are conjugated via a linker cleavable such as a peptidyl, disulfide, or hydrazone linker. More preferably, the linker is a peptidyl linker such as Val-Cit, Ala-Val, Val-Ala-Val, Lys-Lys, Pro-Val-Gly-Val-Val, Ala-Asn-Val, Val-Leu-Lys, Ala-Ala-Asn, Cit-Cit, Val-Lys, Lys, Cit, Ser, or Glu. The ADCs can be prepared as described in U.S. Pat. Nos. 7,087,600; 6,989,452; and 7,129,261; PCT Publications WO 02/096910; WO 07/038,658; WO 07/051,081; WO 07/059,404; WO 08/083,312; and WO 08/103,693; U.S. Pat. Nos. 7,691,962; 7,517,903; and 7,714,016; the disclosures of which are incorporated herein by reference.

Bispecific Molecules

In another aspect, the present disclosure features bispecific molecules comprising one or more antibodies of the disclosure linked to at least one other functional molecule, e.g., another peptide or protein (e.g., another antibody or ligand for a receptor) to generate a bispecific molecule that binds to at least two different binding sites or target molecules. Thus, as used herein, "bispecific molecule" includes molecules that have three or more specificities.

In an embodiment, a bispecific molecule has, in addition to an anti-Fc binding specificity and an anti-TSLP binding specificity, a third specificity. The third specificity can be for IgE, IL4, IL4R, IL13, IL13R, IL-5, IL5R or TSLPR/IL7R for asthma treatment.

Bispecific molecules may be in many different formats and sizes. At one end of the size spectrum, a bispecific molecule retains the traditional antibody format, except that, instead of having two binding arms of identical specificity, it has two binding arms each having a different specificity. At the other extreme are bispecific molecules consisting of two single-chain antibody fragments (scFv's) linked by a peptide chain, a so-called Bs(scFv)2 construct. Intermediate-sized bispecific molecules include two different F(ab) fragments linked by a peptidyl linker. Bispecific molecules of these and other formats can be prepared by genetic engineering, somatic hybridization, or chemical methods. See, e.g., Kufer et al, cited supra; Cao and Suresh, Bioconjugate Chemistry, 9 (6), 635-644 (1998); and van Spriel et al., *Immunology Today*, 21 (8), 391-397 (2000), and the references cited therein.

Antibody-Encoding or Antibody-Bearing Oncolytic Virus

An oncolytic virus preferentially infects and kills cancer cells. Antibodies of the present disclosure can be used in conjunction with oncolytic viruses. Alternatively, oncolytic viruses encoding antibodies of the present invention can be introduced into human body.

Chimeric Antigen Receptor

Also provided herein are a chimeric antigen receptor (CAR) containing an anti-TSLP scFv, the anti-TSLP scFv comprising CDRs and heavy/light chain variable regions described herein.

The anti-TSLP CAR may comprise (a) an extracellular antigen binding domain comprising an anti-TSLP scFv; (b) a transmembrane domain; and (c) an intracellular signaling domain.

The CAR may contain a signal peptide at the N-terminus of the extracellular antigen binding domain that directs the nascent receptor into the endoplasmic reticulum, and a hinge peptide at the N-terminus of the extracellular antigen binding domain that makes the receptor more available for binding. The CAR preferably comprises, at the intracellular signaling domain, a primary intracellular signaling domain and one or more co-stimulatory signaling domains. The mainly used and most effective primary intracellular signaling domain is CD3-zeta cytoplasmic domain which contains ITAMs, the phosphorylation of which results in T cell activation. The co-stimulatory signaling domain may be derived from the co-stimulatory proteins such as CD28, CD137 and OX40.

The CARs may further add factors that enhance T cell expansion, persistence, and anti-tumor activity, such as cytokines, and co-stimulatory ligands.

Also provided are engineered immune effector cells, comprising the CAR provided herein. In some embodiments, the immune effector cell is a T cell, an NK cell, a peripheral blood mononuclear cell (PBMC), a hematopoietic stem cell, a pluripotent stem cell, or an embryonic stem cell. In some embodiments, the immune effector cell is a T cell.

Pharmaceutical Compositions

In another aspect, the present disclosure provides a pharmaceutical composition comprising one or more antibodies (or antigen-binding portion thereof, the bispecifics, immunoconjugates, CAR-immune cells, antibody-encoding or antibody-bearing oncolytic viruses, or antibody-encoding nucleic acid molecules) of the present disclosure formulated together with a pharmaceutically acceptable carrier. The antibodies (or antigen-binding portion thereof, or the bispecifics) can be dosed separately when the composition contains more than one antibody (or antigen-binding portion thereof, or the bispecifics). The composition may optionally contain one or more additional pharmaceutically active ingredients, such as another antibody or a drug, such as an anti-asthma drug, an anti-ulcerative colitis drug, an anti-atopic dermatitis drug, or an anti-psoriasis drug.

The pharmaceutical composition can comprise any number of excipients. Excipients that can be used include carriers, surface active agents, thickening or emulsifying agents, solid binders, dispersion or suspension aids, solubilizers, colorants, flavoring agents, coatings, disintegrating agents, lubricants, sweeteners, preservatives, isotonic agents, and combinations thereof. The selection and use of suitable excipients are taught in Gennaro, ed., Remington: *The Science and Practice of Pharmacy*, 20th Ed. (Lippincott Williams & Wilkins 2003), the disclosure of which is incorporated herein by reference.

Preferably, the pharmaceutical composition is suitable for intravenous, intramuscular, subcutaneous, parenteral, spinal or epidermal administration (e.g., by injection or infusion). Depending on the route of administration, the active ingredient can be coated in a material to protect it from the action of acids and other natural conditions that may inactivate it. The phrase "parenteral administration" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion. Alternatively, an antibody of the disclosure can be administered via a non-parenteral route, such as a topical, epidermal or mucosal route of administration, e.g., intranasally, orally, vaginally, rectally, sublingually or topically.

Pharmaceutical compositions can be in the form of sterile aqueous solutions or dispersions. They can also be formulated in a microemulsion, liposome, or other ordered structure suitable to high drug concentration.

The amount of active ingredient which can be combined with a carrier material to produce a single dosage form will vary depending upon the subject being treated and the particular mode of administration and will generally be that amount of the composition which produces a therapeutic effect. Generally, out of one hundred percent, this amount will range from about 0.01% to about ninety-nine percent of active ingredient, preferably from about 0.1% to about 70%, most preferably from about 1% to about 30% of active ingredient in combination with a pharmaceutically acceptable carrier.

Dosage regimens are adjusted to provide the optimum desired response (e.g., a therapeutic response). For example, a single bolus can be administered, several divided doses can be administered over time or the dose can be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active ingredient calculated to produce the desired therapeutic effect in association with the required pharmaceutical carrier. Alternatively, antibody can be administered as a sustained release formulation, in which case less frequent administration is required.

For administration of the composition, the dosage may range from e.g., about 0.0001 to 100 mg/kg of the host body weight. The treatment regime may comprise administration e.g., once per week.

A "therapeutically effective dosage" of an anti-TSLP antibody, or the antigen-binding portion thereof, or the bispecifics, CAR-immune cells, oncolytic viruses, immunoconjugates of the disclosure preferably results in a decrease in severity of disease symptoms, an increase in frequency and duration of disease symptom-free periods, or a prevention of impairment or disability due to the disease affliction. For example, for the treatment of tumor-bearing subjects, a "therapeutically effective dosage" preferably inhibits tumor growth by at least about 20%, more preferably by at least about 40%, even more preferably by at least about 60%, and still more preferably by at least about 80% relative to untreated subjects. A therapeutically effective amount of a therapeutic antibody can decrease tumor size, or otherwise ameliorate symptoms in a subject, which is typically a human or can be another mammal.

The pharmaceutical composition can be a controlled release formulation, including implants, transdermal patches, and microencapsulated delivery systems. Biodegradable, biocompatible polymers can be used, such as ethylene vinyl acetate, polyanhydrides, polyglycolic acid, collagen, polyorthoesters, and polylactic acid. See, e.g., Sustained and Controlled Release Drug Delivery Systems, J. R. Robinson, ed., Marcel Dekker, Inc., New York, 1978.

Therapeutic compositions can be administered via medical devices such as (1) needleless hypodermic injection devices (e.g., U.S. Pat. Nos. 5,399,163; 5,383,851; 5,312,335; 5,064,413; 4,941,880; 4,790,824; and 4,596,556); (2) micro-infusion pumps (U.S. Pat. No. 4,487,603); (3) transdermal devices (U.S. Pat. No. 4,486,194); (4) infusion apparatuses (U.S. Pat. Nos. 4,447,233 and 4,447,224); and (5) osmotic devices (U.S. Pat. Nos. 4,439,196 and 4,475,196); the disclosures of which are incorporated herein by reference.

In certain embodiments, the monoclonal antibodies of the disclosure can be formulated to ensure proper distribution in vivo. For example, to ensure that the therapeutic antibody of the disclosure cross the blood-brain barrier, they can be formulated in liposomes, which may additionally comprise targeting moieties to enhance selective transport to specific cells or organs. See, e.g. U.S. Pat. Nos. 4,522,811; 5,374,548; 5,416,016; and 5,399,331; V. V. Ranade (1989) J. Clin. Pharmacol.29:685; Umezawa et al., (1988) Biochem. Biophys. Res. Commun. 153:1038; Bloeman et al., (1995) FEBS Lett.357:140; M. Owais et al., (1995) Antimicrob. Agents Chemother. 39:180; Briscoe et al., (1995) Am. J. Physiol. 1233:134; Schreier et al., (1994) J. Biol. Chem. 269:9090; Keinanen and Laukkanen (1994) FEBS Lett. 346:123; and Killion and Fidler (1994) Immunomethods 4:273.

Uses and Methods of the Disclosure

The composition comprising the antibodies or the antigen-binding portion thereof, or the bispecific molecules, immunoconjugates, CAR-immune cells, antibody-encoding or antibody-bearing oncolytic viruses, or antibody-encoding nucleic acid molecules of the present disclosure have numerous in vitro and in vivo utilities involving, for example, treatment of asthma, ulcerative colitis, atopic dermatitis or psoriasis. The antibodies can be administered to human subjects, e.g., in vivo, to alleviate these diseases.

In another aspect, the disclosure provides methods of combination therapy in which the anti-TSLP antibodies, or antigen-binding portion thereof, or the bispecifics, immunoconjugates, CAR-immune cells, antibody-encoding or antibody-bearing oncolytic viruses of the present disclosure are co-administered with one or more additional antibodies that are effective in alleviate asthma, ulcerative colitis, atopic dermatitis or psoriasis in a subject. In one embodiment, the disclosure provides a method for treating asthma in a subject comprising administering to the subject an anti-TSLP antibody (or antigen-binding portion thereof, the specific antibody, the immunoconjugate, the CAR-immune cell, the antibody-encoding or antibody-bearing oncolytic virus, or the antibody-encoding nucleic acid molecule) and one or more additional antibodies, such as an anti-TSLPR antibody, an anti-IL4 antibody, an anti-IL4R antibody, an anti-IL13 antibody, an anti-IL13R antibody, an anti-IL-5 antibody, an anti-IL5R antibody, and/or an anti-IgE antibody. In certain embodiments, the subject is human.

The TSLP signaling blocking can also be further combined with standard disease treatments, such as asthma treatment. For example, TSLP signaling blocking can be combined with administration of the antibodies mentioned above for asthma treatment, and reduction or avoidance of exposure to allergens.

The combination of therapeutic agents discussed herein can be administered concurrently as a single composition in a pharmaceutically acceptable carrier, or concurrently as separate compositions with each agent in a pharmaceutically acceptable carrier. In another embodiment, the combination of therapeutic agents can be administered sequentially.

Furthermore, if more than one dose of the combination therapy is administered sequentially, the order of the sequential administration can be reversed or kept in the same order at each time point of administration, sequential administrations can be combined with concurrent administrations, or any combination thereof.

The present disclosure is further illustrated by the following examples, which should not be construed as further limiting. The contents of all figures and all references, Genbank sequences, patents and published patent applications cited throughout this application are expressly incorporated herein by reference.

Example 1 Generation of Mouse Anti-TSLP Monoclonal Antibodies Using Hybridoma Technology Immunization Mice were immunized according to the method as described in E Harlow, D. Lane, Antibody: A Laboratory Manual, Cold Spring Harbor Laboratory Press, Cold Spring Harbor, N.Y., 1998. Recombinant human TSLP protein (Biosion Inc., amino acid residue 21-159 of Uniprot No. Q969D9) with human IgG1 Fc tag at the C-terminus was used as the immunogen. Human TSLP-his protein (Biosion Inc., Cat #P100273) was used for determining anti-sera titer and for screening hybridomas secreting antigen-specific antibodies. Immunizing dosages contained 25 μg human TSLP-Fc protein/mouse/injection for both primary and boost immunizations. To increase immune response, the complete Freud's adjuvant and incomplete Freud's adjuvant (Sigma®, St. Louis, Mo., USA) were used respectively for primary and boost immunizations. Briefly, adjuvant-antigen mixture was prepared by first gently mixing the adjuvant in a vial using a vortex. The desired amount of adjuvant was transferred to an autoclaved 1.5 mL micro-centrifuge tube. The antigen was prepared in PBS or saline with concentrations ranging from 0.25-0.34 mg/ml. The calculated amount of antigen was then added to the micro-centrifuge tube with the adjuvant, and the resulting mixture was mixed by gently vortexing for 2 minutes to generate water-in-oil emulsions. The adjuvant-antigen emulsion was then drawn into the proper syringe for animal injection. A total of 25 μg of antigen was injected in a volume of 150-200 μl. Each animal was immunized, and then boosted for 3 to 4 times depending on the anti-sera titer. Animals with good titers were given a final boost by intraperitoneal injection before fusion.

Hybridoma Fusion and Screening

Cells of murine myeloma cell line (SP2/0-Ag14, ATCC #CRL-1581) were cultured to reach the log phase stage right before fusion. Spleen cells from immunized mice were prepared sterilely and fused with myeloma cells according to the method as described in Kohler G, and Milstein C, "Continuous cultures of fused cells secreting antibody of predefined specificity," *Nature,* 256:495-497 (1975). Fused "hybrid cells" were subsequently dispensed into 96-well plates in DMEM/20% FCS/HAT media. Surviving hybridoma colonies were observed under the microscope seven to ten days post fusion. After two weeks, the supernatant from each well was subject to Capture ELISA using recombinant human TSLP-his protein. Positive hybridoma clones producing antibodies that showed high specific TSLP binding activities were subcloned by limited dilution to ensure the clonality of the cell line, and then the generated monoclonal antibodies were purified. Briefly, Protein A sepharose column (from Bestchrom (Shanghai) Biosciences, Cat #AA0273) was washed using PBS buffer in 5 to 10 column volumes. Cell supernatants were passed through the columns, and then the columns were washed using PBS buffer until the absorbance for protein reached the baseline. The columns were eluted with elution buffer (0.1 M Glycine-HCl, pH 2.7), and immediately collected into 1.5 ml tubes with neutralizing buffer (1 M Tris-HCl, pH 9.0). Fractions containing immunoglobulins were pooled and dialyzed in PBS overnight at 4° C. Subsequently, the in vitro functional activities of purified monoclonal antibodies were characterized as follows.

Example 2 Affinity Determination of Exemplary Mouse Anti-TSLP Monoclonal Antibodies Using BIACORE® Surface Plasmon Resonance The purified anti-TSLP mouse monoclonal antibodies (mAbs) generated in Example 1 were characterized for the binding affinities and binding kinetics by Biacore® T200 system (GE Healthcare™, Pittsburgh, PA, USA).

Briefly, Biosion® in house synthesized recombinant human TSLP-his (SEQ ID NO.: 28) or cynomolgus monkey TSLP-his protein (SEQ ID NO.: 29) in $CH_3COONa$ buffer (provided by Biocore®) at the concentration of 10 μg/mL was covalently linked to a CM5 chip (carboxy methyl dextran coated chip from GE Healthcare™ #BR100530) via primary amines, using a standard amine coupling kit provided by Biacore (GE Healthcare™, Pittsburgh, PA, USA). Un-reacted moieties on the biosensor surface were blocked with ethanolamine. Then, serially diluted purified anti-TSLP antibodies (2-fold serial dilution in HBS-EP+ buffer, starting at 100 nM) and Tezepelumab as a benchmark (also referred to as TSLP-BM, prepared in-house using the heavy chain and light chain amino acids set forth in SEQ ID NOs.: 35 and 36, 2-fold serial dilution in HBS-EP+ buffer starting at 100 nM) were respectively flowed onto the chip at a flow rate of 50 μL/min. The antigen-antibody association kinetics was followed for 4 minutes and the dissociation kinetics was followed for 13 minutes. The association and dissociation curves were fit to a 1:1 Langmuir binding model using BIAcore® evaluation software, and the $K_D$, $K_a$ and $K_d$ values were determined and shown in Table 2 below.

TABLE 2

Binding affinities of mouse anti-TSLP antibodies

| | Kinetics on Biacore | | | | | |
|---|---|---|---|---|---|---|
| | Human TSLP | | | cynomolgus TSLP | | |
| Mouse mAb | $K_a$ ($M^{-1}s^{-1}$) | $K_d$ ($s^{-1}$) | $K_D$ (M) | $K_a$ ($M^{-1}s^{-1}$) | $K_d$ ($s^{-1}$) | $K_D$ (M) |
| 1F5H12D7 | 8.97E+04 | <1.00E−05 | <1.12E−10 | | not tested | |
| 1G3B9B1 | 9.36E+04 | <1.00E−05 | <1.07E−10 | | not tested | |
| 1G2H12A1 | 8.52E+04 | <1.00E−05 | <1.17E−10 | | not tested | |
| 1H3F11B7 | 9.29E+04 | <1.00E−05 | <1.08E−10 | | not tested | |
| 1B5D5A5 | | not tested | | | not tested | |
| 1C5F12E9 | 9.11E+04 | <1.00E−05 | <1.10E−10 | | not tested | |
| Tezepelumab | 2.25E+05 | 3.04E−05 | 1.35E−10 | | not tested | |
| D1D8H9F7 | 1.72E+05 | 3.09E−05 | 1.80E−10 | | No-binding | |
| D1C2H1H1 | 6.72E+05 | <1.00E−05 | <1.49E−11 | / | / | 7.23E−09 |
| Tezepelumab | 5.00E+05 | 5.57E−05 | 1.12E−10 | 6.63E+05 | 4.86E−05 | 7.33E−11 |

All the tested anti-TSLP antibodies specifically bound to human TSLP, with most having higher binding affinities than the benchmark. The antibody D1C2H1H1 also showed binding affinity to monkey TSLP.

Example 3 Binding Capacities of Exemplary Mouse Anti-TSLP Monoclonal Antibodies

The binding activities of all the mouse anti-TSLP antibodies were determined by Capture ELISA and indirect ELISA.

For the capture ELISA, 96-well micro plates were coated with 100 μl of 2 μg/ml AffiniPure® goat anti-mouse IgG Fcγ fragment specific (Jackson Immuno Research, Cat #115-005-008) in PBS and incubated overnight at 4° C. Plates were washed 4 times with wash buffer (PBS+0.05% Tween-20, PBST) and then blocked with 200 μl/well blocking buffer (5% w/v non-fatty milk in PBST) for 2 hours at 37° C. Plates were washed again and incubated with 100 μl of serially diluted anti-TSLP antibodies of the present disclosure, Tezepelumab or hIgG (Hualan Biological Engineering Inc.), 5-fold serial dilution in 2.5% non-fatty milk in PBST starting at 66.7 nM, for 40 minutes at 37° C., and then washed 4 times again. Plates containing captured antibodies were incubated with 100 μl biotin-labeled human TSLP-his proteins (SEQ ID NO.: 28, prepared in-house, 0.23 nM in 2.5% non-fatty milk in PBST) for 40 minutes at 37° C., washed 4 times, and incubated with streptavidin conjugated HRP (1:10000 dilution in PBST, Jackson Immuno Research, Cat #016-030-084, 100 μl/well) for 40 minutes at 37° C. After the final wash, plates were incubated with 100 μl/well TMB (Innoreagents). The reaction was stopped 15 minutes later at room temperature with 50 μl/well 1M $H_2SO_4$, and the absorbance of each well was read on a microplate reader using dual wavelength mode with 450 nm for TMB and 630 nm as the reference wavelength. The OD (450-630) values were plotted against antibody concentration. Data was analyzed using Graphpad Prism® software and $EC_{50}$ values were reported. The results of some antibodies were shown in FIGS. 1A-1B.

Figure 2A:
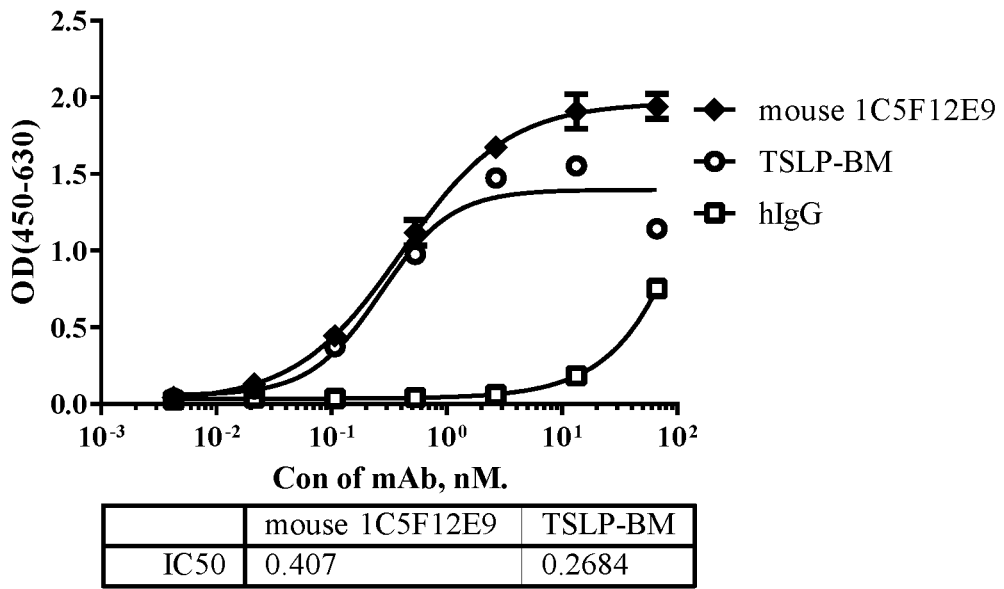
FIGS. 2A-2B show the binding capacities of mouse antibodies 1C5F12E9 (A), D1C2H1H1 and D1D8H9F7 (B) to cynomolgus TSLP in an indirect ELISA.
Figure 2B:
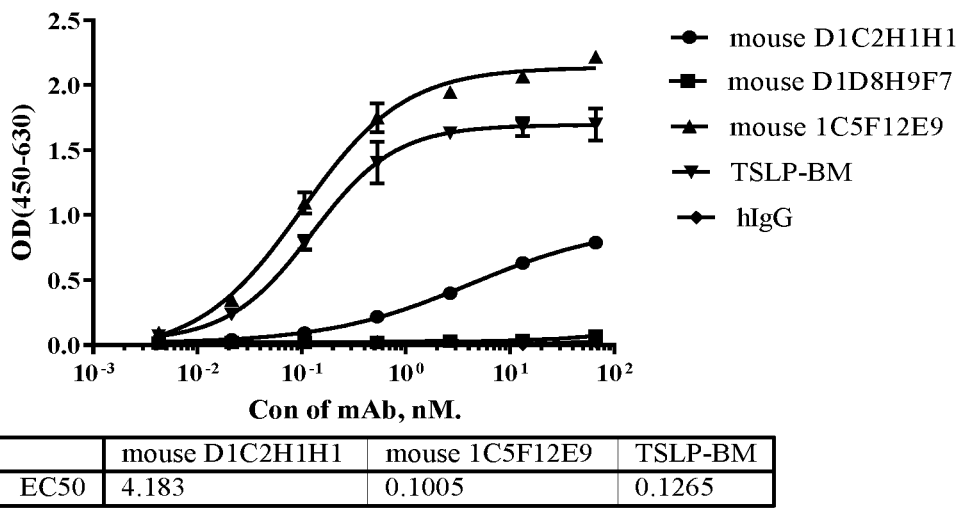

For the indirect ELISA, 96-well micro plates were coated with 100 µl of 2 µg/ml cynomolgus TSLP-his protein (SEQ ID NO.: 29, prepared in-house) in carbonate/bicarbonate buffer (pH 9.6) overnight at 4° C. ELISA plates were washed 4 times with wash buffer (PBS+0.05% Tween-20, PBST) and then blocked with 200 µl/well blocking buffer (5% w/v non-fatty milk in PBST) for 2 hours at 37° C. Plates were washed again and incubated with 100 µl of serially diluted anti-TSLP antibodies of the disclosure, Tezepelumab or hIgG (5-fold serial dilution in 2.5% non-fatty milk in PBST starting at 66.7 nM) for 40 minutes at 37° C. ELISA plates were washed 4 times again and incubated with Peroxidase AffiniPure® F(ab')$_2$ Fragment Goat Anti-Mouse IgG, Fcy Fragment Specific (1:5000 dilution in PBST buffer, Jackson Immunoresearch, Cat #115-036-071, 100 µl/well) for 40 minutes at 37° C. After the final wash, plates were incubated with 100 µl/well TMB (Innoreagents). The reaction was stopped 15 minutes later at room temperature with 50 µl/well 1M $H_2SO_4$, and the absorbance of each well was read on a microplate reader using dual wavelength mode with 450 nm for TMB and 630 nm as the reference wavelength. The OD (450-630) values were plotted against antibody concentration. Data was analyzed using Graphpad Prism® software and $EC_{50}$ values were reported. The results of some antibodies were shown in FIGS. 2A-2B.

Figure 1B:
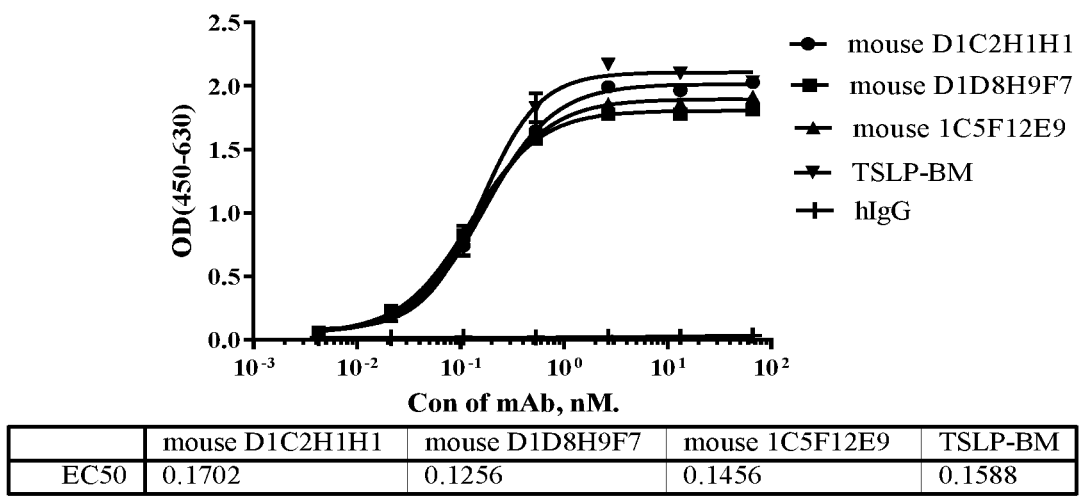

Data showed that most antibodies of the disclosure specifically bound to human and monkey TSLPs. The Emax (maximal binding) and $EC_{50}$ of 1C5F12E9, DID8H9F7 and D1C2H1H1 were similar to those of the benchmark, as shown in FIGS. 1A-1B, wherein DID8H9F7 had lower $EC_{50}$, suggesting it bound to human TSLP more efficiently. It can be seen from FIGS. 2A-2B that 1C5F12E showed higher Emax in monkey TSLP binding assay as compared to the benchmark.

Example 4 Functional Assays on Anti-TSLP Antibodies 4.1 Ligand Blocking ELISA

The abilities of all the anti-TSLP antibodies to block TSLP-TSLPR/IL7R binding were measured using a competitive ELISA assay. Briefly, 100 µl human TSLPR-Fc proteins (SEQ ID NO.: 30, prepared in-house) at 1 µg/mL in PBS, and 100 µl human IL7Ra-Fc proteins (SEQ ID NO.: 31, prepared in-house) at 1 µg/mL in PBS were coated on 96-well micro plates overnight at 4° C. The next day, plates were washed with wash buffer (PBS+0.05% Tween-20, PBST), and blocked with 5% w/v non-fatty milk in PBST for 2 hours at 37° C. Plates were then washed again using wash buffer.

The anti-TSLP antibodies or controls were diluted in biotin-labeled human TSLP-Fc (SEQ ID NO.: 32, prepared in-house, 0.29 nM in 2.5% non-fatty milk in PBST), starting at 66.7 nM with a 3-fold serial dilution, and incubated at room temperature for 40 minutes. Then 100 µl of the antibody/TSLP-Fc mixtures were added to TSLPR/IL7R-coated plates. After incubation at 37° C. for 40 minutes, plates were washed 4 times using wash buffer. Then streptavidin conjugated HRP was added and incubated for 40 minutes at 37° C. to detect biotin-labeled human TSLP-Fc bound to TSLPR/IL7R. Plates were washed again using wash buffer. Finally, TMB was added and the reaction was stopped using 1M $H_2SO_4$. The absorbance of each well was read on a microplate reader using dual wavelength mode with 450 nm for TMB and 630 nm as the reference wavelength, then the OD (450-630) values were plotted against antibody concentration. Data was analyzed using Graphpad Prism® software and $IC_{50}$ values were reported. The results of some antibodies were shown in FIGS. 3A-3B.

4.2 Benchmark Blocking ELISA

The abilities of the anti-TSLP antibodies to block Benchmark (Tezepelumab)-human TSLP binding were measured using a competitive ELISA assay. Briefly, 2 µg/mL Tezepelumab in PBS was coated on 96-well micro plates, 100 µl/well, and incubated overnight at 4° C. The next day, plates were washed with wash buffer (PBS+0.05% Tween-20, PBST), and blocked with 5% w/v non-fatty milk in PBST for 2 hours at 37° C.

Meanwhile, anti-TSLP antibodies or controls were diluted in biotin-labeled human TSLP-Fc (SEQ ID NO.: 32, 0.047 nM in 2.5% non-fatty milk in PBST), starting at 40 nM with a 4-fold serial dilution, and incubated at room temperature for 40 minutes. Then, 100 µl of the antibody/TSLP-Fc-biotin mixtures were added to Benchmark-coated plates. After incubation at 37° C. for 40 minutes, plates were washed 4 times using wash buffer. Then streptavidin conjugated HRP was added, and the plates were incubated for 40 minutes at 3 7° C. to detect biotin-labeled human TSLP-Fc bound to Benchmark. Plates were finally washed using wash buffer. TMB was added and the reaction was stopped using 1M $H_2SO_4$. The absorbance of each well was read on a microplate reader using dual wavelength mode with 450 run for TMB and 630 nm as the reference wavelength, and the OD (450-630) values were plotted against antibody concentration. Data was analyzed using Graphpad Prism® software and $IC_{50}$ values were reported. The results of some antibodies were shown in FIGS. 4A-4B.

4.3 Cell-based Ligand-blocking FACS

The activities of anti-TSLP antibodies to block the binding of TSLP-Fc protein to cell surface TSLPR/IL7R were evaluated in a Flow Cytometry (FACS) assay, using a cell line BAF3-3E6 expressing cell-surface human TSLPR (amino acid residues 1-371 of uniprot No. Q9HC73.1, SEQ ID NO.: 33) and human IL7R (amino acid residues 1-459 of uniprot No. P16871.1, SEQ ID NO.: 34). The BAF3-3E6 cell line was prepared following the instruction of lipofectamine 3000 transfection reagent (Thermo Fisher), by transfecting BAF3 cells (iCell Bioscience Inc., Cat #MIMCL-021) with pCMV-T-P plasmids inserted with TSLPR coding sequence between EcoRI and XbaI sites and pCMV3-SP plasmids inserted with IL7R coding sequence between HindIII and XbaI sites.

Briefly, the anti-TSLP antibodies of the disclosure, the benchmark or negative control hIgG (human immunoglobulin (pH4) for intravenous injection, Hualan Biological Engineering Inc.) were diluted with human TSLP-Fc solution (SEQ ID NO.: 32, prepared in-house, 0.38 nM in FACS buffer), 2-fold serial dilution starting at 30 nM, and incubated at room temperature for 40 minutes. BAF3-3E6 cells were harvested from cell culture flasks, washed twice and re-suspended in phosphate buffered saline (PBS) containing 2% v/v Fetal Bovine Serum (FACS buffer). $1\times10^5$ cells per well in 96 well-plates were incubated with 100 µl/well antibody/TSLP-Fc-biotin mixtures for 40 minutes at 4° C. Cells were washed twice with FACS buffer, and then added and incubated with 100 µl/well R-Phycoerythrin Streptavidin (1:1000 dilution in FACS buffer, Jackson Immunoresearch, Cat #016-110-084) for 40 minutes at 4° C. in dark. Cells were washed twice and re-suspended in FACS buffer. Fluorescence was measured using a Becton Dickinson® FACS Canto II-HTS equipment. Data was analyzed using Graphpad Prism® software and $IC_{50}$ values were reported. The results of some antibodies were shown in FIGS. 5A-5B.

4.4 Cell-based Functional Assay

BAF3 cell proliferation and survival is normally dependent on IL-3. However, when these cells are engineered to express human TSLPR and human IL7R and the cell culture medium is supplemented with TSLP, they can survive without IL-3.

The anti-TSLP antibodies were further tested for their bioactivities of inhibiting proliferation of BAF3-3E6 cells expressing TSLPR (SEQ ID NO.: 33)/IL7R (SEQ ID NO.: 34) by using a cell-based functional assay. Briefly, $8 \times 10^3$ BAF3-3E6 cells at the log phase stage in 100 μL RPMI1640 medium (Gibco®, Cat #A10491-01) supplemented with 10% FBS (Gibco®, Cat #10099-141) were plated onto 96-well plates. Then, 50 μL human TSLP-his proteins (SEQ ID NO.: 28, prepared in-house, 6.4 ng/mL pM in RPMI-1640) were mixed with 50 μL of the anti-TSLP antibodies or the control (starting from 40 μg/mL, 5-fold serial dilution in the culture medium), and the mixtures were incubated for 30 minutes at room temperature. Then, the antibody/TSLP-his mixtures (100 μL) were added to BAF3-3E6 cells plates, and incubated in a CO2 incubator at 37° C. for 72 hours. Thereafter, the cells plates were incubated with Cell Titer-Glo® Luminescent Cell Viability Assay Kit (Promega®, Cat #G7572, 50 μl/well) for 10 minutes at 37° C. Chemiluminescence was measured using a Tecan Infinite® 200 Pro® equipment. Data was analyzed using Graphpad Prism® software and $IC_{50}$ values were reported. The results of some antibodies were shown in FIGS. 6A-6B.

Figure 3A:
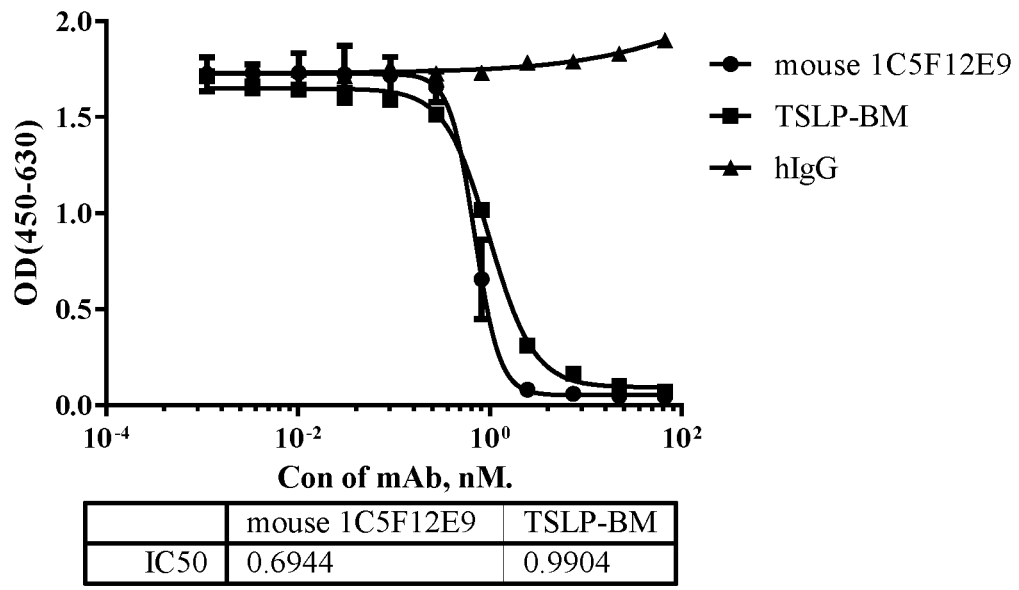
FIGS. 3A-3B show the blocking abilities of mouse antibodies 1C5F12E9 (A), D1C2H1H1 and D1D8H9F7 (B) on binding of human TSLP to TSLPR/IL7R in a competitive ELISA.
Figure 3B:
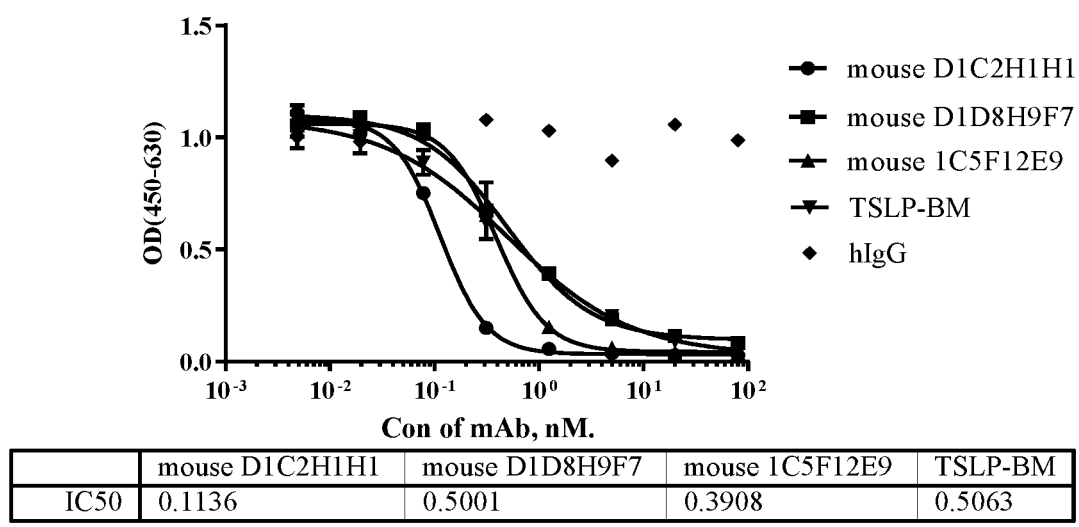
Figure 5A:
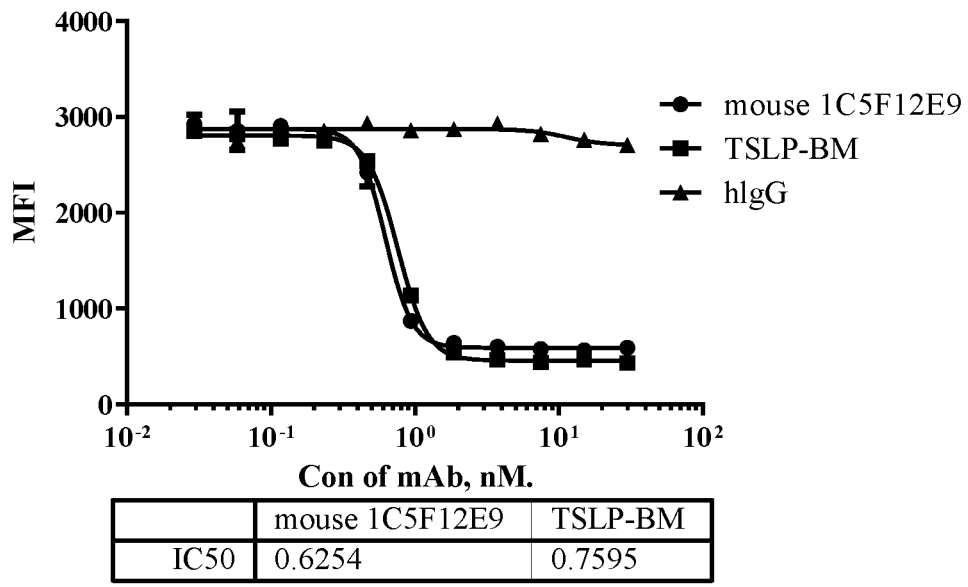
FIGS. 5A-5B show the blocking abilities of mouse antibodies 1C5F12E9 (A), D1C2H1H1 and D1D8H9F7 (B) on binding of human TSLP to engineered BAF3 cells expressing human TSLPR and IL7R in a cell-based ligand blocking FACS assay.
Figure 5B:
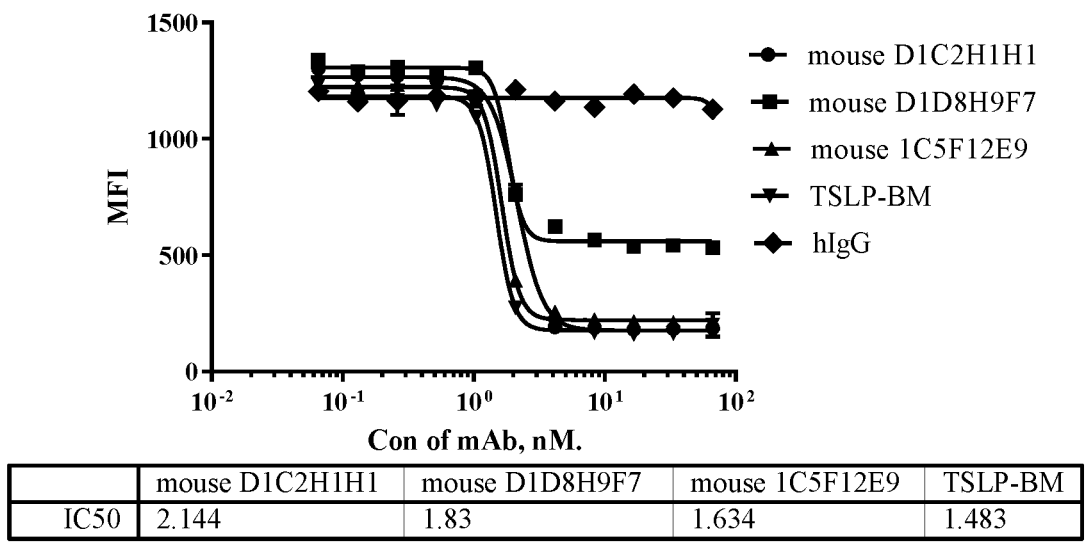

The data showed that all anti-TSLP antibodies were capable of blocking human TSLP binding to human TSLPR/IL7R, and the blocking activities were comparable to or a bit better than that of the benchmark. As shown in FIGS. 3A-3B, in the competitive ELISA, the $IC_{50}$ values of D1C2H1H1 and 1C5F12E9 were lower than that of the benchmark, indicating that they inhibited TSLP binding to TSLPR/IL7R more efficiently. In the cell based ligand blocking assay, as shown in FIGS. 5A-5B, the antibody DID8H9F7 showed partial blocking on TSLP-TSLPR/IL7R binding, while antibodies D1C2H1H1 and 1C5F12E9 completely inhibited TSLP-TSLPR/IL7R binding with similar $IC_{50}$ as compared with the benchmark.

Figure 4A:
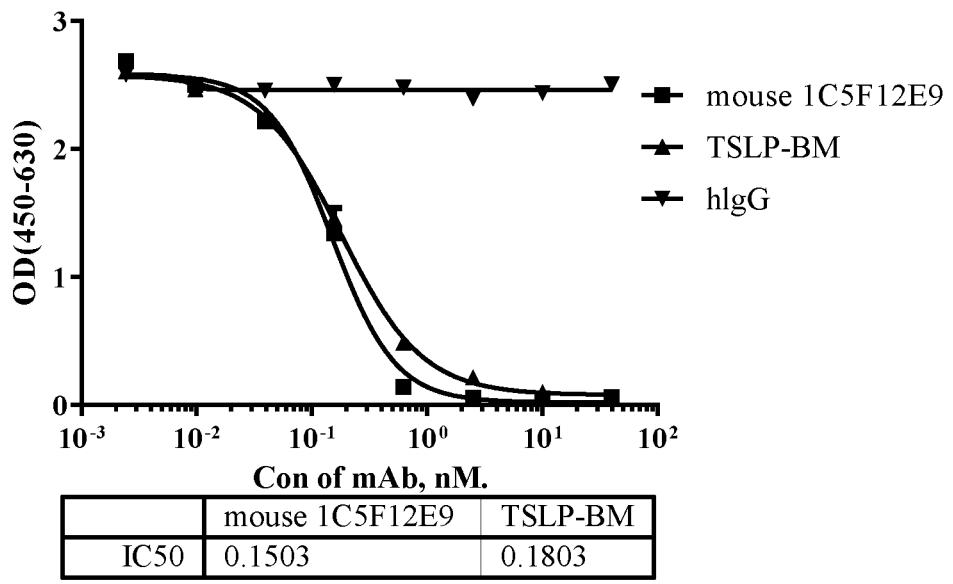
FIGS. 4A-4B show the abilities of mouse antibodies 1C5F12E9 (A), D1C2H1H1 and D1D8H9F7 (B) to block Benchmark Tezepelumab binding to human TSLP in a competitive ELISA.
Figure 4B:
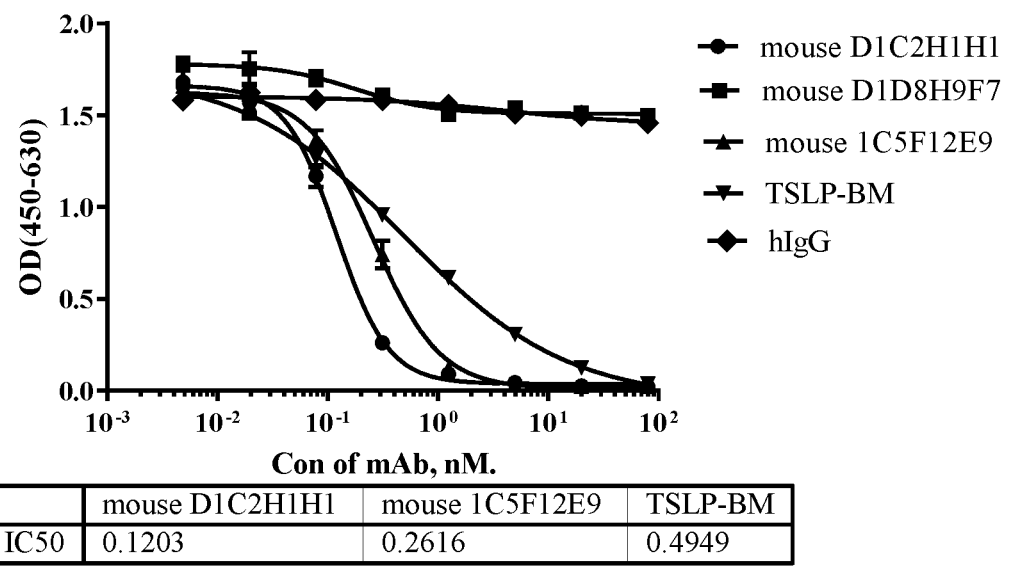

FIGS. 4A-4B showed that the anti-TSLP antibody DID8H9F7 cannot block benchmark binding to human TSLP, indicating it might bind to a different epitope compared to the benchmark. The rest anti-TSLP antibodies that were capable of blocking benchmark-TSLP binding might bind to the same or similar epitope as the benchmark (Tezepelumab) did.

Figure 6A:
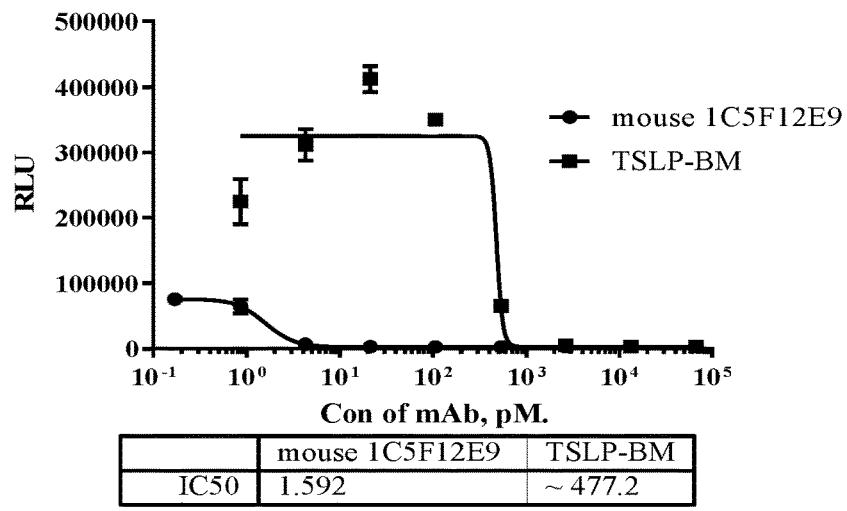
FIGS. 6A-6B show the inhibitory effects of 1C5F12E9 (A), D1C2H1H1 and D1D8H9F7 (B) on BAF3 cell survival and proliferation in a cell-based functional assay.
Figure 6B:
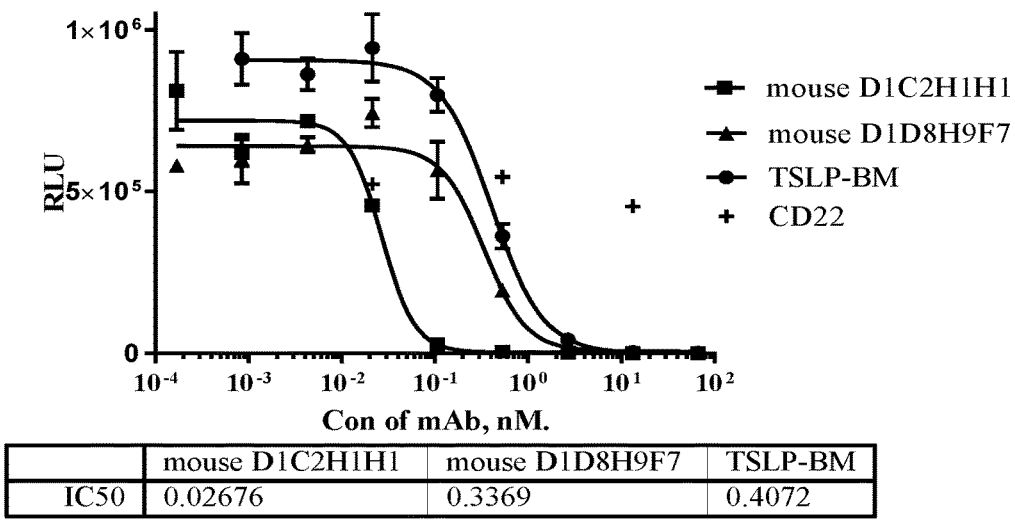

Further, all anti-TSLP antibodies were able to block TSLP-TSLPR/IL7R interaction, causing TSLP pathway blocking and BAF3-3E6 cell death, at a low antibody concentration, while the benchmark blocked TSLP-TSLPR/IL7R interaction at a high antibody level, as seen in FIGS. 6A-6B showing three representative antibodies' blocking curves.

Example 5 Generation and Characterization of Exemplary Chimeric Antibody

The heavy and light chain variable regions of all the antibodies tested above were sequenced. Surprisingly, the antibodies other than DID8H9F7 and D1C2H1H1 that were screened in a same cell fusion library were found to have the same heavy chain variable region and light chain variable region sequences. The inventors then rescreened the same cell fusion library, and antibodies that were picked out showing good properties were proved to have the same heavy/light chain variable regions. Without wishing to be bound to the theory, the inventors believe that the mAbs with such heavy/light chain variable regions were the dominate ones. The antibody 1C5F12E9 was picked as the representative for further characterization.

The heavy and light chain variable regions of the anti-TSLP mouse mAb 1C5F12E9 were cloned in frame to human IgG1 heavy chain constant region (SEQ ID NO.: 12) and human kappa light chain constant region (SEQ ID NO.: 14), respectively, wherein the C-terminus of the variable region was linked to the N-terminus of the corresponding constant region. The vectors each containing a nucleotide encoding a heavy chain variable region linked to human IgG1 heavy-chain constant region, and the vectors each containing a nucleotide encoding a light chain variable region linked to human kappa light-chain constant region were transiently transfected into 50 ml of 293F suspension cell cultures in a ratio of 1.1:1 light to heavy chain construct, with 1 mg/mL PEI. Cell supernatants were harvested after six days in shaking flasks, spun down to pellet cells, and then chimeric antibodies were purified from the cell supernatants. The purified chimeric antibodies were confirmed in the capture ELISA, Octet® affinity test, cell-based ligand-blocking FACS test and a cell-based functional assay following the protocols in the foregoing Examples and those described below.

The binding affinity of the purified chimeric 1C5F12E9 antibodies to human TSLP was assessed by Octet®. Briefly, APS biosensors (from ForteBio®) were presoaked with PBS for 1 hour, and then dipped in a well with PBS for 180 seconds. Then, the sensors were dipped in a well with human TSLP-his protein (SEQ ID NO.: 28, prepared in-house) at 5 μg/mL in running buffer for 760 seconds, and then dipped in a well with PBS for 600 seconds. Thereafter, the sensors were dipped in a well with HBS-EP$^+$ buffer (provided by Biacore®) for 600 seconds. Finally, the sensors were dipped in a well with serially diluted mouse or chimeric 1C5F12E9 anti-TSLP antibodies (2-fold dilution in HBS-EP$^+$ buffer, starting at 16.67 nM). The antigen-antibody association kinetics was followed for 2 minutes and the dissociation kinetics was followed for 3 minutes. The association and dissociation curves were fit to a 1:1 Langmuir binding model using ForteBio® Data Analysis 8.1 evaluation software. The $K_a$, $K_d$ and $K_D$ values were determined and summarized in Table 3 below. The binding affinity of the chimeric 1C5F12E9 antibodies was similar to that of the mouse antibody and the benchmark.

Figure 7:
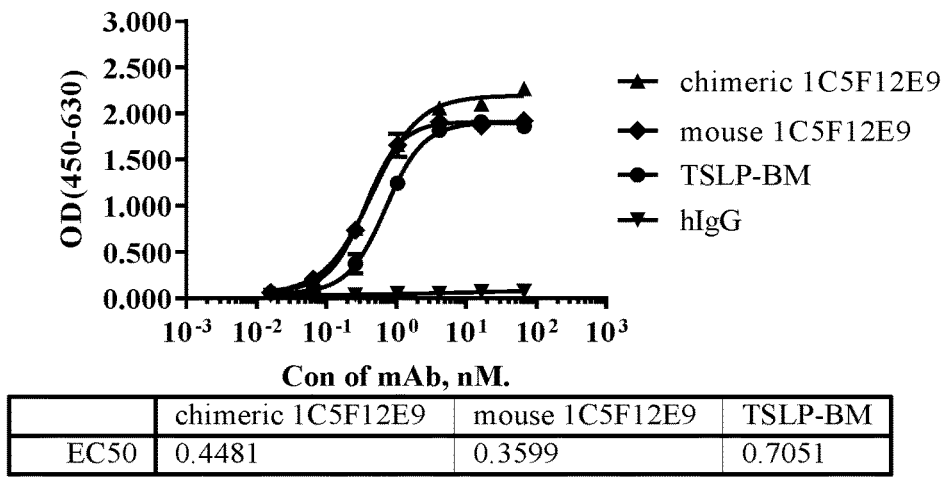
FIG. 7 shows the binding capacity of chimeric 1C5F12E9 antibody to human TSLP in a capture ELISA.
Figure 8:
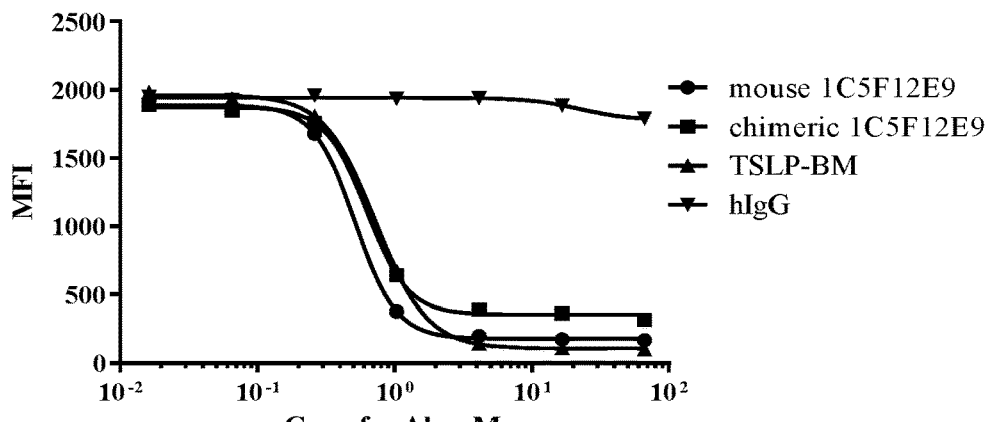
FIG. 8 shows the blocking ability of chimeric 1C5F12E9 antibody on binding of human TSLP to engineered BAF3 cells expressing human TSLPR and IL7R in a cell-based blocking FACS assay.
Figure 9:
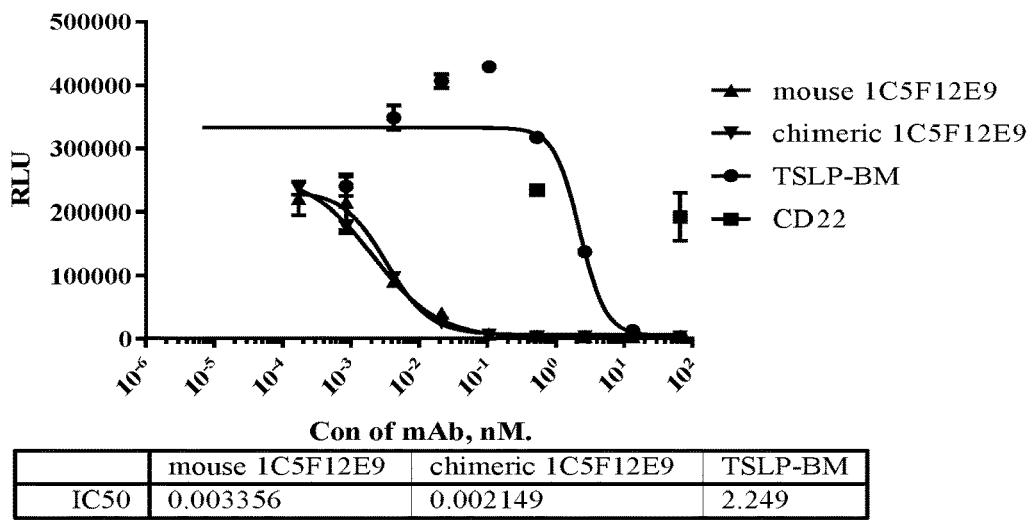
FIG. 9 shows the inhibitory effect of chimeric 1C5F12E9 antibody on BAF3 cell survival and proliferation in a cell-based functional assay.

The results of the other three assays were shown in FIGS. 7 to 9. The chimeric 1C5F12E9 antibody showed similar TSLP binding capacity, blocking activity on TSLP-TSLPR/IL7R interaction and inhibitory effect on BAF3-3E6 cell survival to the mouse 1C5F12E9 antibody, but better than the benchmark.

TABLE 3

Binding Affinity of Chimeric Antibody

| | Kinetics on Octet | | |
|---|---|---|---|
| mAb ID# | $K_a$ ($M^{-1}s^{-1}$) | $K_d$ ($s^{-1}$) | $K_D$ (M) |
| Mouse 1C5F12E9 | 6.00E+05 | 1.35E04 | 2.26E-10 |
| Chimeric 1C5F12E9 | 7.15E+05 | 1.59E-04 | 2.22E-10 |
| Tezepelumab | 6.60E+05 | 1.49E-04 | 2.26E-10 |

Example 6 Humanization of Anti-TSLP Mouse Monoclonal Antibody

The mouse anti-TSLP 1C5F12E9 antibody was humanized. Humanization of the mouse antibody was conducted using the well-established CDR-grafting method as described in detail below.

To select acceptor frameworks for humanization of the mouse 1C5F12E9 antibody, the light and heavy chain variable region sequences of the antibody were blasted against the human immunoglobulin gene database. The human germline with the highest homology to the mouse antibody was selected as the acceptor frameworks for humanization. The mouse antibody heavy/light chain variable region CDRs were inserted into the selected frameworks and the residue(s) in the frameworks was/were further mutated to obtain more candidate heavy chain/light chain variable regions. A total of 18 exemplary humanized 1C5F12E9 antibodies, namely from hu1C5F12E9-VI to hu1C5F12E9-V18, were obtained whose heavy/light chain variable region sequences were in Table 1.

The vectors containing nucleotide sequences encoding humanized 1C5F12E9 heavy chain chain variable region plus human IgG4 heavy-chain ((SEQ ID NO: 13) and humanized 1C5F12E9 light chain chain variable region plus human kappa light-chain constant regions (SEQ ID NO: 14) were transiently transfected into 50 ml of 293F suspension cell cultures in a ratio of 60% to 40% light to heavy chain construct, with 1 mg/ml PEI Cell supernatants containing humanized antibodies were harvested after six days in shaking flasks, spun down to pellet cells, and then 18 antibodies were purified from the cell supernatants.

Example 7 Characterization of Exemplary Humanized Anti-TSLP Monoclonal Antibodies The binding affinities and binding kinetics of the exemplary purified humanized 1C5F12E9 antibodies to human TSLP were assessed by Biacore® T200 system (GE Healthcare™, Pittsburgh, PA, USA) following the protocol in Example 2.

TABLE 4

Binding Affinities of Humanized 1C5F12E9 mAbs

| mAb | Kinetics on Biacore Human TSLP | | |
|---|---|---|---|
| | $K_a$ ($M^{-1}s^{-1}$) | $K_d$ ($s^{-1}$) | $K_D$ (M) |
| hu1C5F12E9-V1 | 9.93E+04 | 9.07E-08 (<1.00E-05) | <1.01E-10 |
| hu1C5F12E9-V3 | 1.03E+05 | 1.94E-08 (<1.00E-05) | <9.71E-11 |
| hu1C5F12E9-V5 | 1.03E+05 | 7.89E-08 (<1.00E-05) | <9.71E-11 |
| hu1C5F12E9-V7 | 1.08E+05 | 3.16E-08 (<1.00E-05) | <9.26E-11 |
| hu1C5F12E9-V9 | 1.22E+05 | 6.57E-07 (<1.00E-05) | <8.20E-11 |
| hu1C5F12E9-V11 | 9.07E+04 | 7.56E-07 (<1.00E-05) | <1.10E-10 |
| hu1C5F12E9-V12 | 9.61E+04 | 5.30E-08 (<1.00E-05) | <1.04E-10 |
| hu1C5F12E9-V13 | 1.04E+05 | 3.62E-07 (<1.00E-05) | <9.62E-11 |
| hu1C5F12E9-V14 | 1.05E+05 | 3.21E-06 (<1.00E-05) | <9.56E-11 |
| hu1C5F12E9-V15 | 1.12E+05 | 3.63E-06 (<1.00E-05) | <8.93E-11 |
| hu1C5F12E9-V16 | 1.04E+05 | 1.17E-06 (<1.00E-05) | <9.62E-11 |
| hu1C5F12E9-V17 | 1.10E+05 | 6.43E-06 (<1.00E-05) | <9.09E-11 |
| hu1C5F12E9-V18 | 1.21E+05 | 9.65E-06 (<1.00E-05) | <8.26E-11 |
| Chimeric 1C5F12E9 | 6.96E+04 | 6.36E-05 | 9.14E-10 |
| Tezepelumab | 1.99E+05 | 1.62E-04 | 8.15E-10 |

The $K_a$, $K_d$ and $K_D$ values were determined and summarized in Table 4 above.

The lower limit of $K_d$ as measured by Biacore® is 1.00E-05, and a $K_d$ below 1.00E-05 can be roughly calculated from the corresponding sensorgram. The results indicated that all humanized 1C5F12E9 antibodies had higher binding affinities to human TSLP them Tezepelumab.

Example 8 Characterization of Humanized Anti-TSLP Antibodies huC5F12E9-V8 and huC5F12E9-V14

The humanized antibodies hu1C5F12E9-V8 and huC5F12E9-V14 were selected for further characterization. Specifically, they were tested for the binding affinities/capacities to human and cynomolgus TSLPs and other functions by Biacore, capture ELISA, indirect ELISA, competitive ELISAs, cell-based ligand blocking FACS and functional assays, following the protocols described in Examples 2 to 4, and the results were shown in Table 5 below and FIGS. 10-14, and 15A-15B.

The data showed that hu1C5F12E9-V8 and hu1C5F12E9-V14 showed comparable in vitro activities to the parent mouse and chimeric antibodies.

Figure 10:
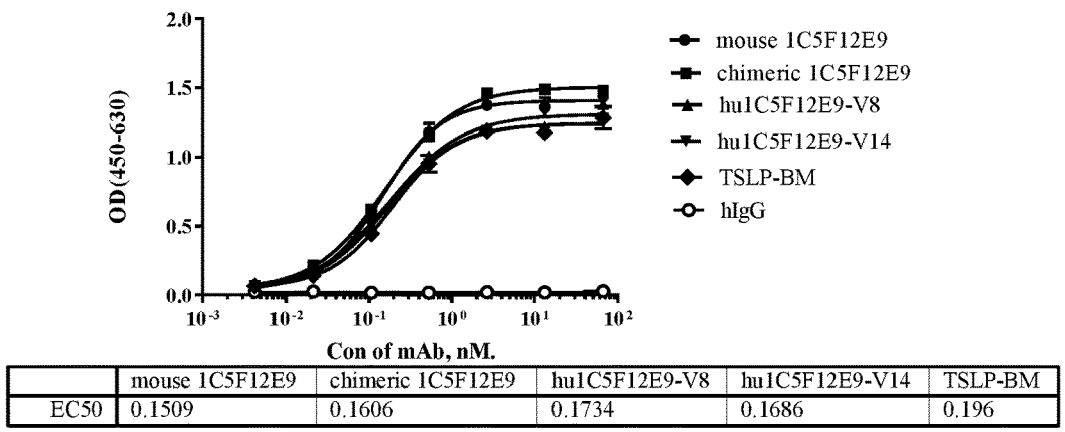
FIG. 10 shows the binding capacities of humanized antibodies huIC5F12E9-V8 and huIC5F12E9-V14 to human TSLP in a capture ELISA.
Figure 11:
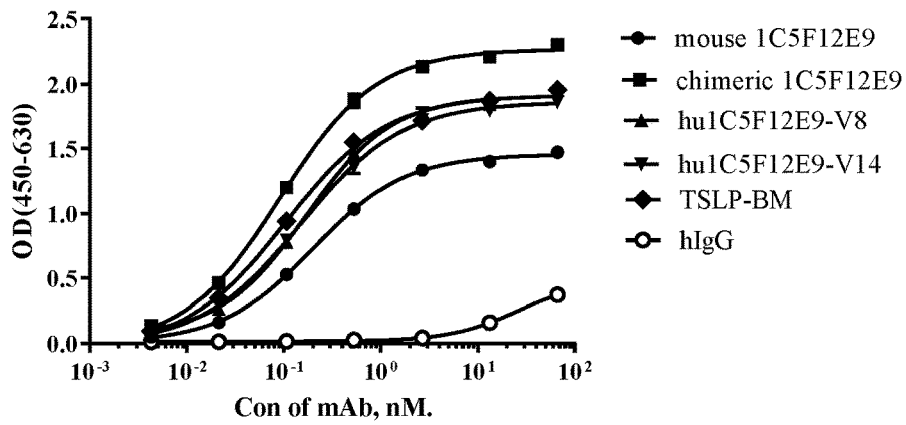
FIG. 11 shows the binding capacities of humanized antibodies huIC5F12E9-V8 and huIC5F12E9-V14 to cynomolgus TSLP in an indirect ELISA.

It can be seen from Table 5, FIG. 10 and FIG. 11 that the humanized antibodies hu1C5F12E9-V8 and hu1C5F12E9-V14 showed higher binding affinity/activity to human TSLP, and comparable binding affinity/capacity to cynomolgus TSLP when compared to the benchmark.

Figure 12:
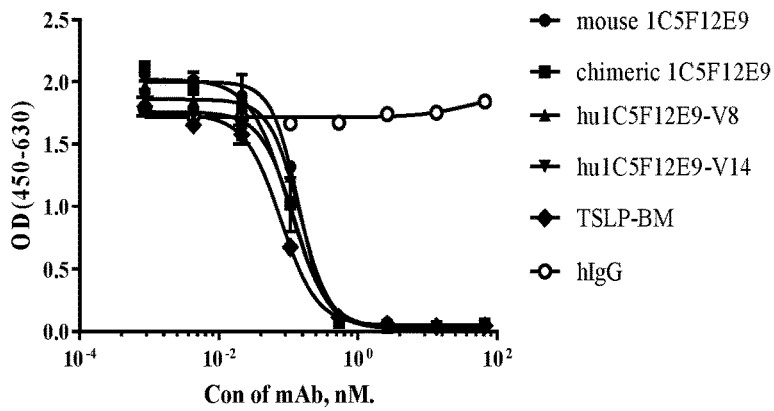
FIG. 12 shows the blocking abilities of humanized antibodies huIC5F12E9-V8 and huIC5F12E9-V 14 on binding of human TSLP to TSLPR/IL7R in a competitive ELISA.
Figure 13:
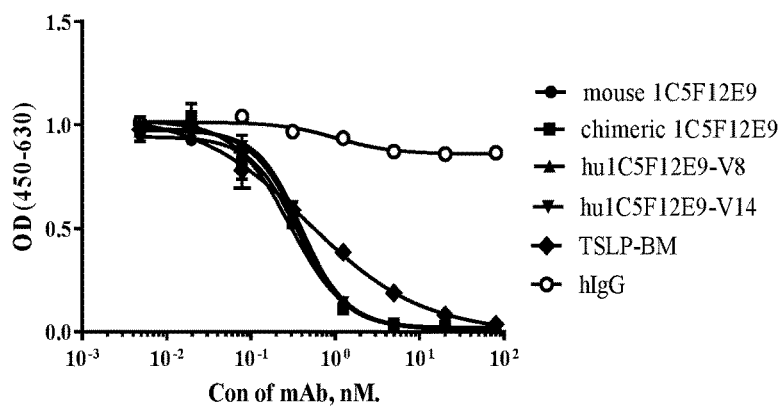
FIG. 13 shows the abilities of humanized antibodies huIC5F12E9-V8 and huIC5F12E9-V14 to block Benchmark Tezepelumab binding to human TSLP in a competitive ELISA.
Figure 14:
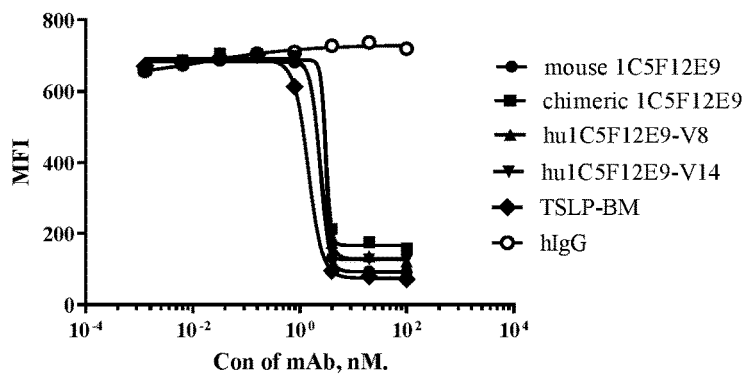
FIG. 14 shows the blocking abilities of humanized antibodies huIC5F12E9-V8 and huIC5F12E9-V14 on binding of human TSLP to engineered BAF3 cells expressing human TSLPR and IL 7R in a cell-based ligand blocking FACS assay.

FIGS. 12 and 14 showed that the humanized antibodies hu1C5F12E9-V8 and hu1C5F12E9-V14 were capable of blocking human TSLP binding to human TSLPR/IL7R.

Figure 15A:
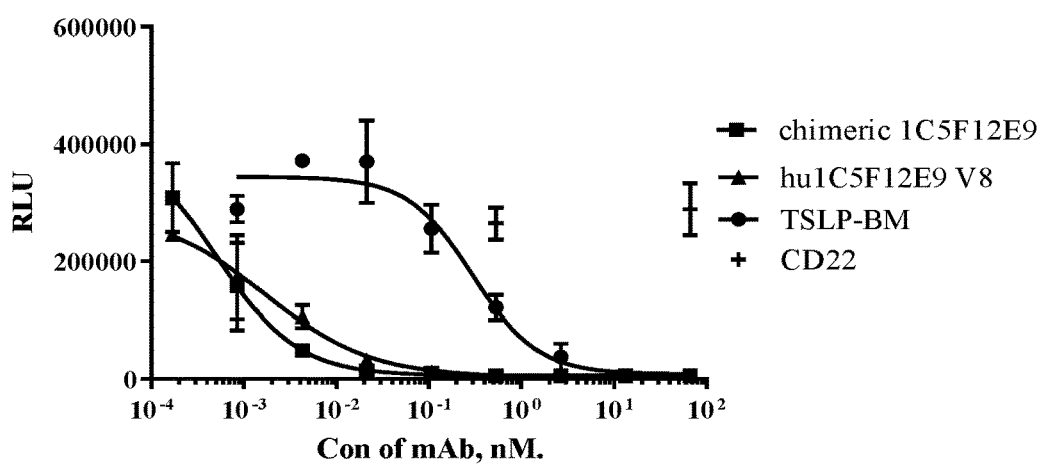
FIGS. 15A and 15B show the inhibitory effects of humanized antibodies huIC5F12E9-V8 (A) and huIC5F12E9-V14 (B) on BAF3 cell survival and proliferation in a cell-based functional assay.
Figure 15B:
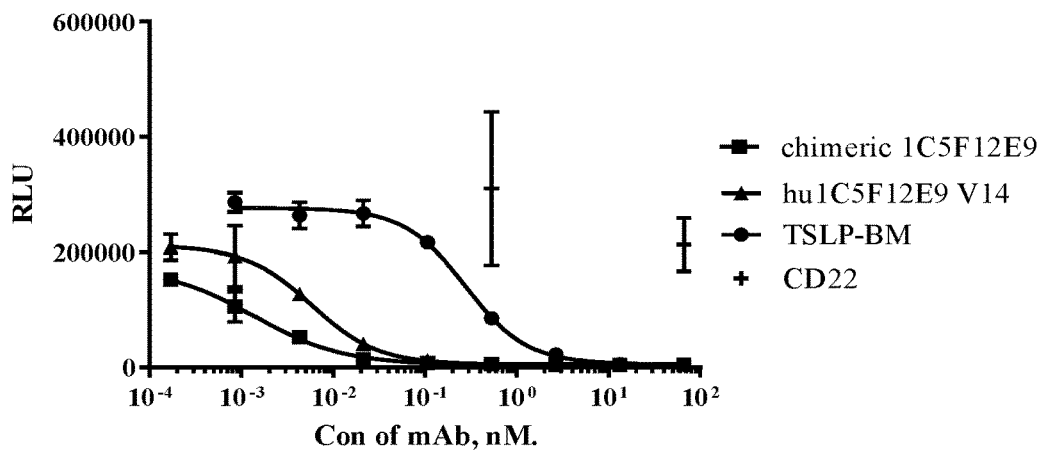
Figure 16:
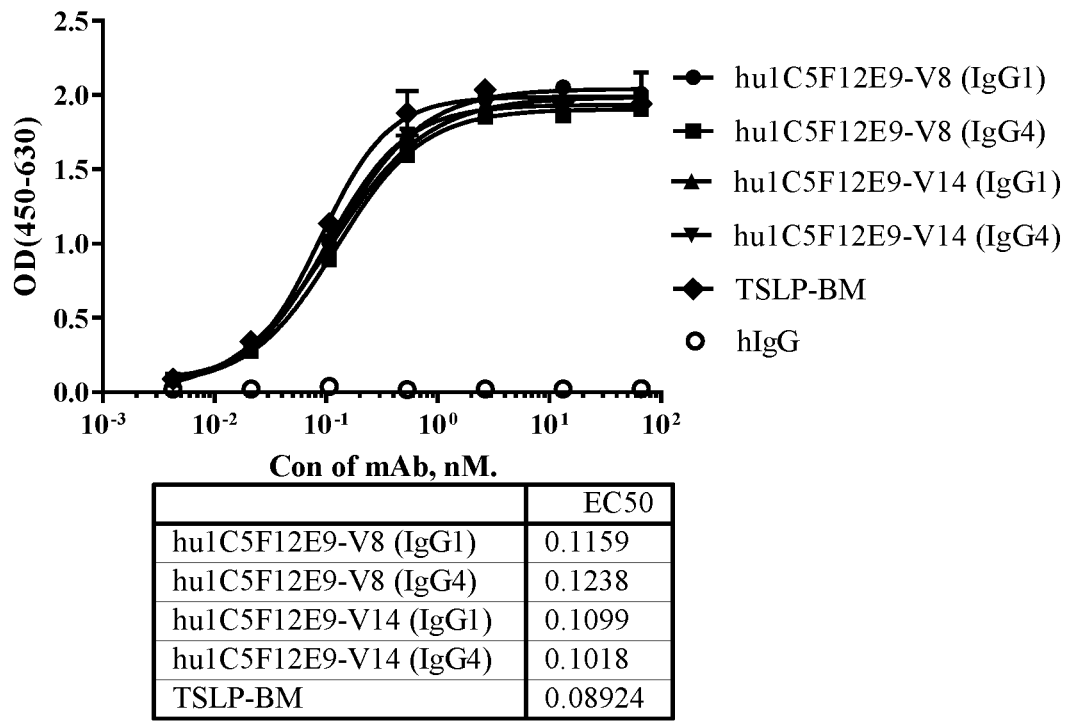
FIG. 16 shows the binding capacities of humanized antibodies huIC5F12E9-V8 (IgG1), huIC5F12E9-V8 (IgG4), huIC5F12E9-V14 (IgG1) and huIC5F12E9-V14 (IgG4) to human TSLP in a capture ELISA test.
Figure 17:
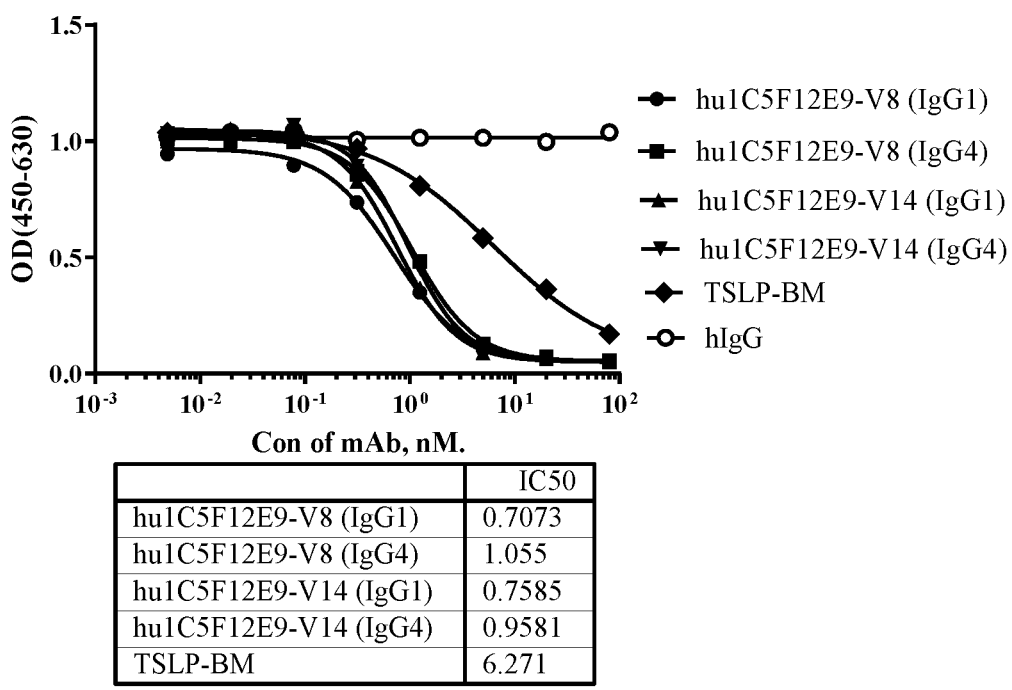
FIG. 17 shows the blocking abilities of humanized antibodies huIC5F12E9-V8 (IgG1), huIC5F12E9-V8 (IgG4), huIC5F12E9-V14 (IgG1) and huIC5F12E9-V14 (IgG4) on human TSLP-TSLPR/IL7R binding in a competitive ELISA.
Figure 18:
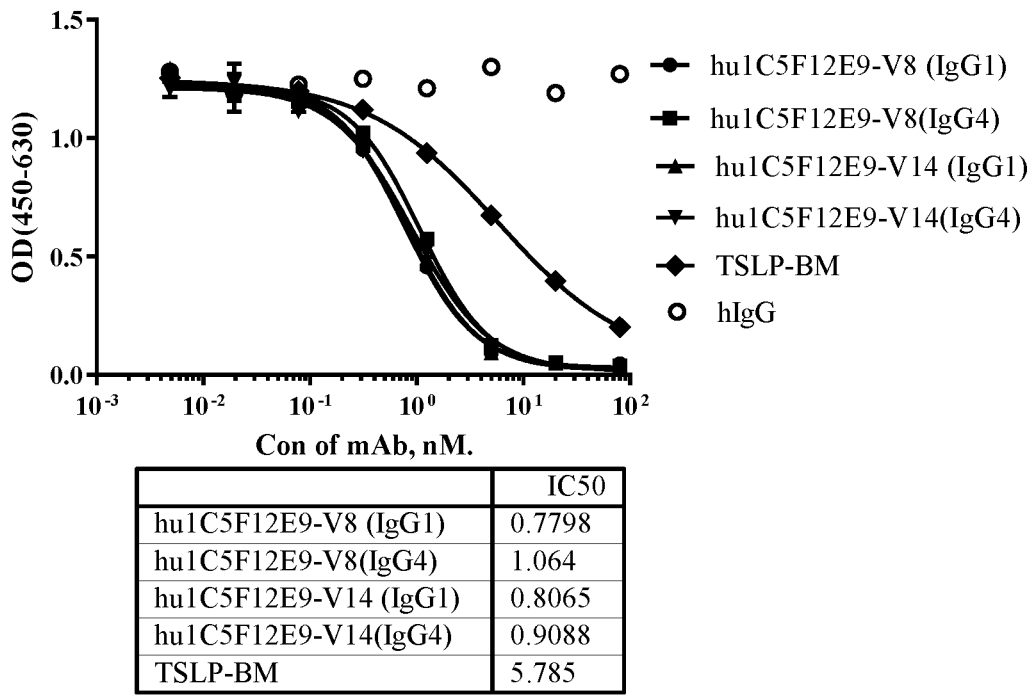
FIG. 18 shows the abilities of humanized antibodies huIC5F12E9-V8 (IgG1), huIC5F12E9-V8 (IgG4), huIC5F12E9-V14 (IgG1) and huIC5F12E9-V14 (IgG4) to block Benchmark-human TSLP binding in a competitive ELISA.
Figure 19:
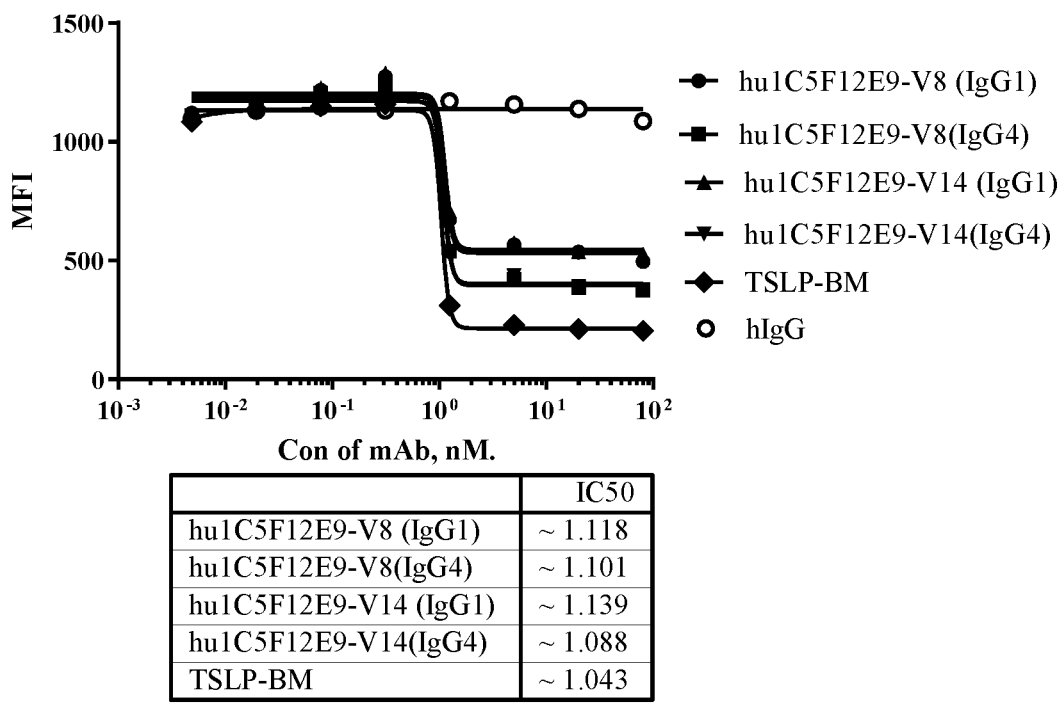
FIG. 19 shows the blocking abilities of humanized antibodies huIC5F12E9-V8 (IgG1), huIC5F12E9-V8 (IgG4), huIC5F12E9-V14 (IgG1) and huIC5F12E9-V14 (IgG4) on binding of human TSLP to engineered BAF3 cells expressing human TSLPR and IL7R in a cell-based ligand blocking FACS assay.
Figure 20A:
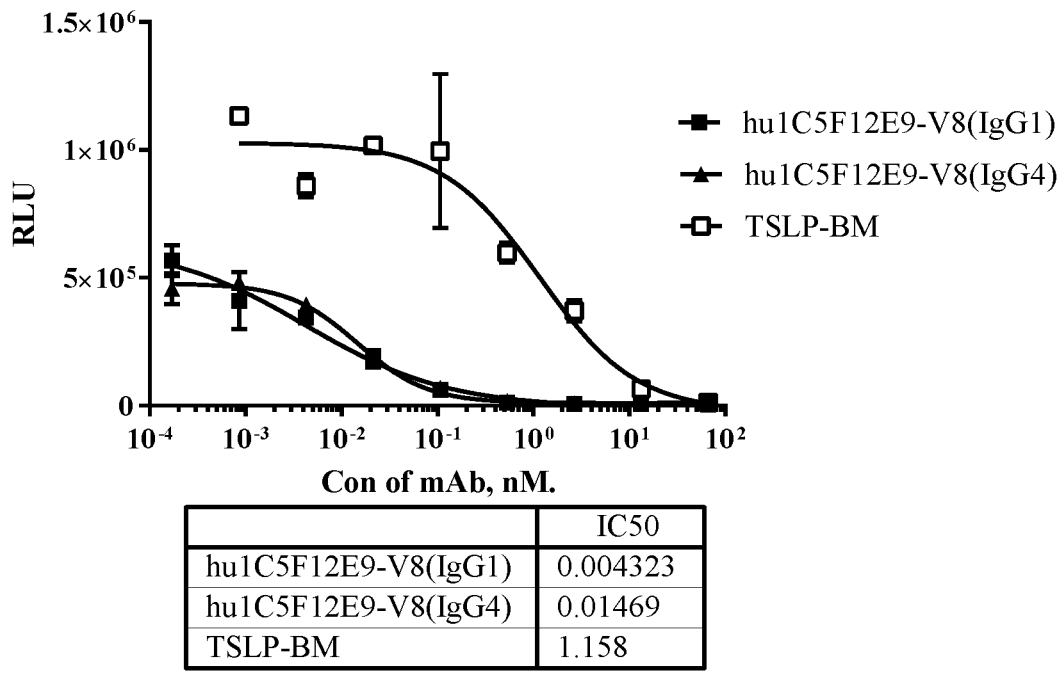
FIGS. 20A and 20B show the inhibitory effects of humanized antibodies huIC5F12E9-V8 (IgG1) and huIC5F12E9-V8 (IgG4) (A), and huIC5F12E9-V14 (IgG1) and huIC5F12E9-V14 (IgG4) (B) on BAF3 cell survival and proliferation in a cell-based functional assay.
Figure 20B:
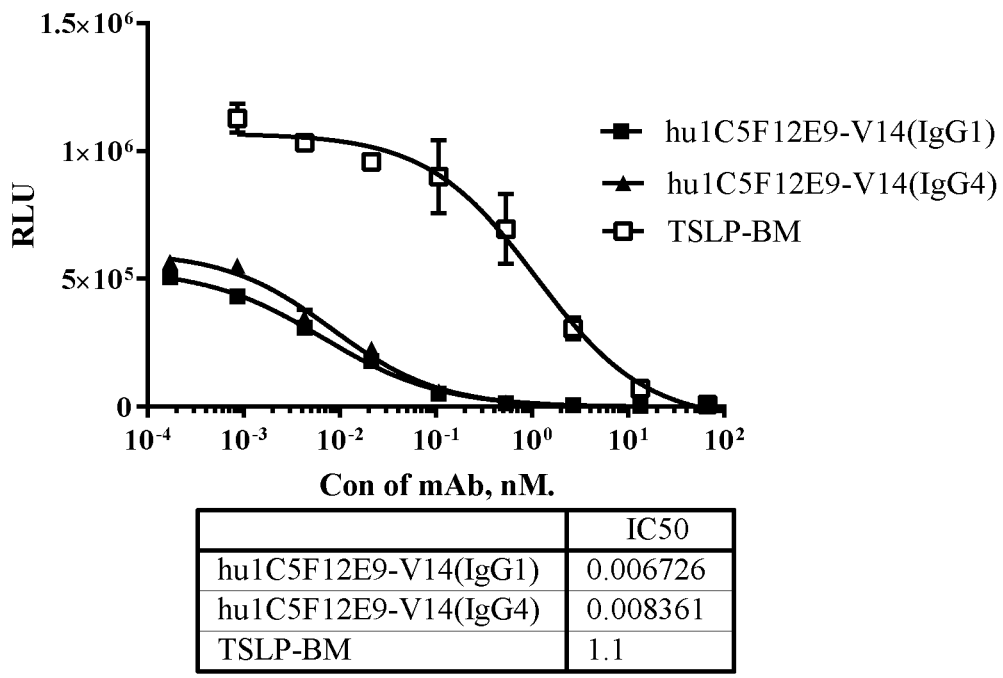
Figure 21A:
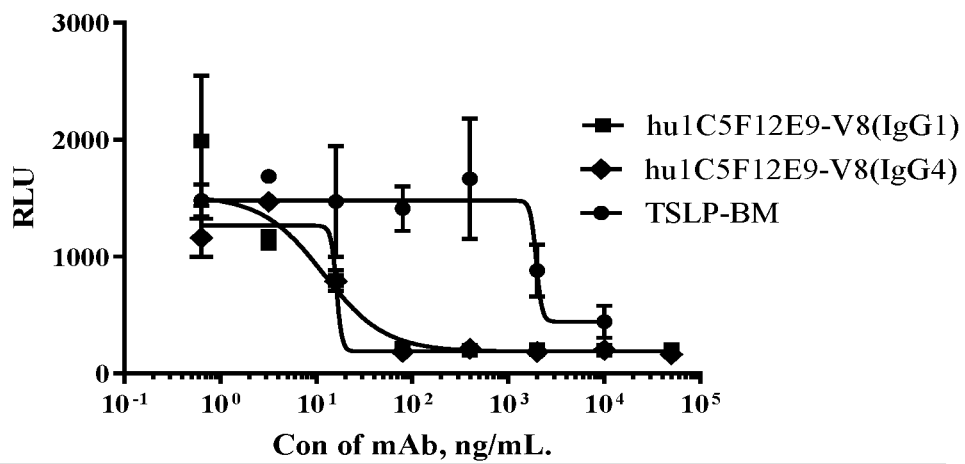
FIGS. 21A and 21B show the blocking abilities of humanized antibodies huIC5F12E9-V8 (IgG1) and huIC5F12E9-V8 (IgG4) (A), and huIC5F12E9-V14 (IgG1) and huIC5F12E9-V14 (IgG4) (B) on interaction of human TSLP with engineered HEEK293T cells in a cell-based reporter assay.
Figure 21B:
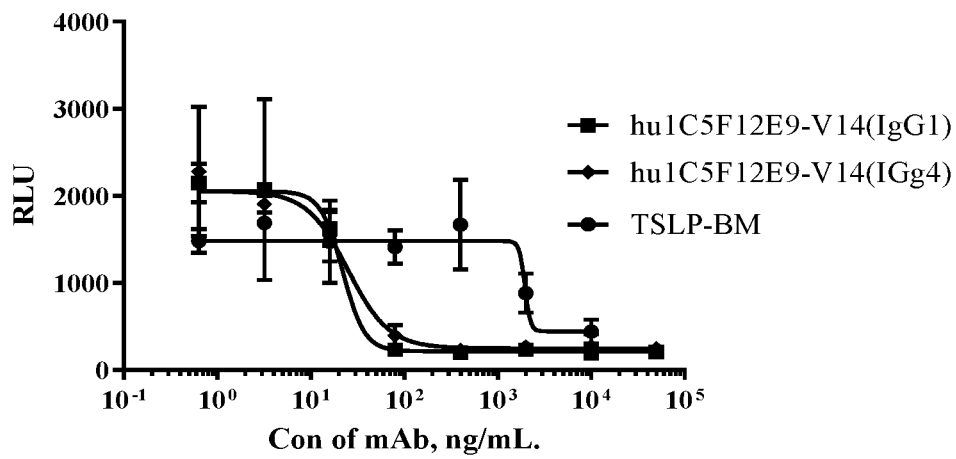

FIGS. 15A-15B showed that the humanized antibodies hu1C5F12E9-V8 and hu1C5F12E9-V14 were able to block TSLP-TSLPR/IL7R interaction, causing TSLP pathway blocking and death of BAF3-3E6 cells at a low antibody concentration, while the benchmark showed such a capacity at a high antibody level.

TABLE 5

Binding Affinites of hu1C5F12E9-V8 and hu1C5F12E9-V14 mAbs

| mAbs | Kinetics on BIAcore | | | | | |
|---|---|---|---|---|---|---|
| | Human TSLP | | | Cynomolgus TSLP | | |
| | $K_a$ (1/Ms) | $K_d$ (s-1) | $K_D$ (M) | $K_a$ (1/Ms) | $K_d$ (s-1) | $K_D$ (M) |
| mouse 1C5F12E9 | 1.04E+05 | <1.00E-05 | <9.66E-11 | 2.89E+05 | <1.00E-05 | <3.46E-11 |
| chimeric 1C5F12E9 | 1.93E+05 | <1.00E-05 | <5.17E-11 | 3.83E+05 | <1.00E-05 | <2.61E-11 |

TABLE 5-continued

Binding Affinites of hu1C5F12E9-V8 and hu1C5F12E9-V14 mAbs

| | Kinetics on BIAcore | | | | | |
|---|---|---|---|---|---|---|
| | Human TSLP | | | Cynomolgus TSLP | | |
| mAbs | $K_a$ (1/Ms) | $K_d$ (s−1) | $K_D$ (M) | $K_a$ (1/Ms) | $K_d$ (s−1) | $K_D$ (M) |
| hu1C5F12E9-V8 | 1.67E+05 | <1.00E−05 | <5.98E−11 | 3.05E+05 | <1.00E−05 | <3.28E−11 |
| hu1C5F12E9-V14 | 1.64E+05 | <1.00E−05 | <6.10E−11 | 3.11E+05 | <1.00E−05 | <3.22E−11 |
| Tezepelumab | 4.24E+05 | 9.84E−05 | 2.32E−10 | 8.49E+05 | 5.71E−05 | 6.72E−11 |

Thereafter, the humanized antibodies hu1C5F12E9-V8 and hu1C5F12E9-V14 having human IgG1 heavy chain constant region (SEQ ID NO.: 12) and human kappa constant region (SEQ ID NO.: 14) were compared with hu1C5F12E9-V8 and hu1C5F12E9-V14 having human IgG4 heavy chain constant region (SEQ ID NO.: 13) and human kappa constant region (SEQ ID NO.: 14) in binding affinity/capacity to human and cynomolgus TSLPs and other functions by Biacore, capture ELISA, competition ELISA, cell based ligand blocking FACS, cell based functional assay, cell based reporter assay and protein thermal shift assay, following the protocols described in Examples 2 to 4 and those described below. The results were shown in FIGS. 16-19, 20A-20B, 21A-21B and 22.

To determine the thermal stabilities of the four anti-TSLP humanized antibodies, a protein thermal shift assay was used to determine Tm (melting temperature) using a Glo-Melt™ Thermal Shift Protein Stability Kit (Biotium®, Cat #33022-T). Briefly, the GloMelt™ dye was allowed to thaw and reach room temperature. The vial containing the dye was vortexed and centrifuged. Then, 10x dye was prepared by adding 5 μL 200× dye to 95 μL PBS. 2 μL 10× dye and 10 μg humanized antibodies were added, and PBS was added to a total reaction volume of 20 μL. The tubes containing the dye and antibodies were briefly spun and placed in real-time PCR thermocycler (Roche®, LightCycler® 480 II) set up with a melt curve program having the parameters in Table 6.

TABLE 6

Parameters for Melt Curve Program

| Profile step | Temperature | Ramp rate | Holding Time |
|---|---|---|---|
| Initial hold | 25° C. | NA | 30 s |
| Melt curve | 25-99° C. | 0.1° C./s | NA |

In the cell based reporter assay, a reporter cell line HEK293T-TSLPR/IL7R/STAT5-Luc was used that expressed cell-surface human TSLPR (SEQ ID NO.: 33) and human IL7R (SEQ ID NO.: 34). The HEK293T-TSLPR/IL7R/STAT5-Luc cells were prepared in house, following the instruction of lipofectamine 3000 transfection reagent (Thermo Fisher®), by transfecting HEK293T cells (ATCC® CRL-11268) with pCMV-T-P plasmids inserted with TSLPR coding sequence between EcoRI and XbaI sites, pCMV3-SP plasmids inserted with IL7R coding sequence between HindIII and XbaI sites and pGL4.52 [luc2P/STAT5RE/Hygro] (Promega®).

Briefly, HEK293T-TSLPR/IL7R/STAT5-Luc cells were harvested from cell culture flasks. Then, $5 \times 10^4$ cells in 100 μL DMEM medium (Gibco®, Cat #10566-016) supplemented with 10% FBS (Gibco®, Cat #10099-141) were plated onto the 96 well cell culture plates (Corning®, Cat #30218026). Meanwhile, 50 μL human TSLP-his (SEQ ID NO.: 28, 160 ng/mL in DMEM medium supplemented with 10% FBS) was respectively mixed with 50 μL serially diluted anti-TSLP antibodies hu1C5F12E9-V8 (IgG1), hu1C5F12E9-V8 (IgG4), hu1C5F12E9-V14 (IgG1), hu1C5F12E9-V14 (IgG4), and Tezepelumab (5-fold dilution in DMEM medium supplemented with 10% FBS, starting at 200 μg/mL), and then incubated for 30 minutes at room temperature. Then, the anti-TSLP antibody/TSLP-his mixtures were added to the plates, 100 μl/well, and the plates were incubated in a CO2 incubator at 37° C. for 16-18 hours. The supernatants were discarded 100 μl/well, and then Luciferase detection Reagent (50 μL/well, Promega®, Cat #E6120) was added. Ten minutes later, the plates were subject to analysis by Tecan Infinite 200Pro® plate-reader. Data of luminescence signal were analyzed using Graphpad Prism® software and $IC_{50}$ values were reported.

As showed in FIGS. 16, 17, 19, 20A-20B, and 21A-21B, hu1C5F12E9-V8 (IgG1), hu1C5F12E9-V8 (IgG4), hu1C5F12E9-V14 (IgG1) and hu1C5F12E9-V14 (IgG4) showed comparable or a bit better in vitro activities as compared to Tezepelumab. Especially, the data in FIGS. 20A-20B and 21A-21B showed the humanized antibodies were able to block TSLP-TSLPR/IL7R interaction, causing TSLP pathway blocking and death of BAF3-3E6 cells, at a much lower antibody concentration as compared to the benchmark.

Figure 22:
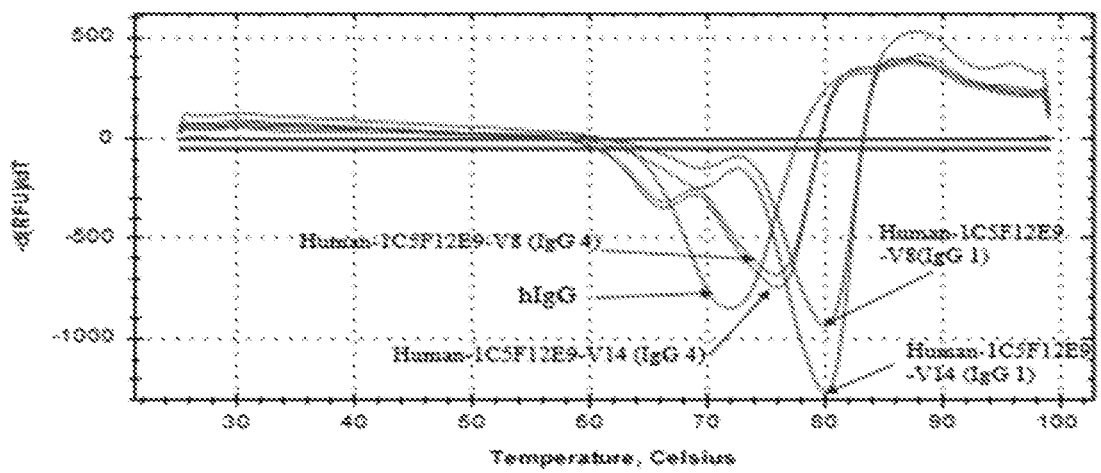
FIG. 22 shows the protein thermal shift assay results of huIC5F12E9-V8 (IgG1), huIC5F12E9-V8 (IgG4), huIC5F12E9-V14 (IgG1), huIC5F12E9-V14 (IgG4) antibodies.

As shown in FIG. 22, the melting temperatures (T1 and T2) of hu1C5F12E9-V8 (IgG1), hu1C5F12E9-V8 (IgG4), hu1C5F12E9-V14 (IgG1) and hu1C5F12E9-V14 (IgG4) were (69.5° C., 80° C.), (66.5° C., 76° C.), (69.5° C., 80° C.), (66.5° C., 76° C.), respectively.

While the disclosure has been described above in connection with one or more embodiments, it should be understood that the disclosure is not limited to those embodiments, and the description is intended to cover all alternatives, modifications, and equivalents, as may be included within the spirit and scope of the appended claims. All referenced cited herein are further incorporated by reference in their entirety.

Sequences in the present application are summarized below.

Description/Sequence/SEQ ID NO.
VH-CDR1 for mouse, chimeric and humanized 1C5F12E9 antibodies
(SEQ ID NO: 1)
TYWMH VH-CDR2 for mouse, chimeric and humanized 1C5F12E9 antibodies
(SEQ ID NO: 2)
VIDPSDSDTTYNQKFKG VH-CDR3 for mouse, chimeric and humanized 1C5F12E9 antibodies
(SEQ ID NO: 3)
SLDGYYDY VL-CDR1 for mouse, chimeric and humanized IC5F12E9 antibodies
(SEQ ID NO: 4)
RPTENIYSYLA VL-CDR2 for mouse, chimeric and humanized 1C5F12E9 antibodies
(SEQ ID NO: 5)
FARTLAE VL-CDR3 for mouse, chimeric and humanized 1C5F12E9 antibodies
(SEQ ID NO: 6)
QHHYGTPWT VH for mouse and chimeric IC5F12E9 antibodies
(SEQ ID NO: 7)
QVQLQQPGTELVKPGASVKMSCKASGYTFTTYWMHWVKQRPGQGLEWIGVIDPSDSDTTYNQK

FKGKATLTVDTSSSTAYMQLSSLTSEDSAVYYCTRSLDGYYDYWGQGTTLTVSS (SEQ ID NO: 17)
CAGGTCCAACTGCAGCAGCCTGGGACTGAGCTGGTGAAGCCTGGGGCTTCAGTGAAGATGTC

CTGCAAGGCTTCTGGCTACACCTTCACCACCTACTGGATGCACTGGGTGAAGCAGAGGCCTG

GACAAGGCCTTGAGTGGATCGGAGTGATTGATCCTTCTGATAGTGATACTACCTACAATCAAA

AGTTCAAGGGCAAGGCCACATTGACTGTAGACACATCCTCCAGCACAGCCTACATGCAGCTC

AGCAGCCTGACATCTGAGGACTCTGCGGTCTATTACTGTACAAGGTCCCTTGATGGTTACTAC

GACTACTGGGGCCAAGGCACCACTCTCACAGTCTCCTCA (SEQ ID NO: 18)
CAGGTGCAGCTGCAGCAGCCCGGCACCGAGCTGGTGAAGCCTGGCGCTAGCGTGAAGATGTC

CTGTAAGGCCAGCGGCTACACATTCACTACATACTGGATGCACTGGGTGAAGCAGAGACCTG

GCCAGGGCCTGGAGTGGATCGGCGTGATCGACCCCAGCGACTCCGATACCACCTACAACCAG

AAGTTTAAGGGCAAGGGCACCCTGACAGTGGATACAAGCTCCTCCACAGCCTACATGCAGCT

GTCCAGCCTGACCTCCGAGGATTCCGCCGTGTACTACTGCACAAGGTCCCTGGATGGCTACTA

CGATTACTGGGGCCAGGGCACAACCCTGACAGTCAGCAGC

VH for hu1C5F12E9-V1, hu1C5F12E9-V7, and hu1C5F12E9-V13
(SEQ ID NO: 20)
GATTTATTACTGTCAACACCATTATGGTACTCCGTGGACGTTCGGTGGAGGCACCAAGCTGGA

AATCAAA (SEQ ID NO: 21)
GACATCCAGATGACCCAGTCCCCCGCCAGCCTGTCCGCCTCTGTGGGAGAGACCGTGACCAT

CACATGCAGGCCCACCGAGAATATCTACTCCTACCTGGCCTGGTATCAACAGAAGCAGGGCA

AGAGCCCTCACCTGCTGGTGTACTTCGCCAGGACACTGGCCGAGGGCGTGCCCTCTAGGTTCA

GCGGCAGCGGCTCCGGCACACAGTTTTCCCTGAAGATCAACAGCCTGCAGCCTGAGGATTTT

GGCATCTACTACTGCCAGCACCACTACGGCACACCCTGGACCTTTGGCGGCGGCACCAAGCT

GGAGATCAAG

VL for hu1C5F12E9-V1 - hu1C5F12E9-V6
(SEQ ID NO: 11, X1 = S, X2 = V)
DIQMTQSPSSLSASVGDRVTITCRPTENIYSYLAWYQQKPGKX1PKLLX2YFARTLAEGVPSRFSGS

GSGTDFTLTISSLQPEDFATYYCQHHYGTPWTFGGGTKVEIK

```
DIQMTQSPSSLSASVGDRVTITCRPTENIYSYLAWYQQKPGKSPKLLVYFARTLAEGVPSRFSGSG

SGTDFTLTISSLQPEDFATYYCQHHYGTPWTFGGGTKVEIK

VL for hu1C5F12E9-V7 - hu1C5F12E9-V12
                                            (SEQ ID NO: 11, X1 = A, X2 = I)
DIQMTQSPSSLSASVGDRVTITCRPTENIYSYLAWYQQKPGKX1PKLLX2YFARTLAEGVPSRFSGS

GSGTDFTLTISSLQPEDFATYYCQHHYGTPWTFGGGTKVEIK

DIQMTQSPSSLSASVGDRVTITCRPTENIYSYLAWYQQKPGKAPKLLIYFARTLAEGVPSRFSGSGS

GTDFTLTISSLQPEDFATYYCQHHYGTPWTFGGGTKVEIK (SEQ ID NO: 22)
GATATCCAGATGACACAGAGCCCCAGCAGCCTGAGCGCCAGCGTGGGAGACAGGGTGACAA

TCACATGCAGACCCACCGAGAATATCTACAGCTACCTGGCCTGGTATCAACAGAAGCCTGGC

AAGGCCCCCAAGCTGCTGATCTACTTCGCCAGAACCCTGGCCGAGGGCGTGCCCTCTAGGTTC

AGCGGCTCCGGCAGCGGCACCGACTTCACACTGACCATCTCCTCCCTGCAGCCCGAGGACTTC

GCCACATACTACTGCCAGCACCACTACGGCACACCTTGGACCTTCGGCGGCGGCACAAAGGT

GGAGATCAAG

VL for hu1C5F12E9-V13 - hu1C5F12E9-V18
                                            (SEQ ID NO: 11, X1 = S, X2 = I)
DIQMTQSPSSLSASVGDRVTITCRPTENIYSYLAWYQQKPGKX1PKLLX2YFARTLAEGVPSRFSGS

GSGTDFTLTISSLQPEDFATYYCQHHYGTPWTFGGGTKVEIK

DIQMTQSPSSLSASVGDRVTITCRPTENIYSYLAWYQQKPGKSPKLLIYFARTLAEGVPSRFSGSGS

GTDFTLTISSLQPEDFATYYCQHHYGTPWTFGGGTKVEIK

Human IgG1 heavy chain constant region
                                                         (SEQ ID NO: 12)
ASTKGPSVFPLAPSSKSTSGGTAALGCLVKDYFPEPVTVSWNSGALTSGVHTFPAVLQSSGLYSLS

SVVTVPSSSLGTQTYICNVNHKPSNTKVDKKVEPKSCDKTHTCPPCPAPELLGGPSVFLFPPKPKD

TLMISRTPEVTCVVVDVSHEDPEVKFNWYVDGVEVHNAKTKPREEQYNSTYRVVSVLTVLHQD

WLNGKEYKCKVSNKALPAPIEKTISKAKGQPREPQVYTLPPSREEMTKNQVSLTCLVKGFYPSDIA

VEWESNGQPENNYKTTPPVLDSDGSFFLYSKLTVDKSRWQQGNVFSCSVMHEALHNHYTQKSLS

LSPGK
                                                         (SEQ ID NO: 23)
GCTAGCACCAAGGGCCCATCGGTCTTCCCCCTGGCACCCTCCTCCAAGAGCACCTCTGGGGGC

ACAGCGGCCCTGGGCTGCCTGGTCAAGGACTACTTCCCCGAACCGGTGACGGTGTCGTGGAA

CTCAGGCGCCCTGACCAGCGGCGTGCACACCTTCCCGGCTGTCCTACAGTCCTCAGGACTCTA

CTCCCTCAGCAGCGTGGTGACCGTGCCCTCCAGCAGCTTGGGCACCCAGACCTACATCTGCAA

CGTGAATCACAAGCCCAGCAACACCAAGGTGGACAAGAAAGTTGAGCCCAAATCTTGTGACA

AAACTCACACATGCCCACCGTGCCCAGCACCTGAACTCCTGGGGGGACCGTCAGTCTTCCTCT

TCCCCCCAAAACCCAAGGACACCCTCATGATCTCCCGGACCCCTGAGGTCACATGCGTGGTG

GTGGACGTGAGCCACGAAGACCCTGAGGTCAAGTTCAACTGGTACGTGGACGGCGTGGAGGT

GCATAATGCCAAGACAAAGCCGCGGGAGGAGCAGTACAACAGCACGTACCGTGTGGTCAGC

GTCCTCACCGTCCTGCACCAGGACTGGCTGAATGGCAAGGAGTACAAGTGCAAGGTCTCCAA

CAAAGCCCTCCCAGCCCCCATCGAGAAAACCATCTCCAAAGCCAAAGGGCAGCCCCGAGAAC

CACAGGTGTACACCCTGCCCCCATCCCGGGAGGAGATGACCAAGAACCAGGTCAGCCTGACC

TGCCTGGTCAAAGGCTTCTATCCCAGCGACATCGCCGTGGAGTGGGAGAGCAATGGGCAGCC

GGAGAACAACTACAAGACCACGCCTCCCGTGCTGGACTCCGACGGCTCCTTCTTCCTCTACAG
```

-continued

CAAGCTCACCGTGGACAAGAGCAGGTGGCAGCAGGGGAACGTCTTCTCATGCTCCGTGATGC

ATGAGGCTCTGCACAACCACTACACGCAGAAGAGCCTCTCCCTGTCTCCGGGTAAATGA (SEQ ID NO: 57)
ASTKGPSVFPLAPSSKSTSGGTAALGCLVKDYFPEPVTVSWNSGALTSGVHTFPAVLQSSGLYSLS

SVVTVPSSSLGTQTYICNVNHKPSNTKVDKKVEPKSCDKTHTCPPCPAPELLGGPSVFLFPPKPKD

TLMISRTPEVTCVVVDVSHEDPEVKFNWYVDGVEVHNAKTKPREEQYNSTYRVVSVLTVLHQD

WLNGKEYKCKVSNKALPAPIEKTISKAKGQPREPQVYTLPPSRDELTKNQVSLTCLVKGFYPSDIA

VEWESNGQPENNYKTTPPVLDSDGSFFLYSKLTVDKSRWQQGNVFSCSYMHEALHNHYTQKSLS

LSPQK (SEQ ID NO: 58)
GCCTCCACCAAGGGCCCATCGGTCTTCCCCCTGGCACCCTCCTCCAAGAGCACCTCTGGGGGC

ACAGCGGCCCTGGGCTGCCTGGTCAAGGACTACTTCCCCGAACCGGTGACGGTGTCGTGGAA

CTCAGGCGCCCTGACCAGCGGCGTGCACACCTTCCCGGCTGTCCTACAGTCCTCAGGACTCTA

CTCCCTCAGCAGCGTGGTGACCGTGCCCTCCAGCAGCTTGGGCACCCAGACCTACATCTGCAA

CGTGAATCACAAGCCCAGCAACACCAAGGTGGACAAGAAAGTTGAGCCCAAATCTTGTGACA

AAACTCACACATGCCCACCGTGCCCAGCACCTGAACTCCTGGGGGGACCGTCAGTCTTCCTCT

TCCCCCCAAAACCCAAGGACACCCTCATGATCTCCCGGACCCCTGAGGTCACATGCGTGGTG

GTGGACGTGAGCCACGAAGACCCTGAGGTCAAGTTCAACTGGTACGTGGACGGCGTGGAGGT

GCATAATGCCAAGACAAAGCCGCGGGAGGAGCAGTACAACAGCACGTACCGGGTGGTCAGC

GTCCTCACCGTCCTGCACCAGGACTGGCTGAATGGCAAGGAGTACAAGTGCAAGGTCTCCAA

CAAAGCCCTCCCAGCCCCCATCGAGAAAACCATCTCCAAAGCCAAAGGGCAGCCCCGAGAAC

CACAGGTGTACACCCTGCCCCCATCCCGGGATGAGCTGACCAAGAACCAGGTCAGCCTGACC

TGCCTGGTCAAAGGCTTCTATCCCAGCGACATCGCCGTGGAGTGGGAGAGCAATGGGCAGCC

GGAGAACAACTACAAGACCACGCCTCCCGTGCTGGACTCCGACGGCTCCTTCTTCCTCTACAG

CAAGCTCACCGTGGACAAGACCAGGTGGCAGCAGGGGAACCTCTTCTCATGCTCCGTGATGC

ATGAGGCTCTGCACAACCACTACACGCAGAAGAGCCTCTCCCTGTCTCCGGGTAAATGA

Human IgG4 heavy chain constant region (SEQ ID NO: 13)
ASTKGPSVFPLAPCSRSTSESTAALGCLVKDYFPEPVTVSWNSGALTSGVHTFPAVLQSSGLYSLSS

VVTVPSSSLGTKTYTCNVDHKPSNTKVDKRVESKYGPPCPPCPAPEFLGGPSVFLFPPKPKDTLMIS

RTPEVTCVVVDVSQEDPEVQFNWYVDGVEVHNAKTKPREEQFNSTYRVVSVLTVLHQDWLNGK

EYKCKVSNKGLPSSIEKTISKAKGQPREPQVYTLPPSQEEMTKNQVSLTCLVKGFYPSDIAVEWES

NGQPENNYKTTPPVLDSDGSFFLYSRLTVDKSRWQEGNVFSCSVMHEALHNHYTQKSLSLSLGK (SEQ ID NO: 24)
GCCAGCACAAAGGGCCCTTCCGTGTTTCCCCTGGCCCCCTGCAGCAGGAGCACCTCTGAGTCC

ACCGCCGCCCTGGGCTGTCTGGTGAAGGACTACTTTCCCGAGCCCGTGACCGTGAGCTGGAAT

TCCGGCGCCCTGACATCCGGCGTGCACACCTTCCCCGCCGTGCTGCAGTCCTCCGGCCTGTAC

AGCCTGAGCTCCGTGGTGACAGTGCCTTCCTCCTCCCTGGGCACCAAGACCTACACATGTAAT

GTGGATCACAAGCCCAGCAACACAAAGGTGGATAAGAGAGTGGAGTCCAAGTACGGCCCTC

CTTGCCCTCCCTGTCCTGCCCCAGAGTTCCTGGGCGGCCCCTCTGTGTTCCTGTTCCCCCCTAA

GCCCAAGGACACACTGATGATCTCCAGGACCCCTGAGGTGACCTGCGTGGTGGTGGACGTGA

GCCAGGAGGACCCTGAGGTGCAGTTCAATTGGTACGTGGATGGCGTGGAGGTGCACAATGCC

AAGACAAAGCCCAGAGAGGAGCAGTTTAATTCCACATACAGGGTGGTGTCCGTGCTGACCGT

-continued

```
GCTGCACCAGGATTGGCTGAACGGCAAGGAGTACAAGTGTAAGGTGAGCAACAAGGGCCTG

CCTTCCTCCATCGAGAAGACAATCAGCAAGGCCAAGGGCCAGCCTAGGGAGCCCCAGGTGTA

CACACTGCCTGCCAGCCAGGAGGAGATGACCAAGAACCAGGTGAGCCTGACCTGCCTGGTGA

AGGGCTTCTACCCTAGCGACATCGCCGTGGAGTGGGAGTCCAACGGCCAGCCCGAGAATAAC

TACAAGACAACACCCCCCGTGCTGGATTCCGATGGCAGCTTCTTTCTGTACTCCAGGCTGACC

GTGGATAAGAGCAGGTGGCAGGAGGGCAATGTGTTCAGCTGCTCCGTGATGCACGAGGCCCT

GCACAATCACTACACCCAGAAGAGCCTGTCCCTGAGCCTGGGCAAGTGA
```

Human kappa light chain constant region (SEQ ID NO: 14)
RTVAAPSVFIFPPSDEQLKSGTASVVCLLNNFYPREAKVQWKYDNALQSGNSQESVTEQDSKDST

YSLSSTLTLSKADYEKHKVYACEVTHQGLSSPVTKSFNRGEC (SEQ ID NO: 25)
```
CGTACGGTGGCGGCGCCATCTGTCTTCATCTTCCCGCCATCTGATGAGCAGTTGAAATCTGGA

ACTGCCTCTGTTGTGTGCCTGCTGAATAACTTCTATCCCAGAGAGGCCAAAGTACAGTGGAAG

GTGGATAACGCCCTCCAATCGGGTAACTCCCAGGAGAGTGTCACAGAGCAGGACAGCAAGG

ACAGCACCTACAGCCTCAGCAGCACCCTGACGCTGAGCAAAGCAGACTACGAGAAACACAA

AGTCTACGCCTGCGAAGTCACCCATCAGGGCCTGAGCTCGCCCGTCACAAAGAGCTTCAACA

GGGGAGAGTGTTGA
```

Mouse IgG1 heavy chain constant region (SEQ ID NO: 15)
AKTTPPSVYPLAPGSAAQTNSMVTLGCLVKGYFPEPVTVTWNSGSLSSGVHTFPAVLQSDLYTLS

SSVTVPSSTWPSETVTCNVAHPASSTKVDKKIVPRDCGCKPCICTVPEVSSVFIFPPKPKDVLTITLT

PKVTCVVVDISKDDPEVQFSWFVDDVEVHTAQTQPREEQFNSTFRSVSELPIMHQDWLNGKEFKC

RVNSAAFPAPIEKTISKTKGRPKAPQVYTIPPPKEQMAKDKVSLTCMITDFFPEDITVEWQWNGQP

AENYKNTQPIMDTDGSYFVYSKLNVQKSNWEAGNTFTCSVLHEGLHNHHTEKSLSHSPGK (SEQ ID NO: 26)
```
GCCAAAACGACACCCCCATCTGTCTATCCACTGGCCCCTGGATCTGCTGCCCAAACTAACTCC

ATGGTGACCCTGGGATGCCTGGTCAAGGGCTATTTCCCTGAGCCAGTGACAGTGACCTGGAA

CTCTGGATCCCTGTCCAGCGGTGTGCACACCTTCCCAGCTGTCCTGCAGTCTGACCTCTACACT

CTGAGCAGCTCAGTGACTGTCCCCTCCAGCACCTGGCCCAGCGAGACCGTCACCTGCAACGTT

GCCCACCCGGCCAGCAGCACCAAGGTGGACAAGAAAATTGTGCCCAGGGATTGTGGTTGTAA

GCCTTGCATATGTACAGTCCCAGAAGTATCATCTGTCTTCATCTTCCCCCCAAAGCCCAAGGA

TGTGCTCACCATTACTCTGACTCCTAAGGTCACGTGTGTTGTGGTAGACATCAGCAAGGATGA

TCCCGAGGTCCAGTTCAGCTGGTTTGTAGATGATGTGGAGGTGCACACAGCTCAGACGCAAC

CCCGGGAGGAGCAGTTCAACAGCACTTTCCGCTCAGTCAGTGAACTTCCCATCATGCACCAG

GACTGGCTCAATGGCAAGGAGTTCAAATGCAGGGTCAACAGTGCAGCTTTCCCTGCCCCCAT

CGAGAAAACCATCTCCAAAACCAAAGGCAGACCGAAGGCTCCACAGGTGTACACCATTCCAC

CTCCCAAGGAGCAGATGGCCAAGGATAAAGTCAGTCTGACCTGCATGATAACAGACTTCTTC

CCTGAAGACATTACTGTGGAGTGGCAGTGGAATGGGCAGCCAGCGGAGAACTACAAGAACA

CTCAGCCCATCATGGACACAGATGGCTCTTACTTCGTCTACAGCAAGCTCAATGTGCAGAAGA

GCAACTGGGAGGCAGGAAATACTTTCACCTGCTCTGTGTTACATGAGGGCCTGCACAACCAC

CATACTGAGAAGAGCCTCTCCCACTCTCCTGGTAAATGA
```

```
Mouse kappa light chain constant region
                                                         (SEQ ID NO: 16)
RADAAPTVSIFPPSSEQLTSGGASVVCFLNNFYPKDINVKWKIDGSERQNGVLNSWTDQDSKDST

YSMSSTLTLTKDEYERHNSYTCEATHKTSTSPIVKSFNRGEC (SEQ ID NO: 27)
CGGGCTGATGCTGCACCAACTGTATCCATCTTCCCACCATCCAGTGAGCAGTTAACATCTGGA

GGTGCCTCAGTCGTGTGCTTCTTGAACAACTTCTACCCCAAAGACATCAATGTCAAGTGGAAG

ATTGATGGCAGTGAACGACAAAATGGCGTCCTGAACAGTTGGACTGATCAGGACAGCAAAGA

CAGCACCTACAGCATGAGCAGCACCCTCACGTTGACTAAGGACGAGTATGAACGACATAACA

GCTATACCTGTGAGGCCACTCACAAGACATCAACTTCACCCATTGTCAAGAGCTTCAACAGG

GGAGAGTGT

Recombinant human TSLP-his
                                                         (SEQ ID NO: 28)
YDFTNCDFEKIKAAYLSTISKDLITYMSGTKSTEFNNTVSCSNRPHCLTEIQSLTFNPTAGCASLAK

EMFAMKTKAALAIWCPGYSETQINATQAMKKRRKRKVTTNKCLEQVSQLQGLWRRFNRPLLKQ

QHHHHHHHHH

Recombinant cynomolgus monkey TSLP-his
                                                         (SEQ ID NO: 29)
MYDFTNCDFQKIEADYLRTISKDLITYMSGTKSTDFNNTVSCSNRPHCLTEIQSLTFNPTPRCASLA

KEMFARKTKATLALWCPGYSETQINATQAMKKRRKRKVTTNKCLEQVSQLLGLWRRFIRTLLKK

QLEHHHHHH human TSLPR-Fc
                                                         (SEQ ID NO: 30)
GAAEGVQIQIIYFNLETVQVTWNASKYSRTNLTFHYRFNGDEAYDQCTNYLLQEGHTSGCLLDAE

QRDDILYFSIRNGTHPVFTASRWMVYYLKPSSPKHVRFSWHQDAVTVTCSDLSYGDLLYEVQYR

SPFDTEWQSKQENTCNVTIEGLDAEKCYSFWVRVKAMEDVYGPDTYPSDWSEVTCWQRGEIRD

ACAETPTPPKPKLSKDIEGRMDEPKSCDKTHTCPPCPAPELLGGPSVFLFPPKPKDTLMISRTPEVT

CVVVDVSHEDPEVKFNWYVDQVEVHNAKTKPREEQYNSTYRVVSVLTVLHQDWLNGKEYKCK

VSNKALPAPIEKTISKAKGQPREPQVYTLPPSREEMTKNQVSLTCLVKGFYPSDIAVEWESNGQPE

NNYKTTPPVLDSDGSFFLYSKLTVDKSRWQQGNVFSCSVMHEALHNHYTQKSLSLSPGK human IL7Ra-Fc
                                                         (SEQ ID NO: 31)
ESGYAQNGDLEDAELDDYSFSCYSQLEVNGSQHSLTCAFEDPDVNTTNLEFEICGALVEVKCLNF

RKLQEIYFIETKKFLLIGKSNICVKYGEKSLTCKKIDLTTIVKPEAPFDLSVIYREGANDFVVTFNTS

HLQKKYVKVLMHDVAYRQEKDENKWTHVNLSSTKLTLLQRKLQPAAMYEIKVRSIPDHYFKGF

WSEWSPSYYFRTPEINNSSGEPKSCDKTHTCPPCPAPELLGGPSVFLFPPKPKDTLMISRTPEVTCV

VVDVSHEDPEVKFNWYVDQVEVHNAKTKPREEQYNSTYRVVSVLTVLHQDWLNQKEYKCKVS

NKALPAPIEKTISKAKGQPREPQVYTLPPSREEMTKNQVSLTCLVKGFYPSDIAVEWESNGQPENN

YKTTPPVLDSDQSFFLYSKLTVDKSRWQQGNVFSCSVMHEALHNHYTQKSLSLSPGK human TSLP-Fc
                                                         (SEQ ID NO: 32)
YDFTNCDFEKIKAAYLSTISKDLITYMSGTKSTEFNNTVSCSNRPHCLTEIQSLTFNPTAGCASLAK

EMFAMKTKAALAIWCPGYSETQINATQAMKKRRKRKVTTNKCLEQVSQLQGLWRRFNRPLLKQ

QEPKSCDKTHTCPPCPAPELLGGPSVFLFPPKPKDTLMISRTPEVTCVVVDVSHEDPEVKFNWYVD

GVEVHNAKTKPREEQYNSTYRVVSVLTVLHQDWLNGKEYKCKVSNKALPAPIEKTISKAKGQPR

EPQVYTLPPSREEMTKNQVSLTCLVKGFYPSDIAVEWESNGQPENNYKTTPPVLDSDGSFFLYSKL

TVDKSRWQQGNVFSCSVMHEALHNHYTQKSLSLSPGK
```

-continued human TSLPR
(SEQ ID NO: 33)
MGRLVLLWGAAVFLLGGWMALGQGGAAEGVQIQIIYFNLETVQVTWNASKYSRTNLTFHYRFN

GDEAYDQCTNYLLQEGHTSGCLLDAEQRDDILYFSIRNGTHPVFTASRWMVYYLKPSSPKHVRFS

WHQDAVTVTCSDLSYGDLLYEVQYRSPFDTEWQSKQENTCNVTIEGLDAEKCYSFWVRVKAME

DVYGPDTYPSDWSEVTCWQRGEIRDACAETPTPPKPKLSKFILISSLAILLMVSLLLLSLWKLWRV

KKFLIPSVPDPKSIFPGLFEIHQGNFQEWITDTQNVAHLHKMAGAEQESGPEEPLVVQLAKTEAESP

RMLDPQTEEKEASGGSLQLPHQPLQGGDVVTIGGFTFVMNDRSYVAL

Human IL7R
(SEQ ID NO: 34)
MTILGTTFGMVFSLLQVVSGESGYAQNGDLEDAELDDYSFSCYSQLEVNGSQHSLTCAFEDPDVN

TTNLEFEICGALVEVKCLNFRKLQEIYFIETKKFLLIGKSNICVKVGEKSLTCKKIDLTTIVKPEAPF

DLSVIYREGANDFVVTFNTSHLQKKYVKVLMHDVAYRQEKDENKWTHVNLSSTKLTLLQRKLQ

PAAMYEIKVRSIPDHYFKGFWSEWSPSYYFRTPEINNSSGEMDPILLTISILSFFSVALLVILACVLW

KKRIKPIVWPSLPDHKKTLEHLCKKPRKNLNVSFNPESFLDCQIHRVDDIQARDEVEGFLQDTFPQ

QLEESEKQRLGGDVQSPNCPSEDVVVTPESFGRDSSLTCLAGNVSACDAPILSSSRSLDCRESGKN

GPHVYQDLLLSLGTTNSTLPPPFSLQSGILTLNPVAQGQPILTSLGSNQEEAYVTMSSFYQNQ

Heavy chain of Tezepelumab
(SEQ ID NO.: 35)
QMQLVESGGGVVQPGRSLRLSCAASGFTFRTYGMHWVRQAPGKGLEWVAVIWYDGSNKHYAD

SVKQRFTITRDNSKNTLNLQMNSLRAEDTAVYYCARAPQWELVHEAFDIWGQGTMVTVSSASTK

GPSVFPLAPCSRSTSESTAALGCLVKDYFPEPVTVSWNSGALTSGVHTFPAVLQSSGLYSLSSVVT

VPSSNFGTQTYTCNVDHKPSNTKVDKTVERKCCVECPPCPAPPVAGPSVFLFPPKPKDTLMISRTP

EVTCVVVDVSHEDPEVQFNWYVDGVEVHNAKIKPREEQFNSTFRVVSVLTVVHQDWLNGKEY

KCKVSNKGLPAPIEKTISKTKGQPREPQVYTLPPSREEMTKNQVSLTCLVKGFYPSDIAVEWESNG

QPENNYKTTPPMLDSDGSFFLYSKLTVDKSRWQQQGNVFSCSVMHEALHNHYTQKSLSLSPGK

Light chain of Tezepelumab
(SEQ ID NO.: 36)
SYVLTQPPSYSVAPGQTARITCGGNNLGSKSVHWYQQKPGQAPVLVVYDDSDRPSWIPERFSGSN

SGNTAILTISRGEAGDEADYYCQVWDSSSDHVVFGGGTKLTVLGQPKAAPSVTLFPPSSEELQAN

KATLVCLISDFYPGAVTVAWKADSSPVKAGVETTTPSKQSNNKYAASSYLSLTPEQWKSHRSYSC

QVTHEGSTVEKTVAPTECS

VH-CDR1 for mouse antibody D1D8H9F7
(SEQ ID NO.: 37)
SYYMN

VH-CDR2 for mouse antibody D1D8H9F7
(SEQ ID NO.: 38)
QIYPGDGETNYNGKFKD

VH-CDR3 for mouse antibody D1D8H9F7
(SEQ ID NO.: 39)
AGYSDYVYAMDY

VL-CDR1 for mouse antibody D1D8H9F7
(SEQ ID NO.: 40)
SVSSSITSSNLH

VL-CDR2 for mouse antibody D1D8H9F7
(SEQ ID NO.: 41)
GTSNLAS

VL-CDR3 for mouse antibody D1D8H9F7
(SEQ ID NO.: 42)
QQWSSFPL

```
VH for mouse antibody D1D8H9F7
                                                  (SEQ ID NO.: 43)
QVQLQQSGADLVRPGSSVKISCKTSGFAFSSYYMNWVKQRPGQGLEWIGQIYPQDGETNYNGKF

KDKATLTADKSSSTVYMQLSSLTSEDSAVYFCARAGYSDVYAMDYWGQGTSYTVSS (SEQ ID NO.: 45)
CAGGTTCAGCTGCAGCAGTCTGGGGCTGACCTGGTGAGGCCTGGGTCCTCAGTGAAGATTTCC

TGCAAGACTTCTGGCTTTGCATTCAGTAGCTACTATATGAACTGGGTGAAGCAGAGGCCTGGA

CAGGGTCTTGAGTGGATTGGACAGATTTATCCTGGAGATGGTGAAACTAACTACAATGGAAA

GTTCAAGGATAAAGCCACACTGACTGCAGACAAATCCTCCAGCACAGTCTACATGCAGCTCA

GCAGCCTAACATCTGAGGACTCTGCGGTCTACTTCTGTGCAAGAGCGGGTTATAGTGACTACG

TTTATGCTATGGACTACTGGGGTCAAGGAACCTCAGTCACCGTCTCCTCA

VL for mouse antibody D1D8H9F7
                                                  (SEQ ID NO.: 44)
EIVLTQSPALMAASPGEKVTIICSVSSSITSSNLHWYQQKSETSPKPWIYGTSNLASGVPVRFSGSGS

GTSYSLTISSMEAEDAATYYCQQWSSFPLTFGSGTKLEIK (SEQ ID NO.: 46)
GAAATTGTGCTCACCCAGTCTCCAGCACTCATGGCTGCATCTCCAGGGGAGAAGGTCACCATC

ATCTGCAGTGTCAGCTCAAGTATAACTTCCAGCAACCTGCACTGGTACCAGCAGAAGTCAGA

AACCTCCCCCAAACCCTGGATTTATGGCACATCCAACCTGGCTTCTGGAGTCCCTGTTCGCTT

CAGTGGCAGTGGATCTGGGACCTCTTATTCTCTCACAATCAGCAGCATGGAGGCTGAAGATG

CTGCCACTTATTACTGTCAACAGTGGAGTACTTTCCCACTCACGTTCGGCTCGGGGACAAAGT

TGGAAATAAAA

VH-CDR1 for mouse antibody D1C2H1H1
                                                  (SEQ ID NO.: 47)
TYGMGIG VH-CDR2 for mouse antibody D1C2H1H1
                                                  (SEQ ID NO.: 48)
SIWWDDNRYFNAALKS VH-CDR3 for mouse antibody D1C2H1H1
                                                  (SEQ ID NO.: 49)
IEDGYYSYHSY VL-CDR1 for mouse antibody D1C2H1H1
                                                  (SEQ ID NO.: 50)
KASQSVDFDGDSYMN VL-CDR2 for mouse antibody D1C2H1H1
                                                  (SEQ ID NO.: 51)
AASNLVS VL-CDR3 for mouse antibody D1C2H1H1
                                                  (SEQ ID NO.: 52)
QQIDEDPYT VH for mouse antibody D1C2H1H1
                                                  (SEQ ID NO.: 53)
QVTLKESGPGILQPSQTLSLTCSFSGFSLSTYGMGIGWIRLPSGKGLEWLASIWWDDNRYFNAALK

SRLTISKDASKNQVFLKIASVDTADTATYYCARIEDGYYSYHSYWGQGTLVTVSA (SEQ ID NO.: 55)
CAGGTTACTCTGAAAGAGTCTGGCCCTGGGATATTGCAGCCCTCCCAGACCCTCAGTCTGACT

TGTTCTTTCTCTGGGTTTTCACTGAGCACTTATGGCATGGGTATAGGCTGGATTCGTCTGCCTT

CGGGGAAGGGTCTGGAGTGGCTGGCAAGCATTTGGTGGGATGATAATAGATACTTTAACGCT

GCCCTGAAGAGCCGGCTCACTATCTCCAAGGATGCCTCCAAAAACCAGGTATTCCTCAAGAT

CGCCAGTGTGGACACTGCAGATACTGCCACATATTATTGTGCTGAATAGAGGACGGCTATTA

TAGTTATCACTCTTACTGGGGCCAAGGGACTCTGGTCACTGTCTCTGCA
```

-continued

VL for mouse antibody D1C2H1H1
(SEQ ID NO.: 54)
DIVLTQSPASLAVSLGQRATISCKASQSYDFDGDSYMNWFQQKPGQPPKLLIYAASNLVSGIPARF

SGSGSGTDFTLNIHPVEEEDAATYYCQQIDEDPYTFGGGTKLEIE (SEQ ID NO.: 56)
GACATTGTGCTGACCCAATCTCCAGCTTCTTTGGCTGTGTCTCTAGGGCAGAGGGCCACCATC

TCCTGCAAGGCCAGCCAAAGTGTTGATTTTGATGGTGATAGTTATATGAACTGGTTCCAACAG

AAACCAGGACAGCCACCCAAACTCCTCATCTATGCTGCATCCAATCTAGTATCTGGGATCCCA

GCCAGGTTTAGTGGCAGTGGGTCTGGGACAGACTTCACCCTCAACATCCATCCTGTGGAGGA

GGAGGATGCTGCAACCTATTACTGTCAGCAAATTGATGAGGATCCGTACACGTTCGGAGGGG

GGACCAAGCTGGAAATAGAA

Having thus described in detail preferred embodiments of the present disclosure, it is to be understood that the disclosure defined by the above paragraphs is not to be limited to particular details set forth in the above description as many apparent variations thereof are possible without departing from the spirit or scope of the present disclosure.

---

We claim:

1. An isolated monoclonal antibody, or an antigen-binding portion thereof, which binds to thymic stromal lymphopoietin (TSLP), comprising (i) a heavy chain variable region (VH) comprising a VH CDR1 region, a VH CDR2 region and a VH CDR3 region, wherein the VH CDR1 region, the VH CDR2 region and the VH CDR3 region comprise amino acid sequences of (1) SEQ ID NOs: 1, 2 and 3, respectively; (2) SEQ ID Nos: 37, 38, and 39, respectively; or (3) SEQ ID NOs: 47, 48, and 49, respectively, and/or (ii) a light chain variable region (VL) comprising a VL CDR1 region, a VL CDR2 region and a VL CDR3 region, wherein the VL CDR1 region, the VL CDR2 region and the VL CDR3 region comprise amino acid sequences of (1) SEQ ID NOs: 4, 5 and 6, respectively; (2) SEQ ID NOs: 40, 41 and 42, respectively; or (3) SEQ ID NOs: 50, 51 and 52, respectively.

2. The isolated monoclonal antibody, or the antigen-binding portion thereof, of claim 1, wherein the heavy chain variable region comprises an amino acid sequence having at least 80%, 81%, 82%, 83%, 84%, 85%, 86%, 87%, 88%, 89%, 90%, 91%, 92%, 93%, 94% 95%, 96%, 97%, 98%, 99% or 100% identity to SEQ ID NOs: 7, 8, 9, 43 or 53.

3. The isolated monoclonal antibody, or the antigen-binding portion thereof, of claim 1, wherein the light chain variable region comprises an amino acid sequence having at least 80%, 81%, 82%, 83%, 84%, 85%, 86%, 87%, 88%, 89%, 90%, 91%, 92%, 93%, 94% 95%, 96%, 97%, 98%, 99% or 100% identity to SEQ ID NOs: 10, 11, 44 or 54.

4. The isolated monoclonal antibody, or an antigen-binding portion thereof, of claim 1, wherein the heavy chain variable region and the light chain variable region comprise amino acid sequences having at least 80%, 81%, 82%, 83%, 84%, 85%, 86%, 87%, 88%, 89%, 90%, 91%, 92%, 93%, 94% 95%, 96%, 97%, 98%, 99% or 100% identity to (1) SEQ ID NOs: 7 and 10; (2) SEQ ID NOs: 8 and 11; or (3) SEQ ID NOs: 9 and 11.

5. The isolated monoclonal antibody, or an antigen-binding portion thereof, of claim 1, comprising a heavy chain constant region having an amino acid sequence of SEQ ID NOs: 12, 13 or 57, linked to the heavy chain variable region, and a light chain constant region having an amino acid sequence of SEQ ID NO: 14, linked to the light chain variable region.

6. The isolated monoclonal antibody, or the antigen-binding portion thereof, of claim 1, which (i) binds human TSLP; (ii) binds to monkey TSLP; and/or (iii) blocks human TSLP-human TSLPR/IL7R interaction.

7. The isolated monoclonal antibody, or the antigen-binding portion thereof, of claim 1, which is a mouse, chimeric or humanized antibody.

8. The isolated monoclonal antibody, or the antigen-binding portion thereof, of claim 1, which is an IgG1, IgG2 or IgG4 isotype.

9. The isolated antibody of claim 1, wherein the VH region comprises the amino acid sequence of SEQ ID NO. 9, wherein X1=R or K, X2=V or A, and X3=R or V.

10. The isolated antibody of claim 9, wherein the VH region comprises the amino acid sequence of SEQ ID NO. 9, wherein X1=R, X2=V, and X3=R.

11. The isolated antibody of claim 1, wherein the VL region comprises the amino acid sequence of SEQ ID NO. 11, wherein X1=S or A and X2=V or I.

12. The isolated antibody of claim 11, wherein the VL region comprises the amino acid sequence of SEQ ID NO. 11, wherein X1=A and X2=I.

13. The isolated antibody of claim 1, wherein the VH region comprises the amino acid sequence of SEQ ID NO. 9, wherein X1=R or K, X2=V or A, and X3=R or V and wherein the VL region comprises the amino acid sequence of SEQ ID NO. 11, wherein X1=A and X2=I.

14. A polynucleotide encoding the isolated monoclonal antibody, or the antigen-binding portion thereof, of claim 1.

15. A vector containing the polynucleotide according to claim 14.

16. An isolated host cell having its genome integrated with the polynucleotide according to claim 14.

17. An isolated host cell containing the vector according to claim 15.

18. A pharmaceutical composition comprising a therapeutically effective amount of the isolated monoclonal antibody, or antigen-binding portion thereof, of claim 1, and a pharmaceutically acceptable carrier.

19. The pharmaceutical composition of claim 18, further comprising an anti-asthma agent, anti-ulcerative colitis drug, anti-atopic dermatitis drug, or anti-psoriasis drug.

20. The pharmaceutical composition of claim 19, wherein the anti-asthma agent is an antibody selected from the group consisting of an anti-TSLPR/IL7R antibody, an anti-IL4 antibody, an anti-IL4R antibody, an anti-IL-5 antibody, an anti-IL5R antibody, an anti-IL13 antibody, an anti-IL13R antibody and an anti-IgE antibody.

21. A method for treating a disease associated with TSLP overexpression in a subject in need thereof, comprising administering to the subject the pharmaceutical composition of claim 18.

22. The method of claim 21, wherein the disease is asthma, ulcerative colitis, atopic dermatitis or psoriasis.

23. The method of claim 22, wherein the disease is atopic dermatitis.

24. The method of claim 22, wherein the disease is asthma.

* * * * *

SEQUENCE LISTING

```
<160> NUMBER OF SEQ ID NOS: 58

<210> SEQ ID NO 1
<211> LENGTH: 5
<212> TYPE: PRT
<213> ORGANISM: Artificial Sequence
<220> FEATURE:
<223> OTHER INFORMATION: VH-CDR1 for mouse, chimeric and humanized
      1C5F12E9 antibodies

<400> SEQUENCE: 1

Thr Tyr Trp Met His
1               5

<210> SEQ ID NO 2
<211> LENGTH: 17
<212> TYPE: PRT
<213> ORGANISM: Artificial Sequence
<220> FEATURE:
<223> OTHER INFORMATION: VH-CDR2 for mouse, chimeric and humanized
      1C5F12E9 antibodies

<400> SEQUENCE: 2

Val Ile Asp Pro Ser Asp Ser Asp Thr Thr Tyr Asn Gln Lys Phe Lys
1               5                   10                  15

Gly

<210> SEQ ID NO 3
<211> LENGTH: 8
<212> TYPE: PRT
<213> ORGANISM: Artificial Sequence
<220> FEATURE:
<223> OTHER INFORMATION: VH-CDR3 for mouse, chimeric and humanized
      1C5F12E9 antibodies

<400> SEQUENCE: 3

Ser Leu Asp Gly Tyr Tyr Asp Tyr
1               5

<210> SEQ ID NO 4
<211> LENGTH: 11
<212> TYPE: PRT
<213> ORGANISM: Artificial Sequence
<220> FEATURE:
<223> OTHER INFORMATION: VL-CDR1 for mouse, chimeric and humanized
```

1C5F12E9 antibodies

<400> SEQUENCE: 4

```
Arg Pro Thr Glu Asn Ile Tyr Ser Tyr Leu Ala
1               5                   10
```

<210> SEQ ID NO 5
<211> LENGTH: 7
<212> TYPE: PRT
<213> ORGANISM: Artificial Sequence
<220> FEATURE:
<223> OTHER INFORMATION: VL-CDR2 for mouse, chimeric and humanized
      1C5F12E9 antibodies

<400> SEQUENCE: 5

```
Phe Ala Arg Thr Leu Ala Glu
1               5
```

<210> SEQ ID NO 6
<211> LENGTH: 9
<212> TYPE: PRT
<213> ORGANISM: Artificial Sequence
<220> FEATURE:
<223> OTHER INFORMATION: VL-CDR3 for mouse, chimeric and humanized
      1C5F12E9 antibodies

<400> SEQUENCE: 6

```
Gln His His Tyr Gly Thr Pro Trp Thr
1               5
```

<210> SEQ ID NO 7
<211> LENGTH: 117
<212> TYPE: PRT
<213> ORGANISM: Artificial Sequence
<220> FEATURE:
<223> OTHER INFORMATION: VH for mouse and chimeric 1C5F12E9 antibodies

<400> SEQUENCE: 7

```
Gln Val Gln Leu Gln Gln Pro Gly Thr Glu Leu Val Lys Pro Gly Ala
1               5                   10                  15

Ser Val Lys Met Ser Cys Lys Ala Ser Gly Tyr Thr Phe Thr Thr Tyr
            20                  25                  30

Trp Met His Trp Val Lys Gln Arg Pro Gly Gln Gly Leu Glu Trp Ile
        35                  40                  45

Gly Val Ile Asp Pro Ser Asp Ser Asp Thr Thr Tyr Asn Gln Lys Phe
    50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Thr Arg Ser Leu Asp Gly Tyr Tyr Asp Tyr Trp Gly Gln Gly Thr Thr
            100                 105                 110

Leu Thr Val Ser Ser
        115
```

<210> SEQ ID NO 8
<211> LENGTH: 117
<212> TYPE: PRT
<213> ORGANISM: Artificial Sequence
<220> FEATURE:
<223> OTHER INFORMATION: VH for hu1C5F12E9-V1, hu1C5F12E9-V7, and
      hu1C5F12E9-V13

<400> SEQUENCE: 8

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Trp Met His Trp Val Arg Gln Ala Pro Gly Gln Gly Leu Glu Trp Ile
        35                  40                  45

Gly Val Ile Asp Pro Ser Asp Ser Asp Thr Thr Tyr Asn Gln Lys Phe
    50                  55                  60

Lys Gly Arg Ala Thr Leu Thr Val Asp Thr Ser Ser Thr Ala Tyr
65                  70                  75                  80

Met Glu Leu Ser Ser Leu Arg Ser Glu Asp Thr Ala Val Tyr Tyr Cys
            85                  90                  95

Thr Arg Ser Leu Asp Gly Tyr Tyr Asp Tyr Trp Gly Gln Gly Thr Leu
            100                 105                 110

Val Thr Val Ser Ser
        115

<210> SEQ ID NO 9
<211> LENGTH: 117
<212> TYPE: PRT
<213> ORGANISM: Artificial Sequence
<220> FEATURE:
<223> OTHER INFORMATION: VH for hu1C5F12E9-V2 to hu1C5F12E9-V6,
      hu1C5F12E9-V8 to hu1C5F12E9-V12, and hu1C5F12E9-V14 to
      hu1C5F12E9-V18
<220> FEATURE:
<221> NAME/KEY: misc_feature
<222> LOCATION: (67)..(67)
<223> OTHER INFORMATION: Xaa can be Arg or Lys
<220> FEATURE:
<221> NAME/KEY: misc_feature
<222> LOCATION: (68)..(68)
<223> OTHER INFORMATION: Xaa can be Val or Ala
<220> FEATURE:
<221> NAME/KEY: misc_feature
<222> LOCATION: (72)..(72)
<223> OTHER INFORMATION: Xaa can be Arg or Val

<400> SEQUENCE: 9

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Trp Met His Trp Val Arg Gln Ala Pro Gly Gln Gly Leu Glu Trp Met
        35                  40                  45

Gly Val Ile Asp Pro Ser Asp Ser Asp Thr Thr Tyr Asn Gln Lys Phe
    50                  55                  60

Lys Gly Xaa Xaa Thr Met Thr Xaa Asp Thr Ser Thr Ser Thr Val Tyr
65                  70                  75                  80

Met Glu Leu Ser Ser Leu Arg Ser Glu Asp Thr Ala Val Tyr Tyr Cys
            85                  90                  95

Thr Arg Ser Leu Asp Gly Tyr Tyr Asp Tyr Trp Gly Gln Gly Thr Leu
            100                 105                 110

Val Thr Val Ser Ser
        115

<210> SEQ ID NO 10
<211> LENGTH: 107
<212> TYPE: PRT
<213> ORGANISM: Artificial Sequence
<220> FEATURE:

<223> OTHER INFORMATION: VL for mouse and chimeric 1C5F12E9 antibodies

<400> SEQUENCE: 10

Asp Ile Gln Met Thr Gln Ser Pro Ala Ser Leu Ser Ala Ser Val Gly
1               5                   10                  15

Glu Thr Val Thr Ile Thr Cys Arg Pro Thr Glu Asn Ile Tyr Ser Tyr
            20                  25                  30

Leu Ala Trp Tyr Gln Gln Lys Gln Gly Lys Ser Pro His Leu Leu Val
        35                  40                  45

Tyr Phe Ala Arg Thr Leu Ala Glu Gly Val Pro Ser Arg Phe Ser Gly
    50                  55                  60

Ser Gly Ser Gly Thr Gln Phe Ser Leu Lys Ile Asn Ser Leu Gln Pro
65                  70                  75                  80

Glu Asp Phe Gly Ile Tyr Tyr Cys Gln His His Tyr Gly Thr Pro Trp
                85                  90                  95

Thr Phe Gly Gly Gly Thr Lys Leu Glu Ile Lys
            100                 105

<210> SEQ ID NO 11
<211> LENGTH: 107
<212> TYPE: PRT
<213> ORGANISM: Artificial Sequence
<220> FEATURE:
<223> OTHER INFORMATION: VL for hu1C5F12E9-V1 to hu1C5F12E9-V18
<220> FEATURE:
<221> NAME/KEY: misc_feature
<222> LOCATION: (43)..(43)
<223> OTHER INFORMATION: Xaa can Ser or Ala
<220> FEATURE:
<221> NAME/KEY: misc_feature
<222> LOCATION: (48)..(48)
<223> OTHER INFORMATION: Xaa can be Val or Ile

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Arg Pro Thr Glu Asn Ile Tyr Ser Tyr
            20                  25                  30

Leu Ala Trp Tyr Gln Gln Lys Pro Gly Lys Xaa Pro Lys Leu Leu Xaa
        35                  40                  45

Tyr Phe Ala Arg Thr Leu Ala Glu Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His His Tyr Gly Thr Pro Trp
                85                  90                  95

Thr Phe Gly Gly Gly Thr Lys Val Glu Ile Lys
            100                 105

<210> SEQ ID NO 12
<211> LENGTH: 330
<212> TYPE: PRT
<213> ORGANISM: Artificial Sequence
<220> FEATURE:
<223> OTHER INFORMATION: Human IgG1 heavy chain constant region

<400> SEQUENCE: 12

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
              35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Leu Gly Thr Gln Thr
 65                  70                  75                  80

Tyr Ile Cys Asn Val Asn His Lys Pro Ser Asn Thr Lys Val Asp Lys
                  85                  90                  95

Lys Val Glu Pro Lys Ser Cys Asp Lys Thr His Thr Cys Pro Pro Cys
                 100                 105                 110

Pro Ala Pro Glu Leu Leu Gly Gly Pro Ser Val Phe Leu Phe Pro Pro
                 115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                 165                 170                 175

Glu Gln Tyr Asn Ser Thr Tyr Arg Val Val Ser Val Leu Thr Val Leu
                 180                 185                 190

His Gln Asp Trp Leu Asn Gly Lys Glu Tyr Lys Cys Lys Val Ser Asn
                 195                 200                 205

Lys Ala Leu Pro Ala Pro Ile Glu Lys Thr Ile Ser Lys Ala Lys Gly
                 210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                 245                 250                 255

Pro Ser Asp Ile Ala Val Glu Trp Glu Ser Asn Gly Gln Pro Glu Asn
                 260                 265                 270

Asn Tyr Lys Thr Thr Pro Pro Val Leu Asp Ser Asp Gly Ser Phe Phe
                 275                 280                 285

Leu Tyr Ser Lys Leu Thr Val Asp Lys Ser Arg Trp Gln Gln Gly Asn
                 290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                 325                 330

<210> SEQ ID NO 13
<211> LENGTH: 327
<212> TYPE: PRT
<213> ORGANISM: Artificial Sequence
<220> FEATURE:
<223> OTHER INFORMATION: Human IgG4 heavy chain constant region

<400> SEQUENCE: 13

Ala Ser Thr Lys Gly Pro Ser Val Phe Pro Leu Ala Pro Cys Ser Arg
 1               5                  10                  15

Ser Thr Ser Glu Ser Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
                 35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 14
<211> LENGTH: 107
<212> TYPE: PRT
<213> ORGANISM: Artificial Sequence
<220> FEATURE:
<223> OTHER INFORMATION: Human kappa light chain constant region

<400> SEQUENCE: 14

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 15
<211> LENGTH: 324
<212> TYPE: PRT
<213> ORGANISM: Artificial Sequence
<220> FEATURE:
<223> OTHER INFORMATION: Mouse IgG1 heavy chain constant region

<400> SEQUENCE: 15

Ala Lys Thr Thr Pro Pro Ser Val Tyr Pro Leu Ala Pro Gly Ser Ala
1               5                   10                  15

Ala Gln Thr Asn Ser Met Val Thr Leu Gly Cys Leu Val Lys Gly Tyr
            20                  25                  30

Phe Pro Glu Pro Val Thr Val Thr Trp Asn Ser Gly Ser Leu Ser Ser
        35                  40                  45

Gly Val His Thr Phe Pro Ala Val Leu Gln Ser Asp Leu Tyr Thr Leu
    50                  55                  60

Ser Ser Ser Val Thr Val Pro Ser Ser Thr Trp Pro Ser Glu Thr Val
65                  70                  75                  80

Thr Cys Asn Val Ala His Pro Ala Ser Ser Thr Lys Val Asp Lys Lys
                85                  90                  95

Ile Val Pro Arg Asp Cys Gly Cys Lys Pro Cys Ile Cys Thr Val Pro
            100                 105                 110

Glu Val Ser Ser Val Phe Ile Phe Pro Pro Lys Pro Lys Asp Val Leu
        115                 120                 125

Thr Ile Thr Leu Thr Pro Lys Val Thr Cys Val Val Val Asp Ile Ser
    130                 135                 140

Lys Asp Asp Pro Glu Val Gln Phe Ser Trp Phe Val Asp Asp Val Glu
145                 150                 155                 160

Val His Thr Ala Gln Thr Gln Pro Arg Glu Glu Gln Phe Asn Ser Thr
                165                 170                 175

Phe Arg Ser Val Ser Glu Leu Pro Ile Met His Gln Asp Trp Leu Asn
            180                 185                 190

Gly Lys Glu Phe Lys Cys Arg Val Asn Ser Ala Ala Phe Pro Ala Pro
        195                 200                 205

Ile Glu Lys Thr Ile Ser Lys Thr Lys Gly Arg Pro Lys Ala Pro Gln
    210                 215                 220

Val Tyr Thr Ile Pro Pro Pro Lys Glu Gln Met Ala Lys Asp Lys Val
225                 230                 235                 240

Ser Leu Thr Cys Met Ile Thr Asp Phe Phe Pro Glu Asp Ile Thr Val
                245                 250                 255

Glu Trp Gln Trp Asn Gly Gln Pro Ala Glu Asn Tyr Lys Asn Thr Gln
            260                 265                 270

Pro Ile Met Asp Thr Asp Gly Ser Tyr Phe Val Tyr Ser Lys Leu Asn
        275                 280                 285

Val Gln Lys Ser Asn Trp Glu Ala Gly Asn Thr Phe Thr Cys Ser Val
    290                 295                 300

Leu His Glu Gly Leu His Asn His His Thr Glu Lys Ser Leu Ser His
305                 310                 315                 320

Ser Pro Gly Lys

<210> SEQ ID NO 16
<211> LENGTH: 107

```
<212> TYPE: PRT
<213> ORGANISM: Artificial Sequence
<220> FEATURE:
<223> OTHER INFORMATION: Mouse kappa light chain constant region

<400> SEQUENCE: 16

Arg Ala Asp Ala Ala Pro Thr Val Ser Ile Phe Pro Pro Ser Ser Glu
1               5                   10                  15

Gln Leu Thr Ser Gly Gly Ala Ser Val Val Cys Phe Leu Asn Asn Phe
            20                  25                  30

Tyr Pro Lys Asp Ile Asn Val Lys Trp Lys Ile Asp Gly Ser Glu Arg
        35                  40                  45

Gln Asn Gly Val Leu Asn Ser Trp Thr Asp Gln Asp Ser Lys Asp Ser
    50                  55                  60

Thr Tyr Ser Met Ser Ser Thr Leu Thr Leu Thr Lys Asp Glu Tyr Glu
65                  70                  75                  80

Arg His Asn Ser Tyr Thr Cys Glu Ala Thr His Lys Thr Ser Thr Ser
                85                  90                  95

Pro Ile Val Lys Ser Phe Asn Arg Gly Glu Cys
            100                 105

<210> SEQ ID NO 17
<211> LENGTH: 351
<212> TYPE: DNA
<213> ORGANISM: Artificial Sequence
<220> FEATURE:
<223> OTHER INFORMATION: VH for mouse and chimeric 1C5F12E9 antibodies

<400> SEQUENCE: 17
caggtccaac tgcagcagcc tgggactgag ctggtgaagc ctggggcttc agtgaagatg     60
tcctgcaagg cttctggcta caccttcacc acctactgga tgcactgggt gaagcagagg    120
cctggacaag gccttgagtg gatcggagtg attgatcctt ctgatagtga tactacctac    180
aatcaaaagt tcaagggcaa ggccacattg actgtagaca catcctccag cacagcctac    240
atgcagctca gcagcctgac atctgaggac tctgcggtct attactgtac aaggtccctt    300
gatggttact acgactactg gggccaaggc accactctca cagtctcctc a             351

<210> SEQ ID NO 18
<211> LENGTH: 351
<212> TYPE: DNA
<213> ORGANISM: Artificial Sequence
<220> FEATURE:
<223> OTHER INFORMATION: VH for mouse and chimeric 1C5F12E9 antibodies

<400> SEQUENCE: 18
caggtgcagc tgcagcagcc cggcaccgag ctggtgaagc ctggcgctag cgtgaagatg     60
tcctgtaagg ccagcggcta cacattcact acatactgga tgcactgggt gaagcagaga    120
cctggccagg gcctggagtg gatcggcgtg atcgacccca gcgactccga taccacctac    180
aaccagaagt ttaagggcaa ggccaccctg acagtggata aagtcctc cacagcctac       240 atgcagctgt ccagcctgac ctccgaggat tccgccgtgt actactgcac aaggtccctg    300
gatggctact acgattactg gggccagggc acaaccctga cagtcagcag c             351

<210> SEQ ID NO 19
<211> LENGTH: 351
<212> TYPE: DNA
<213> ORGANISM: Artificial Sequence
<220> FEATURE:
<223> OTHER INFORMATION: VH for hu1C5F12E9-V2, hu1C5F12E9-V8, and
``` hu1C5F12E9-V14

<400> SEQUENCE: 19

| caggtgcagc tggtgcagag cggcgccgag gtgaagaagc ctggcgcctc cgtgaaggtg | 60 |
| tcctgcaagg ccagcggcta cacattcacc acatactgga tgcactgggt gagacaggcc | 120 |
| cccggccagg gactggagtg gatgggagtg atcgacccca gcgactccga cacaacctac | 180 |
| aaccagaagt tcaagggcag ggtgacaatg accagagaca ccagcacaag caccgtgtac | 240 |
| atggagctgt cctccctgag gagcgaggac accgccgtgt actactgcac cagatccctg | 300 |
| gacggctact acgactactg gggccagggc accctggtga cagtgtccag c | 351 |

<210> SEQ ID NO 20
<211> LENGTH: 321
<212> TYPE: DNA
<213> ORGANISM: Artificial Sequence
<220> FEATURE:
<223> OTHER INFORMATION: VL for mouse and chimeric 1C5F12E9 antibodies

<400> SEQUENCE: 20

| gacatccaga tgactcagtc tccagcctcc ctatctgcat ctgtgggaga aactgtcacc | 60 |
| atcacatgtc gaccaactga gaatatttac agttatttag catggtatca gcagaaacag | 120 |
| ggaaaatctc ctcacctcct ggtctatttt gcaagaacct tagcagaagg tgtgccatca | 180 |
| aggttcagtg gcagtggatc aggcacacag ttttctctga gatcaacag cctgcagcct | 240 |
| gaagattttg ggatttatta ctgtcaacac cattatggta ctccgtggac gttcggtgga | 300 |
| ggcaccaagc tggaaatcaa a | 321 |

<210> SEQ ID NO 21
<211> LENGTH: 321
<212> TYPE: DNA
<213> ORGANISM: Artificial Sequence
<220> FEATURE:
<223> OTHER INFORMATION: VL for mouse and chimeric 1C5F12E9 antibodies

<400> SEQUENCE: 21

| gacatccaga tgacccagtc ccccgccagc ctgtccgcct ctgtgggaga gaccgtgacc | 60 |
| atcacatgca ggcccaccga gaatatctac tcctacctgg cctggtatca acagaagcag | 120 |
| ggcaagagcc ctcacctgct ggtgtacttc gccaggacac tggccgaggg cgtgccctct | 180 |
| aggttcagcg gcagcggctc cggcacacag ttttccctga gatcaacag cctgcagcct | 240 |
| gaggattttg gcatctacta ctgccagcac cactacggca cccctggac ctttggcggc | 300 |
| ggcaccaagc tggagatcaa g | 321 |

<210> SEQ ID NO 22
<211> LENGTH: 321
<212> TYPE: DNA
<213> ORGANISM: Artificial Sequence
<220> FEATURE:
<223> OTHER INFORMATION: VL for hu1C5F12E9-V7 - hu1C5F12E9-V12

<400> SEQUENCE: 22

| gatatccaga tgacacagag ccccagcagc ctgagcgcca gcgtgggaga cagggtgaca | 60 |
| atcacatgca gacccaccga gaatatctac agctacctgg cctggtatca acagaagcct | 120 |
| ggcaaggccc ccaagctgct gatctacttc gccagaaccc tggccgaggg cgtgccctct | 180 |
| aggttcagcg gctccggcag cggcaccgac ttcactctga ccatctcctc cctgcagccc | 240 |
| gaggacttcg ccacatacta ctgccagcac cactacggca cccttggac cttcggcggc | 300 |

```
ggcacaaagg tggagatcaa g                                              321
```

<210> SEQ ID NO 23
<211> LENGTH: 993
<212> TYPE: DNA
<213> ORGANISM: Artificial Sequence
<220> FEATURE:
<223> OTHER INFORMATION: Human IgG1 heavy chain constant region

<400> SEQUENCE: 23

```
gctagcacca agggcccatc ggtcttcccc ctggcaccct cctccaagag cacctctggg    60
ggcacagcgg ccctgggctg cctggtcaag gactacttcc ccgaaccggt gacggtgtcg   120
tggaactcag gcgccctgac cagcggcgtg cacaccttcc cggctgtcct acagtcctca   180
ggactctact ccctcagcag cgtggtgacc gtgccctcca gcagcttggg cacccagacc   240
tacatctgca acgtgaatca caagcccagc aacaccaagg tggacaagaa agttgagccc   300
aaatcttgtg acaaaactca cacatgccca ccgtgcccag cacctgaact cctgggggga   360
ccgtcagtct tcctcttccc cccaaaaccc aaggacaccc tcatgatctc ccggacccct   420
gaggtcacat gcgtggtggt ggacgtgagc cacgaagacc ctgaggtcaa gttcaactgg   480
tacgtggacg gcgtggaggt gcataatgcc aagacaaagc cgcgggagga gcagtacaac   540
agcacgtacc gtgtggtcag cgtcctcacc gtcctgcacc aggactggct gaatggcaag   600
gagtacaagt gcaaggtctc caacaaagcc ctcccagccc ccatcgagaa aaccatctcc   660
aaagccaaag gcagccccg agaaccacag gtgtacaccc tgcccccatc ccgggaggag   720
atgaccaaga accaggtcag cctgacctgc ctggtcaaag gcttctatcc cagcgacatc   780
gccgtggagt gggagagcaa tgggcagccg gagaacaact acaagaccac gcctcccgtg   840
ctggactccg acggctcctt cttcctctac agcaagctca ccgtggacaa gagcaggtgg   900
cagcagggga acgtcttctc atgctccgtg atgcatgagg ctctgcacaa ccactacacg   960
cagaagagcc tctccctgtc tccgggtaaa tga                                993
```

<210> SEQ ID NO 24
<211> LENGTH: 984
<212> TYPE: DNA
<213> ORGANISM: Artificial Sequence
<220> FEATURE:
<223> OTHER INFORMATION: Human IgG4 heavy chain constant region

<400> SEQUENCE: 24

```
gccagcacaa agggcccttc cgtgtttccc ctggccccct gcagcaggag cacctctgag    60
tccaccgccg ccctgggctg tctggtgaag gactactttc ccgagcccgt gaccgtgagc   120
tggaattccg gcgccctgac atccggcgtg cacaccttcc ccgccgtgct gcagtcctcc   180
ggcctgtaca gcctgagctc cgtggtgaca gtgccttcct cctccctggg caccaagacc   240
tacacatgta atgtggatca caagcccagc aacacaaagg tggataagag agtggagtcc   300
aagtacggcc ctccttgccc tccctgtcct gccccagagt tcctgggcgg cccctctgtg   360
ttcctgttcc cccctaagcc caaggacaca ctgatgatct ccaggacccc tgaggtgacc   420
tgcgtggtgg tggacgtgag ccaggaggac cctgaggtga gttcaattg gtacgtggat   480
ggcgtggagg tgcacaatgc caagacaaag cccagagagg agcagtttaa ttccacatac   540
agggtggtgt ccgtgctgac cgtgctgcac caggattggc tgaacggcaa ggagtacaag   600
tgtaaggtga gcaacaaggg cctgcccttcc tccatcgaga agacaatcag caaggccaag   660
```

| | |
|---|---:|
| ggccagccta gggagcccca ggtgtacaca ctgcctccca gccaggagga gatgaccaag | 720 |
| aaccaggtga gcctgacctg cctggtgaag ggcttctacc ctagcgacat cgccgtggag | 780 |
| tgggagtcca acggccagcc cgagaataac tacaagacaa cccccccgt gctggattcc | 840 |
| gatggcagct tctttctgta ctccaggctg accgtggata agagcaggtg gcaggagggc | 900 |
| aatgtgttca gctgctccgt gatgcacgag gccctgcaca atcactacac ccagaagagc | 960 |
| ctgtccctga gcctgggcaa gtga | 984 |

<210> SEQ ID NO 25
<211> LENGTH: 324
<212> TYPE: DNA
<213> ORGANISM: Artificial Sequence
<220> FEATURE:
<223> OTHER INFORMATION: Human kappa light chain constant region

<400> SEQUENCE: 25

| | |
|---|---:|
| cgtacggtgg cggcgccatc tgtcttcatc ttcccgccat ctgatgagca gttgaaatct | 60 |
| ggaactgcct ctgttgtgtg cctgctgaat aacttctatc ccagagaggc caaagtacag | 120 |
| tggaaggtgg ataacgccct ccaatcgggt aactcccagg agagtgtcac agagcaggac | 180 |
| agcaaggaca gcacctacag cctcagcagc accctgacgc tgagcaaagc agactacgag | 240 |
| aaacacaaag tctacgcctg cgaagtcacc catcagggcc tgagctcgcc cgtcacaaag | 300 |
| agcttcaaca ggggagagtg ttga | 324 |

<210> SEQ ID NO 26
<211> LENGTH: 975
<212> TYPE: DNA
<213> ORGANISM: Artificial Sequence
<220> FEATURE:
<223> OTHER INFORMATION: Mouse IgG1 heavy chain constant region

<400> SEQUENCE: 26

| | |
|---|---:|
| gccaaaacga cacccccatc tgtctatcca ctggcccctg gatctgctgc ccaaactaac | 60 |
| tccatggtga ccctgggatg cctggtcaag ggctatttcc ctgagccagt gacagtgacc | 120 |
| tggaactctg gatccctgtc cagcggtgtg cacaccttcc cagctgtcct gcagtctgac | 180 |
| ctctacactc tgagcagctc agtgactgtc ccctccagca cctggcccag cgagaccgtc | 240 |
| acctgcaacg ttgcccaccc ggccagcagc accaaggtgg acaagaaaat tgtgcccagg | 300 |
| gattgtggtt gtaagccttg catatgtaca gtcccagaag tatcatctgt cttcatcttc | 360 |
| cccccaaagc ccaaggatgt gctcaccatt actctgactc ctaaggtcac gtgtgttgtg | 420 |
| gtagacatca gcaaggatga tcccgaggtc cagttcagct ggtttgtaga tgatgtggag | 480 |
| gtgcacacag ctcagacgca accccgggag gagcagttca acagcacttt ccgctcagtc | 540 |
| agtgaacttc ccatcatgca ccaggactgg ctcaatggca aggagttcaa atgcagggtc | 600 |
| aacagtgcag ctttccctgc ccccatcgag aaaaccatct ccaaaaccaa aggcagaccg | 660 |
| aaggctccac aggtgtacac cattccacct cccaaggagc agatggccaa ggataaagtc | 720 |
| agtctgacct gcatgataac agacttcttc cctgaagaca ttactgtgga gtggcagtgg | 780 |
| aatgggcagc cagcggagaa ctacaagaac actcagccca tcatggacac agatggctct | 840 |
| tacttcgtct acagcaagct caatgtgcag aagagcaact gggaggcagg aaatactttc | 900 |
| acctgctctg tgttacatga gggcctgcac aaccaccata tgagaagag cctctcccac | 960 |
| tctcctggta aatga | 975 |

<210> SEQ ID NO 27
<211> LENGTH: 321
<212> TYPE: DNA
<213> ORGANISM: Artificial Sequence
<220> FEATURE:
<223> OTHER INFORMATION: Mouse kappa light chain constant region

<400> SEQUENCE: 27

```
cgggctgatg ctgcaccaac tgtatccatc ttcccaccat ccagtgagca gttaacatct    60
ggaggtgcct cagtcgtgtg cttcttgaac aacttctacc ccaaagacat caatgtcaag   120
tggaagattg atggcagtga acgacaaaat ggcgtcctga acagttggac tgatcaggac   180
agcaaagaca gcacctacag catgagcagc accctcacgt tgactaagga cgagtatgaa   240
cgacataaca gctatacctg tgaggccact cacaagacat caacttcacc cattgtcaag   300
agcttcaaca ggggagagtg t                                             321
```

<210> SEQ ID NO 28
<211> LENGTH: 141
<212> TYPE: PRT
<213> ORGANISM: Artificial Sequence
<220> FEATURE:
<223> OTHER INFORMATION: Recombinant human TSLP-his

<400> SEQUENCE: 28

```
Tyr Asp Phe Thr Asn Cys Asp Phe Glu Lys Ile Lys Ala Ala Tyr Leu
1               5                   10                  15
Ser Thr Ile Ser Lys Asp Leu Ile Thr Tyr Met Ser Gly Thr Lys Ser
            20                  25                  30
Thr Glu Phe Asn Asn Thr Val Ser Cys Ser Asn Arg Pro His Cys Leu
        35                  40                  45
Thr Glu Ile Gln Ser Leu Thr Phe Asn Pro Thr Ala Gly Cys Ala Ser
    50                  55                  60
Leu Ala Lys Glu Met Phe Ala Met Lys Thr Lys Ala Ala Leu Ala Ile
65                  70                  75                  80
Trp Cys Pro Gly Tyr Ser Glu Thr Gln Ile Asn Ala Thr Gln Ala Met
                85                  90                  95
Lys Lys Arg Arg Lys Arg Lys Val Thr Thr Asn Lys Cys Leu Glu Gln
            100                 105                 110
Val Ser Gln Leu Gln Gly Leu Trp Arg Arg Phe Asn Arg Pro Leu Leu
        115                 120                 125
Lys Gln Gln His His His His His His His His
    130                 135                 140
```

<210> SEQ ID NO 29
<211> LENGTH: 140
<212> TYPE: PRT
<213> ORGANISM: Artificial Sequence
<220> FEATURE:
<223> OTHER INFORMATION: Recombinant cynomolgus monkey TSLP-his

<400> SEQUENCE: 29

```
Met Tyr Asp Phe Thr Asn Cys Asp Phe Gln Lys Ile Glu Ala Asp Tyr
1               5                   10                  15
Leu Arg Thr Ile Ser Lys Asp Leu Ile Thr Tyr Met Ser Gly Thr Lys
            20                  25                  30
Ser Thr Asp Phe Asn Asn Thr Val Ser Cys Ser Asn Arg Pro His Cys
        35                  40                  45
Leu Thr Glu Ile Gln Ser Leu Thr Phe Asn Pro Thr Pro Arg Cys Ala
    50                  55                  60
```

```
Ser Leu Ala Lys Glu Met Phe Ala Arg Lys Thr Lys Ala Thr Leu Ala
 65                  70                  75                  80

Leu Trp Cys Pro Gly Tyr Ser Glu Thr Gln Ile Asn Ala Thr Gln Ala
                 85                  90                  95

Met Lys Lys Arg Arg Lys Arg Lys Val Thr Thr Asn Lys Cys Leu Glu
            100                 105                 110

Gln Val Ser Gln Leu Leu Gly Leu Trp Arg Arg Phe Ile Arg Thr Leu
        115                 120                 125

Leu Lys Lys Gln Leu Glu His His His His His His
    130                 135                 140
```

<210> SEQ ID NO 30
<211> LENGTH: 446
<212> TYPE: PRT
<213> ORGANISM: Artificial Sequence
<220> FEATURE:
<223> OTHER INFORMATION: human TSLPR-Fc

<400> SEQUENCE: 30

```
Gly Ala Ala Glu Gly Val Gln Ile Gln Ile Ile Tyr Phe Asn Leu Glu
  1               5                  10                  15

Thr Val Gln Val Thr Trp Asn Ala Ser Lys Tyr Ser Arg Thr Asn Leu
             20                  25                  30

Thr Phe His Tyr Arg Phe Asn Gly Asp Glu Ala Tyr Asp Gln Cys Thr
         35                  40                  45

Asn Tyr Leu Leu Gln Glu Gly His Thr Ser Gly Cys Leu Leu Asp Ala
 50                  55                  60

Glu Gln Arg Asp Asp Ile Leu Tyr Phe Ser Ile Arg Asn Gly Thr His
 65                  70                  75                  80

Pro Val Phe Thr Ala Ser Arg Trp Met Val Tyr Leu Lys Pro Ser
                 85                  90                  95

Ser Pro Lys His Val Arg Phe Ser Trp His Gln Asp Ala Val Thr Val
            100                 105                 110

Thr Cys Ser Asp Leu Ser Tyr Gly Asp Leu Leu Tyr Glu Val Gln Tyr
        115                 120                 125

Arg Ser Pro Phe Asp Thr Glu Trp Gln Ser Lys Gln Glu Asn Thr Cys
    130                 135                 140

Asn Val Thr Ile Glu Gly Leu Asp Ala Glu Lys Cys Tyr Ser Phe Trp
145                 150                 155                 160

Val Arg Val Lys Ala Met Glu Asp Val Tyr Gly Pro Asp Thr Tyr Pro
                165                 170                 175

Ser Asp Trp Ser Glu Val Thr Cys Trp Gln Arg Gly Glu Ile Arg Asp
            180                 185                 190

Ala Cys Ala Glu Thr Pro Thr Pro Pro Lys Pro Lys Leu Ser Lys Asp
        195                 200                 205

Ile Glu Gly Arg Met Asp Glu Pro Lys Ser Cys Asp Lys Thr His Thr
    210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285
```

```
Lys Pro Arg Glu Glu Gln Tyr Asn Ser Thr Tyr Arg Val Val Ser Val
            290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Glu Glu Met Thr Lys Asn Gln Val Ser Leu Thr Cys Leu Val
            355                 360                 365

Lys Gly Phe Tyr Pro Ser Asp Ile Ala Val Glu Trp Glu Ser Asn Gly
370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
                420                 425                 430

Asn His Tyr Thr Gln Lys Ser Leu Ser Leu Ser Pro Gly Lys
                435                 440                 445

<210> SEQ ID NO 31
<211> LENGTH: 448
<212> TYPE: PRT
<213> ORGANISM: Artificial Sequence
<220> FEATURE:
<223> OTHER INFORMATION: human IL7Ra-Fc

<400> SEQUENCE: 31

Glu Ser Gly Tyr Ala Gln Asn Gly Asp Leu Glu Asp Ala Glu Leu Asp
1               5                   10                  15

Asp Tyr Ser Phe Ser Cys Tyr Ser Gln Leu Glu Val Asn Gly Ser Gln
            20                  25                  30

His Ser Leu Thr Cys Ala Phe Glu Asp Pro Asp Val Asn Thr Thr Asn
        35                  40                  45

Leu Glu Phe Glu Ile Cys Gly Ala Leu Val Glu Val Lys Cys Leu Asn
50                  55                  60

Phe Arg Lys Leu Gln Glu Ile Tyr Phe Ile Glu Thr Lys Lys Phe Leu
65                  70                  75                  80

Leu Ile Gly Lys Ser Asn Ile Cys Val Lys Val Gly Glu Lys Ser Leu
                85                  90                  95

Thr Cys Lys Lys Ile Asp Leu Thr Thr Ile Val Lys Pro Glu Ala Pro
            100                 105                 110

Phe Asp Leu Ser Val Ile Tyr Arg Glu Gly Ala Asn Asp Phe Val Val
        115                 120                 125

Thr Phe Asn Thr Ser His Leu Gln Lys Lys Tyr Val Lys Val Leu Met
    130                 135                 140

His Asp Val Ala Tyr Arg Gln Glu Lys Asp Glu Asn Lys Trp Thr His
145                 150                 155                 160

Val Asn Leu Ser Ser Thr Lys Leu Thr Leu Leu Gln Arg Lys Leu Gln
                165                 170                 175

Pro Ala Ala Met Tyr Glu Ile Lys Val Arg Ser Ile Pro Asp His Tyr
            180                 185                 190

Phe Lys Gly Phe Trp Ser Glu Trp Ser Pro Ser Tyr Tyr Phe Arg Thr
        195                 200                 205
```

-continued

```
Pro Glu Ile Asn Asn Ser Ser Gly Glu Pro Lys Ser Cys Asp Lys Thr
    210                 215                 220
His Thr Cys Pro Pro Cys Pro Ala Pro Glu Leu Leu Gly Gly Pro Ser
225                 230                 235                 240
Val Phe Leu Phe Pro Pro Lys Pro Lys Asp Thr Leu Met Ile Ser Arg
                245                 250                 255
Thr Pro Glu Val Thr Cys Val Val Val Asp Val Ser His Glu Asp Pro
            260                 265                 270
Glu Val Lys Phe Asn Trp Tyr Val Asp Gly Val Glu Val His Asn Ala
        275                 280                 285
Lys Thr Lys Pro Arg Glu Glu Gln Tyr Asn Ser Thr Tyr Arg Val Val
    290                 295                 300
Ser Val Leu Thr Val Leu His Gln Asp Trp Leu Asn Gly Lys Glu Tyr
305                 310                 315                 320
Lys Cys Lys Val Ser Asn Lys Ala Leu Pro Ala Pro Ile Glu Lys Thr
                325                 330                 335
Ile Ser Lys Ala Lys Gly Gln Pro Arg Glu Pro Gln Val Tyr Thr Leu
            340                 345                 350
Pro Pro Ser Arg Glu Glu Met Thr Lys Asn Gln Val Ser Leu Thr Cys
        355                 360                 365
Leu Val Lys Gly Phe Tyr Pro Ser Asp Ile Ala Val Glu Trp Glu Ser
    370                 375                 380
Asn Gly Gln Pro Glu Asn Asn Tyr Lys Thr Thr Pro Pro Val Leu Asp
385                 390                 395                 400
Ser Asp Gly Ser Phe Phe Leu Tyr Ser Lys Leu Thr Val Asp Lys Ser
                405                 410                 415
Arg Trp Gln Gln Gly Asn Val Phe Ser Cys Ser Val Met His Glu Ala
            420                 425                 430
Leu His Asn His Tyr Thr Gln Lys Ser Leu Ser Leu Ser Pro Gly Lys
        435                 440                 445

<210> SEQ ID NO 32
<211> LENGTH: 363
<212> TYPE: PRT
<213> ORGANISM: Artificial Sequence
<220> FEATURE:
<223> OTHER INFORMATION: human TSLP-Fc

<400> SEQUENCE: 32

Tyr Asp Phe Thr Asn Cys Asp Phe Glu Lys Ile Lys Ala Ala Tyr Leu
1               5                   10                  15
Ser Thr Ile Ser Lys Asp Leu Ile Thr Tyr Met Ser Gly Thr Lys Ser
                20                  25                  30
Thr Glu Phe Asn Asn Thr Val Ser Cys Ser Asn Arg Pro His Cys Leu
            35                  40                  45
Thr Glu Ile Gln Ser Leu Thr Phe Asn Pro Thr Ala Gly Cys Ala Ser
        50                  55                  60
Leu Ala Lys Glu Met Phe Ala Met Lys Thr Lys Ala Ala Leu Ala Ile
65                  70                  75                  80
Trp Cys Pro Gly Tyr Ser Glu Thr Gln Ile Asn Ala Thr Gln Ala Met
                85                  90                  95
Lys Lys Arg Arg Lys Arg Lys Val Thr Thr Asn Lys Cys Leu Glu Gln
            100                 105                 110
Val Ser Gln Leu Gln Gly Leu Trp Arg Arg Phe Asn Arg Pro Leu Leu
        115                 120                 125
```

-continued

```
Lys Gln Gln Glu Pro Lys Ser Cys Asp Lys Thr His Thr Cys Pro Pro
    130                 135                 140
Cys Pro Ala Pro Glu Leu Leu Gly Gly Pro Ser Val Phe Leu Phe Pro
145                 150                 155                 160
Pro Lys Pro Lys Asp Thr Leu Met Ile Ser Arg Thr Pro Glu Val Thr
                165                 170                 175
Cys Val Val Val Asp Val Ser His Glu Asp Pro Glu Val Lys Phe Asn
            180                 185                 190
Trp Tyr Val Asp Gly Val Glu Val His Asn Ala Lys Thr Lys Pro Arg
        195                 200                 205
Glu Glu Gln Tyr Asn Ser Thr Tyr Arg Val Val Ser Val Leu Thr Val
    210                 215                 220
Leu His Gln Asp Trp Leu Asn Gly Lys Glu Tyr Lys Cys Lys Val Ser
225                 230                 235                 240
Asn Lys Ala Leu Pro Ala Pro Ile Glu Lys Thr Ile Ser Lys Ala Lys
                245                 250                 255
Gly Gln Pro Arg Glu Pro Gln Val Tyr Thr Leu Pro Pro Ser Arg Glu
            260                 265                 270
Glu Met Thr Lys Asn Gln Val Ser Leu Thr Cys Leu Val Lys Gly Phe
        275                 280                 285
Tyr Pro Ser Asp Ile Ala Val Glu Trp Glu Ser Asn Gly Gln Pro Glu
    290                 295                 300
Asn Asn Tyr Lys Thr Thr Pro Pro Val Leu Asp Ser Asp Gly Ser Phe
305                 310                 315                 320
Phe Leu Tyr Ser Lys Leu Thr Val Asp Lys Ser Arg Trp Gln Gln Gly
                325                 330                 335
Asn Val Phe Ser Cys Ser Val Met His Glu Ala Leu His Asn His Tyr
            340                 345                 350
Thr Gln Lys Ser Leu Ser Leu Ser Pro Gly Lys
        355                 360

<210> SEQ ID NO 33
<211> LENGTH: 371
<212> TYPE: PRT
<213> ORGANISM: Homo sapiens

<400> SEQUENCE: 33

Met Gly Arg Leu Val Leu Leu Trp Gly Ala Ala Val Phe Leu Leu Gly
1               5                   10                  15
Gly Trp Met Ala Leu Gly Gln Gly Gly Ala Ala Glu Gly Val Gln Ile
            20                  25                  30
Gln Ile Ile Tyr Phe Asn Leu Glu Thr Val Gln Val Thr Trp Asn Ala
        35                  40                  45
Ser Lys Tyr Ser Arg Thr Asn Leu Thr Phe His Tyr Arg Phe Asn Gly
    50                  55                  60
Asp Glu Ala Tyr Asp Gln Cys Thr Asn Tyr Leu Leu Gln Glu Gly His
65                  70                  75                  80
Thr Ser Gly Cys Leu Leu Asp Ala Glu Gln Arg Asp Asp Ile Leu Tyr
                85                  90                  95
Phe Ser Ile Arg Asn Gly Thr His Pro Val Phe Thr Ala Ser Arg Trp
            100                 105                 110
Met Val Tyr Tyr Leu Lys Pro Ser Ser Pro Lys His Val Arg Phe Ser
        115                 120                 125
Trp His Gln Asp Ala Val Thr Val Thr Cys Ser Asp Leu Ser Tyr Gly
```

```
                     130                 135                 140
Asp Leu Leu Tyr Glu Val Gln Tyr Arg Ser Pro Phe Asp Thr Glu Trp
145                 150                 155                 160

Gln Ser Lys Gln Glu Asn Thr Cys Asn Val Thr Ile Glu Gly Leu Asp
                165                 170                 175

Ala Glu Lys Cys Tyr Ser Phe Trp Val Arg Val Lys Ala Met Glu Asp
            180                 185                 190

Val Tyr Gly Pro Asp Thr Tyr Pro Ser Asp Trp Ser Val Thr Cys
        195                 200                 205

Trp Gln Arg Gly Glu Ile Arg Asp Ala Cys Ala Glu Thr Pro Thr Pro
    210                 215                 220

Pro Lys Pro Lys Leu Ser Lys Phe Ile Leu Ile Ser Ser Leu Ala Ile
225                 230                 235                 240

Leu Leu Met Val Ser Leu Leu Leu Ser Leu Trp Lys Leu Trp Arg
                245                 250                 255

Val Lys Lys Phe Leu Ile Pro Ser Val Pro Asp Pro Lys Ser Ile Phe
                260                 265                 270

Pro Gly Leu Phe Glu Ile His Gln Gly Asn Phe Gln Glu Trp Ile Thr
            275                 280                 285

Asp Thr Gln Asn Val Ala His Leu His Lys Met Ala Gly Ala Glu Gln
290                 295                 300

Glu Ser Gly Pro Glu Glu Pro Leu Val Val Gln Leu Ala Lys Thr Glu
305                 310                 315                 320

Ala Glu Ser Pro Arg Met Leu Asp Pro Gln Thr Glu Glu Lys Glu Ala
                325                 330                 335

Ser Gly Gly Ser Leu Gln Leu Pro His Gln Pro Leu Gln Gly Gly Asp
                340                 345                 350

Val Val Thr Ile Gly Gly Phe Thr Phe Val Met Asn Asp Arg Ser Tyr
                355                 360                 365

Val Ala Leu
    370

<210> SEQ ID NO 34
<211> LENGTH: 459
<212> TYPE: PRT
<213> ORGANISM: Homo sapiens

<400> SEQUENCE: 34

Met Thr Ile Leu Gly Thr Thr Phe Gly Met Val Phe Ser Leu Leu Gln
1               5                   10                  15

Val Val Ser Gly Glu Ser Gly Tyr Ala Gln Asn Gly Asp Leu Glu Asp
                20                  25                  30

Ala Glu Leu Asp Asp Tyr Ser Phe Ser Cys Tyr Ser Gln Leu Glu Val
            35                  40                  45

Asn Gly Ser Gln His Ser Leu Thr Cys Ala Phe Glu Asp Pro Asp Val
        50                  55                  60

Asn Thr Thr Asn Leu Glu Phe Glu Ile Cys Gly Ala Leu Val Glu Val
65                  70                  75                  80

Lys Cys Leu Asn Phe Arg Lys Leu Gln Glu Ile Tyr Phe Ile Glu Thr
                85                  90                  95

Lys Lys Phe Leu Leu Ile Gly Lys Ser Asn Ile Cys Val Lys Val Gly
            100                 105                 110

Glu Lys Ser Leu Thr Cys Lys Lys Ile Asp Leu Thr Thr Ile Val Lys
        115                 120                 125
```

```
Pro Glu Ala Pro Phe Asp Leu Ser Val Ile Tyr Arg Glu Gly Ala Asn
    130                 135                 140

Asp Phe Val Val Thr Phe Asn Thr Ser His Leu Gln Lys Lys Tyr Val
145                 150                 155                 160

Lys Val Leu Met His Asp Val Ala Tyr Arg Gln Glu Lys Asp Glu Asn
                165                 170                 175

Lys Trp Thr His Val Asn Leu Ser Ser Thr Lys Leu Thr Leu Leu Gln
            180                 185                 190

Arg Lys Leu Gln Pro Ala Ala Met Tyr Glu Ile Lys Val Arg Ser Ile
        195                 200                 205

Pro Asp His Tyr Phe Lys Gly Phe Trp Ser Glu Trp Ser Pro Ser Tyr
    210                 215                 220

Tyr Phe Arg Thr Pro Glu Ile Asn Asn Ser Ser Gly Glu Met Asp Pro
225                 230                 235                 240

Ile Leu Leu Thr Ile Ser Ile Leu Ser Phe Phe Ser Val Ala Leu Leu
                245                 250                 255

Val Ile Leu Ala Cys Val Leu Trp Lys Lys Arg Ile Lys Pro Ile Val
            260                 265                 270

Trp Pro Ser Leu Pro Asp His Lys Lys Thr Leu Glu His Leu Cys Lys
        275                 280                 285

Lys Pro Arg Lys Asn Leu Asn Val Ser Phe Asn Pro Glu Ser Phe Leu
    290                 295                 300

Asp Cys Gln Ile His Arg Val Asp Asp Ile Gln Ala Arg Asp Glu Val
305                 310                 315                 320

Glu Gly Phe Leu Gln Asp Thr Phe Pro Gln Gln Leu Glu Glu Ser Glu
                325                 330                 335

Lys Gln Arg Leu Gly Gly Asp Val Gln Ser Pro Asn Cys Pro Ser Glu
            340                 345                 350

Asp Val Val Val Thr Pro Glu Ser Phe Gly Arg Asp Ser Ser Leu Thr
        355                 360                 365

Cys Leu Ala Gly Asn Val Ser Ala Cys Asp Ala Pro Ile Leu Ser Ser
    370                 375                 380

Ser Arg Ser Leu Asp Cys Arg Glu Ser Gly Lys Asn Gly Pro His Val
385                 390                 395                 400

Tyr Gln Asp Leu Leu Leu Ser Leu Gly Thr Thr Asn Ser Thr Leu Pro
                405                 410                 415

Pro Pro Phe Ser Leu Gln Ser Gly Ile Leu Thr Leu Asn Pro Val Ala
            420                 425                 430

Gln Gly Gln Pro Ile Leu Thr Ser Leu Gly Ser Asn Gln Glu Glu Ala
        435                 440                 445

Tyr Val Thr Met Ser Ser Phe Tyr Gln Asn Gln
    450                 455

<210> SEQ ID NO 35
<211> LENGTH: 448
<212> TYPE: PRT
<213> ORGANISM: Artificial Sequence
<220> FEATURE:
<223> OTHER INFORMATION: Heavy chain of Tezepelumab

<400> SEQUENCE: 35

Gln Met Gln Leu Val Glu Ser Gly Gly Val Val Gln Pro Gly Arg
1               5                   10                  15

Ser Leu Arg Leu Ser Cys Ala Ala Ser Gly Phe Thr Phe Arg Thr Tyr
            20                  25                  30
```

-continued

```
Gly Met His Trp Val Arg Gln Ala Pro Gly Lys Gly Leu Glu Trp Val
         35                  40                  45
Ala Val Ile Trp Tyr Asp Gly Ser Asn Lys His Tyr Ala Asp Ser Val
 50                  55                  60
Lys Gly Arg Phe Thr Ile Thr Arg Asp Asn Ser Lys Asn Thr Leu Asn
 65                  70                  75                  80
Leu Gln Met Asn Ser Leu Arg Ala Glu Asp Thr Ala Val Tyr Tyr Cys
                 85                  90                  95
Ala Arg Ala Pro Gln Trp Glu Leu Val His Glu Ala Phe Asp Ile Trp
             100                 105                 110
Gly Gln Gly Thr Met Val Thr Val Ser Ser Ala Ser Thr Lys Gly Pro
         115                 120                 125
Ser Val Phe Pro Leu Ala Pro Cys Ser Arg Ser Thr Ser Glu Ser Thr
 130                 135                 140
Ala Ala Leu Gly Cys Leu Val Lys Asp Tyr Phe Pro Glu Pro Val Thr
145                 150                 155                 160
Val Ser Trp Asn Ser Gly Ala Leu Thr Ser Gly Val His Thr Phe Pro
                 165                 170                 175
Ala Val Leu Gln Ser Ser Gly Leu Tyr Ser Leu Ser Ser Val Val Thr
             180                 185                 190
Val Pro Ser Ser Asn Phe Gly Thr Gln Thr Tyr Thr Cys Asn Val Asp
         195                 200                 205
His Lys Pro Ser Asn Thr Lys Val Asp Lys Thr Val Glu Arg Lys Cys
 210                 215                 220
Cys Val Glu Cys Pro Pro Cys Pro Ala Pro Pro Val Ala Gly Pro Ser
225                 230                 235                 240
Val Phe Leu Phe Pro Pro Lys Pro Lys Asp Thr Leu Met Ile Ser Arg
                 245                 250                 255
Thr Pro Glu Val Thr Cys Val Val Asp Val Ser His Glu Asp Pro
             260                 265                 270
Glu Val Gln Phe Asn Trp Tyr Val Asp Gly Val Glu Val His Asn Ala
         275                 280                 285
Lys Thr Lys Pro Arg Glu Glu Gln Phe Asn Ser Thr Phe Arg Val Val
 290                 295                 300
Ser Val Leu Thr Val Val His Gln Asp Trp Leu Asn Gly Lys Glu Tyr
305                 310                 315                 320
Lys Cys Lys Val Ser Asn Lys Gly Leu Pro Ala Pro Ile Glu Lys Thr
                 325                 330                 335
Ile Ser Lys Thr Lys Gly Gln Pro Arg Glu Pro Gln Val Tyr Thr Leu
             340                 345                 350
Pro Pro Ser Arg Glu Glu Met Thr Lys Asn Gln Val Ser Leu Thr Cys
         355                 360                 365
Leu Val Lys Gly Phe Tyr Pro Ser Asp Ile Ala Val Glu Trp Glu Ser
 370                 375                 380
Asn Gly Gln Pro Glu Asn Asn Tyr Lys Thr Thr Pro Pro Met Leu Asp
385                 390                 395                 400
Ser Asp Gly Ser Phe Phe Leu Tyr Ser Lys Leu Thr Val Asp Lys Ser
                 405                 410                 415
Arg Trp Gln Gln Gly Asn Val Phe Ser Cys Ser Val Met His Glu Ala
             420                 425                 430
Leu His Asn His Tyr Thr Gln Lys Ser Leu Ser Leu Ser Pro Gly Lys
         435                 440                 445
```

```
<210> SEQ ID NO 36
<211> LENGTH: 214
<212> TYPE: PRT
<213> ORGANISM: Artificial Sequence
<220> FEATURE:
<223> OTHER INFORMATION: Light chain of Tezepelumab

<400> SEQUENCE: 36

Ser Tyr Val Leu Thr Gln Pro Pro Ser Val Ser Val Ala Pro Gly Gln
1               5                   10                  15

Thr Ala Arg Ile Thr Cys Gly Gly Asn Asn Leu Gly Ser Lys Ser Val
            20                  25                  30

His Trp Tyr Gln Gln Lys Pro Gly Gln Ala Pro Val Leu Val Val Tyr
        35                  40                  45

Asp Asp Ser Asp Arg Pro Ser Trp Ile Pro Glu Arg Phe Ser Gly Ser
    50                  55                  60

Asn Ser Gly Asn Thr Ala Thr Leu Thr Ile Ser Arg Gly Glu Ala Gly
65                  70                  75                  80

Asp Glu Ala Asp Tyr Tyr Cys Gln Val Trp Asp Ser Ser Ser Asp His
                85                  90                  95

Val Val Phe Gly Gly Gly Thr Lys Leu Thr Val Leu Gly Gln Pro Lys
            100                 105                 110

Ala Ala Pro Ser Val Thr Leu Phe Pro Pro Ser Ser Glu Glu Leu Gln
        115                 120                 125

Ala Asn Lys Ala Thr Leu Val Cys Leu Ile Ser Asp Phe Tyr Pro Gly
    130                 135                 140

Ala Val Thr Val Ala Trp Lys Ala Asp Ser Ser Pro Val Lys Ala Gly
145                 150                 155                 160

Val Glu Thr Thr Thr Pro Ser Lys Gln Ser Asn Asn Lys Tyr Ala Ala
                165                 170                 175

Ser Ser Tyr Leu Ser Leu Thr Pro Glu Gln Trp Lys Ser His Arg Ser
            180                 185                 190

Tyr Ser Cys Gln Val Thr His Glu Gly Ser Thr Val Lys Thr Val
        195                 200                 205

Ala Pro Thr Glu Cys Ser
    210

<210> SEQ ID NO 37
<211> LENGTH: 5
<212> TYPE: PRT
<213> ORGANISM: Artificial Sequence
<220> FEATURE:
<223> OTHER INFORMATION: VH-CDR1 for mouse antibody D1D8H9F7

<400> SEQUENCE: 37

Ser Tyr Tyr Met Asn
1               5

<210> SEQ ID NO 38
<211> LENGTH: 17
<212> TYPE: PRT
<213> ORGANISM: Artificial Sequence
<220> FEATURE:
<223> OTHER INFORMATION: VH-CDR2 for mouse antibody D1D8H9F7

<400> SEQUENCE: 38

Gln Ile Tyr Pro Gly Asp Gly Glu Thr Asn Tyr Asn Gly Lys Phe Lys
1               5                   10                  15

Asp
```

<210> SEQ ID NO 39
<211> LENGTH: 12
<212> TYPE: PRT
<213> ORGANISM: Artificial Sequence
<220> FEATURE:
<223> OTHER INFORMATION: VH-CDR3 for mouse antibody D1D8H9F7

<400> SEQUENCE: 39

```
Ala Gly Tyr Ser Asp Tyr Val Tyr Ala Met Asp Tyr
1               5                   10
```

<210> SEQ ID NO 40
<211> LENGTH: 12
<212> TYPE: PRT
<213> ORGANISM: Artificial Sequence
<220> FEATURE:
<223> OTHER INFORMATION: VL-CDR1 for mouse antibody D1D8H9F7

<400> SEQUENCE: 40

```
Ser Val Ser Ser Ser Ile Thr Ser Ser Asn Leu His
1               5                   10
```

<210> SEQ ID NO 41
<211> LENGTH: 7
<212> TYPE: PRT
<213> ORGANISM: Artificial Sequence
<220> FEATURE:
<223> OTHER INFORMATION: VL-CDR2 for mouse antibody D1D8H9F7

<400> SEQUENCE: 41

```
Gly Thr Ser Asn Leu Ala Ser
1               5
```

<210> SEQ ID NO 42
<211> LENGTH: 8
<212> TYPE: PRT
<213> ORGANISM: Artificial Sequence
<220> FEATURE:
<223> OTHER INFORMATION: VL-CDR3 for mouse antibody D1D8H9F7

<400> SEQUENCE: 42

```
Gln Gln Trp Ser Ser Phe Pro Leu
1               5
```

<210> SEQ ID NO 43
<211> LENGTH: 121
<212> TYPE: PRT
<213> ORGANISM: Artificial Sequence
<220> FEATURE:
<223> OTHER INFORMATION: VH for mouse antibody D1D8H9F7

<400> SEQUENCE: 43

```
Gln Val Gln Leu Gln Gln Ser Gly Ala Asp Leu Val Arg Pro Gly Ser
1               5                   10                  15

Ser Val Lys Ile Ser Cys Lys Thr Ser Gly Phe Ala Phe Ser Ser Tyr
            20                  25                  30

Tyr Met Asn Trp Val Lys Gln Arg Pro Gly Gln Gly Leu Glu Trp Ile
        35                  40                  45

Gly Gln Ile Tyr Pro Gly Asp Gly Glu Thr Asn Tyr Asn Gly Lys Phe
    50                  55                  60

Lys Asp Lys Ala Thr Leu Thr Ala Asp Lys Ser Ser Ser Thr Val Tyr
65                  70                  75                  80

Met Gln Leu Ser Ser Leu Thr Ser Glu Asp Ser Ala Val Tyr Phe Cys
                85                  90                  95
```

Ala Arg Ala Gly Tyr Ser Asp Tyr Val Tyr Ala Met Asp Tyr Trp Gly
            100                 105                 110

Gln Gly Thr Ser Val Thr Val Ser Ser
        115                 120

<210> SEQ ID NO 44
<211> LENGTH: 108
<212> TYPE: PRT
<213> ORGANISM: Artificial Sequence
<220> FEATURE:
<223> OTHER INFORMATION: VL for mouse antibody D1D8H9F7

<400> SEQUENCE: 44

Glu Ile Val Leu Thr Gln Ser Pro Ala Leu Met Ala Ala Ser Pro Gly
1               5                   10                  15

Glu Lys Val Thr Ile Ile Cys Ser Val Ser Ser Ser Ile Thr Ser Ser
            20                  25                  30

Asn Leu His Trp Tyr Gln Gln Lys Ser Glu Thr Ser Pro Lys Pro Trp
        35                  40                  45

Ile Tyr Gly Thr Ser Asn Leu Ala Ser Gly Val Pro Val Arg Phe Ser
    50                  55                  60

Gly Ser Gly Ser Gly Thr Ser Tyr Ser Leu Thr Ile Ser Ser Met Glu
65                  70                  75                  80

Ala Glu Asp Ala Ala Thr Tyr Tyr Cys Gln Gln Trp Ser Ser Phe Pro
                85                  90                  95

Leu Thr Phe Gly Ser Gly Thr Lys Leu Glu Ile Lys
            100                 105

<210> SEQ ID NO 45
<211> LENGTH: 363
<212> TYPE: DNA
<213> ORGANISM: Artificial Sequence
<220> FEATURE:
<223> OTHER INFORMATION: VH for mouse antibody D1D8H9F7

<400> SEQUENCE: 45
caggttcagc tgcagcagtc tggggctgac ctggtgaggc ctgggtcctc agtgaagatt      60
tcctgcaaga cttctggctt tgcattcagt agctactata tgaactgggt gaagcagagg     120
cctggacagg gtcttgagtg gattggacag atttatcctg agatggtga actaactac       180 aatggaaagt tcaaggataa agccacactg actgcagaca atcctccag cacagtctac      240 atgcagctca gcagcctaac atctgaggac tctgcggtct acttctgtgc aagagcgggt     300
tatagtgact acgtttatgc tatggactac tggggtcaag gaacctcagt caccgtctcc    360
tca                                                                   363

<210> SEQ ID NO 46
<211> LENGTH: 324
<212> TYPE: DNA
<213> ORGANISM: Artificial Sequence
<220> FEATURE:
<223> OTHER INFORMATION: VL for mouse antibody D1D8H9F7

<400> SEQUENCE: 46
gaaattgtgc tcacccagtc tccagcactc atggctgcat ctccagggga aaggtcacc      60 atcatctgca gtgtcagctc aagtataact ccagcaacc tgcactggta ccagcagaag     120
tcagaaacct cccccaaacc ctggatttat ggcacatcca acctggcttc tggagtccct    180
gttcgcttca gtggcagtgg atctgggacc tcttattctc tcacaatcag cagcatggag    240

```
gctgaagatg ctgccactta ttactgtcaa cagtggagta gtttcccact cacgttcggc    300
tcggggacaa agttggaaat aaaa                                            324
```

<210> SEQ ID NO 47
<211> LENGTH: 7
<212> TYPE: PRT
<213> ORGANISM: Artificial Sequence
<220> FEATURE:
<223> OTHER INFORMATION: VH-CDR1 for mouse antibody D1C2H1H1

<400> SEQUENCE: 47

Thr Tyr Gly Met Gly Ile Gly
1               5

<210> SEQ ID NO 48
<211> LENGTH: 16
<212> TYPE: PRT
<213> ORGANISM: Artificial Sequence
<220> FEATURE:
<223> OTHER INFORMATION: VH-CDR2 for mouse antibody D1C2H1H1

<400> SEQUENCE: 48

Ser Ile Trp Trp Asp Asp Asn Arg Tyr Phe Asn Ala Ala Leu Lys Ser
1               5                   10                  15

<210> SEQ ID NO 49
<211> LENGTH: 11
<212> TYPE: PRT
<213> ORGANISM: Artificial Sequence
<220> FEATURE:
<223> OTHER INFORMATION: VH-CDR3 for mouse antibody D1C2H1H1

<400> SEQUENCE: 49

Ile Glu Asp Gly Tyr Tyr Ser Tyr His Ser Tyr
1               5                   10

<210> SEQ ID NO 50
<211> LENGTH: 15
<212> TYPE: PRT
<213> ORGANISM: Artificial Sequence
<220> FEATURE:
<223> OTHER INFORMATION: VL-CDR1 for mouse antibody D1C2H1H1

<400> SEQUENCE: 50

Lys Ala Ser Gln Ser Val Asp Phe Asp Gly Asp Ser Tyr Met Asn
1               5                   10                  15

<210> SEQ ID NO 51
<211> LENGTH: 7
<212> TYPE: PRT
<213> ORGANISM: Artificial Sequence
<220> FEATURE:
<223> OTHER INFORMATION: VL-CDR2 for mouse antibody D1C2H1H1

<400> SEQUENCE: 51

Ala Ala Ser Asn Leu Val Ser
1               5

<210> SEQ ID NO 52
<211> LENGTH: 9
<212> TYPE: PRT
<213> ORGANISM: Artificial Sequence
<220> FEATURE:
<223> OTHER INFORMATION: VL-CDR3 for mouse antibody D1C2H1H1

<400> SEQUENCE: 52

Gln Gln Ile Asp Glu Asp Pro Tyr Thr
1               5

<210> SEQ ID NO 53
<211> LENGTH: 121
<212> TYPE: PRT
<213> ORGANISM: Artificial Sequence
<220> FEATURE:
<223> OTHER INFORMATION: VH for mouse antibody D1C2H1H1

<400> SEQUENCE: 53

Gln Val Thr Leu Lys Glu Ser Gly Pro Gly Ile Leu Gln Pro Ser Gln
1               5                   10                  15

Thr Leu Ser Leu Thr Cys Ser Phe Ser Gly Phe Ser Leu Ser Thr Tyr
            20                  25                  30

Gly Met Gly Ile Gly Trp Ile Arg Leu Pro Ser Gly Lys Gly Leu Glu
        35                  40                  45

Trp Leu Ala Ser Ile Trp Trp Asp Asp Asn Arg Tyr Phe Asn Ala Ala
    50                  55                  60

Leu Lys Ser Arg Leu Thr Ile Ser Lys Asp Ala Ser Lys Asn Gln Val
65                  70                  75                  80

Phe Leu Lys Ile Ala Ser Val Asp Thr Ala Asp Thr Ala Thr Tyr Tyr
                85                  90                  95

Cys Ala Arg Ile Glu Asp Gly Tyr Tyr Ser Tyr His Ser Tyr Trp Gly
            100                 105                 110

Gln Gly Thr Leu Val Thr Val Ser Ala
        115                 120

<210> SEQ ID NO 54
<211> LENGTH: 111
<212> TYPE: PRT
<213> ORGANISM: Artificial Sequence
<220> FEATURE:
<223> OTHER INFORMATION: VL for mouse antibody D1C2H1H1

<400> SEQUENCE: 54

Asp Ile Val Leu Thr Gln Ser Pro Ala Ser Leu Ala Val Ser Leu Gly
1               5                   10                  15

Gln Arg Ala Thr Ile Ser Cys Lys Ala Ser Gln Ser Val Asp Phe Asp
            20                  25                  30

Gly Asp Ser Tyr Met Asn Trp Phe Gln Gln Lys Pro Gly Gln Pro Pro
        35                  40                  45

Lys Leu Leu Ile Tyr Ala Ala Ser Asn Leu Val Ser Gly Ile Pro Ala
    50                  55                  60

Arg Phe Ser Gly Ser Gly Ser Gly Thr Asp Phe Thr Leu Asn Ile His
65                  70                  75                  80

Pro Val Glu Glu Glu Asp Ala Ala Thr Tyr Tyr Cys Gln Gln Ile Asp
                85                  90                  95

Glu Asp Pro Tyr Thr Phe Gly Gly Thr Lys Leu Glu Ile Glu
            100                 105                 110

<210> SEQ ID NO 55
<211> LENGTH: 363
<212> TYPE: DNA
<213> ORGANISM: Artificial Sequence
<220> FEATURE:
<223> OTHER INFORMATION: VH for mouse antibody D1C2H1H1

<400> SEQUENCE: 55

```
caggttactc tgaaagagtc tggccctggg atattgcagc cctcccagac cctcagtctg    60
acttgttctt tctctgggtt ttcactgagc acttatggca tgggtatagg ctggattcgt   120
ctgccttcgg ggaagggtct ggagtggctg gcaagcattt ggtgggatga ataagatac    180 tttaacgctg ccctgaagag ccggctcact atctccaagg atgcctccaa aaaccaggta   240
ttcctcaaga tcgccagtgt ggacactgca gatactgcca catattattg tgctcgaata   300
gaggacggct attatagtta tcactcttac tggggccaag gactctggt cactgtctct   360 gca                                                                 363
```

<210> SEQ ID NO 56
<211> LENGTH: 333
<212> TYPE: DNA
<213> ORGANISM: Artificial Sequence
<220> FEATURE:
<223> OTHER INFORMATION: VL for mouse antibody D1C2H1H1

<400> SEQUENCE: 56

```
gacattgtgc tgacccaatc tccagcttct ttggctgtgt ctctagggca gagggccacc    60
atctcctgca aggccagcca aagtgttgat tttgatggtg atagttatat gaactggttc   120
caacagaaac caggacagcc acccaaactc ctcatctatg ctgcatccaa tctagtatct   180
gggatcccag ccaggtttag tggcagtggg tctgggacag acttcaccct caacatccat   240
cctgtggagg aggaggatgc tgcaacctat tactgtcagc aaattgatga ggatccgtac   300
acgttcggag gggggaccaa gctggaaata gaa                                333
```

<210> SEQ ID NO 57
<211> LENGTH: 330
<212> TYPE: PRT
<213> ORGANISM: Artificial Sequence
<220> FEATURE:
<223> OTHER INFORMATION: Human IgG1 heavy chain constant region

<400> SEQUENCE: 57

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175
```

```
Glu Gln Tyr Asn Ser Thr Tyr Arg Val Val Ser Val Leu Thr Val Leu
                180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
        210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 58
<211> LENGTH: 993
<212> TYPE: DNA
<213> ORGANISM: Artificial Sequence
<220> FEATURE:
<223> OTHER INFORMATION: Human IgG1 heavy chain constant region

<400> SEQUENCE: 58
gcctccacca agggcccatc ggtcttcccc ctggcaccct cctccaagag cacctctggg      60
ggcacagcgg ccctgggctg cctggtcaag gactacttcc ccgaaccggt gacggtgtcg     120
tggaactcag cgccctgac cagcggcgtg cacaccttcc cggctgtcct acagtcctca     180
ggactctact ccctcagcag cgtggtgacc gtgccctcca gcagcttggg cacccagacc     240
tacatctgca acgtgaatca caagcccagc aacaccaagg tggacaagaa agttgagccc     300
aaatcttgtg acaaaactca cacatgccca ccgtgcccag cacctgaact cctggggga    360
ccgtcagtct tcctcttccc cccaaaaccc aaggacaccc tcatgatctc ccggacccct     420
gaggtcacat gcgtggtggt ggacgtgagc cacgaagacc ctgaggtcaa gttcaactgg     480
tacgtggacg gcgtggaggt gcataatgcc aagacaaagc cgcgggagga gcagtacaac     540
agcacgtacc gggtggtcag cgtcctcacc gtcctgcacc aggactggct gaatggcaag     600
gagtacaagt gcaaggtctc caacaaagcc ctcccagccc ccatcgagaa aaccatctcc     660
aaagccaaag ggcagccccg agaaccacag gtgtacaccc tgcccccatc ccgggatgag     720
ctgaccaaga accaggtcag cctgacctgc ctggtcaaag gcttctatcc cagcgacatc     780
gccgtggagt gggagagcaa tgggcagccg gagaacaact acaagaccac gcctcccgtg     840
ctggactccg acggctcctt cttcctctac agcaagctca ccgtggacaa gagcaggtgg     900
cagcagggga acgtcttctc atgctccgtg atgcatgagg ctctgcacaa ccactacacg     960
cagaagagcc tctccctgtc tccgggtaaa tga                                  993
```